Figure 1:
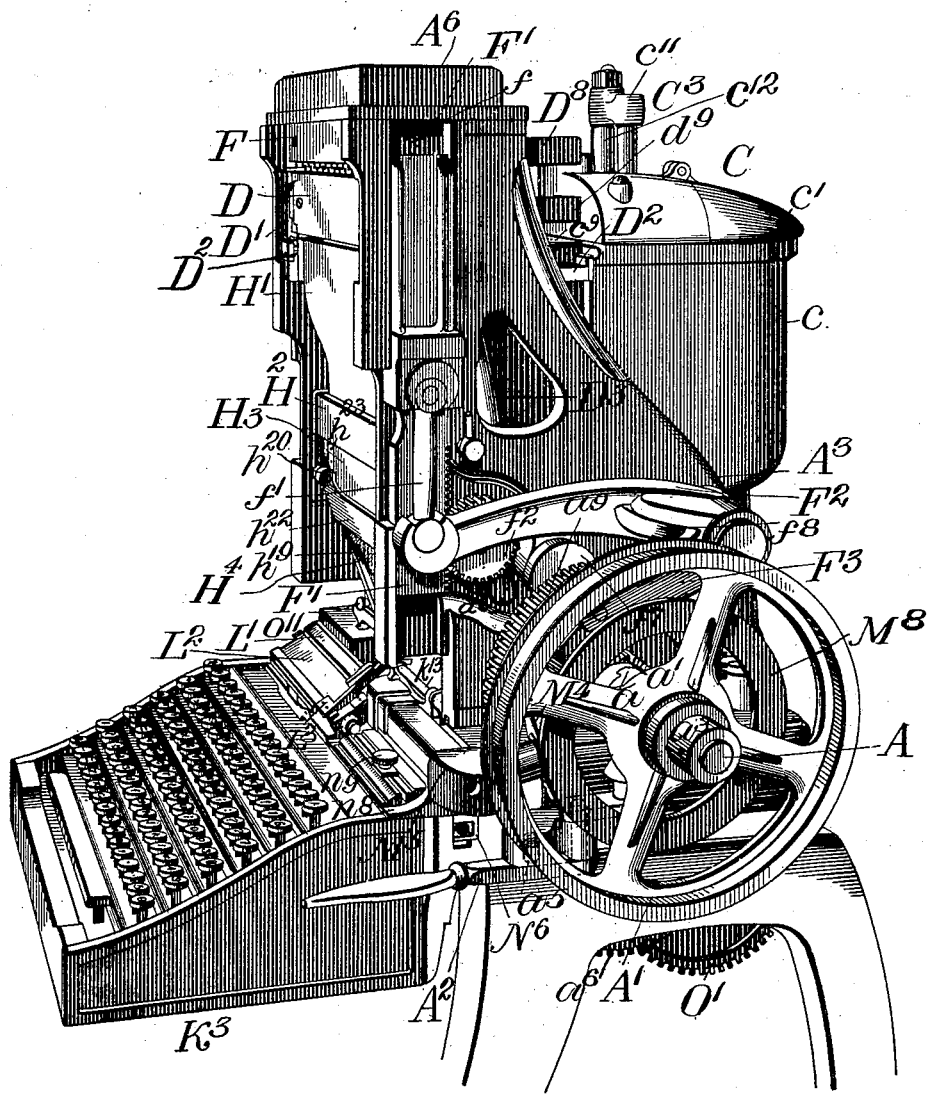

No. 694,307. Patented Feb. 25, 1902.
L. A. BROTT.
MACHINE FOR THE PRODUCTION OF TYPES AND TYPE BARS.
(Application filed Mar. 10, 1900.)
(No Model.) 32 Sheets—Sheet 1.

No. 694,307. Patented Feb. 25, 1902.
L. A. BROTT.
MACHINE FOR THE PRODUCTION OF TYPES AND TYPE BARS.
(Application filed Mar. 10, 1900.)
(No Model.) 32 Sheets—Sheet 2.
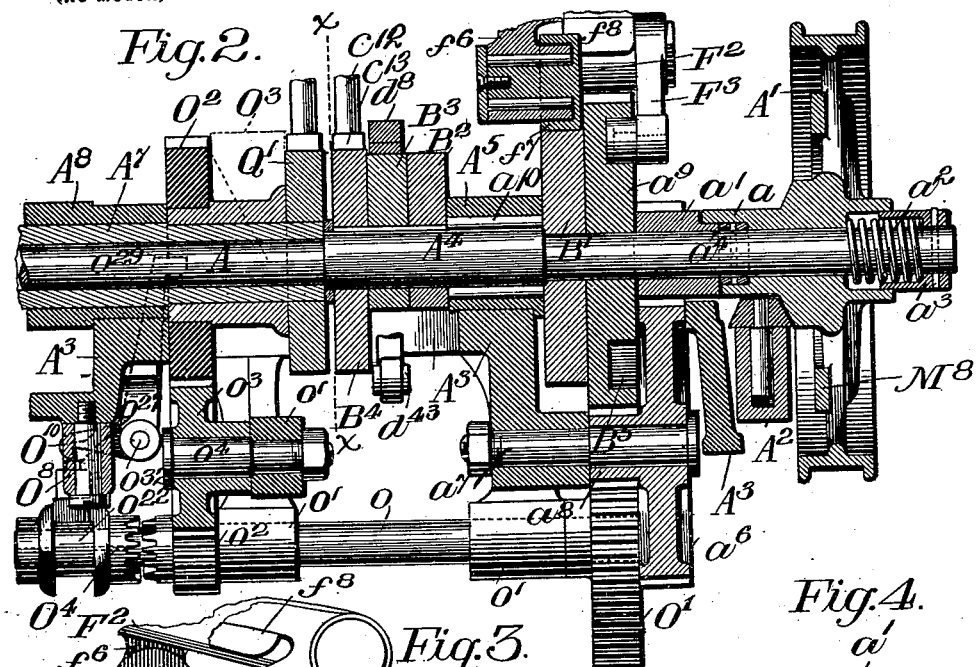
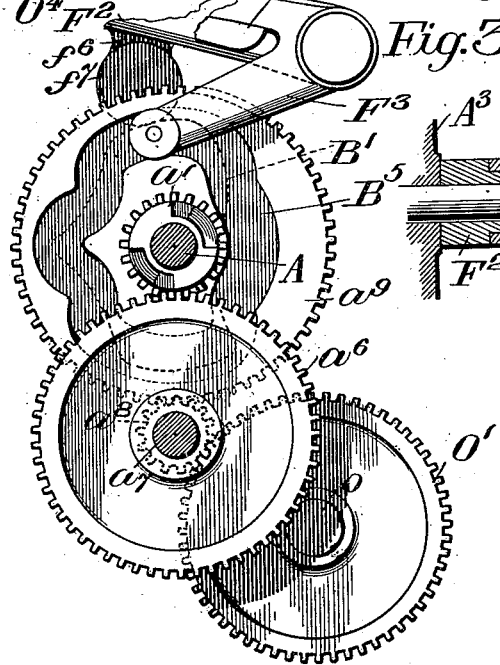
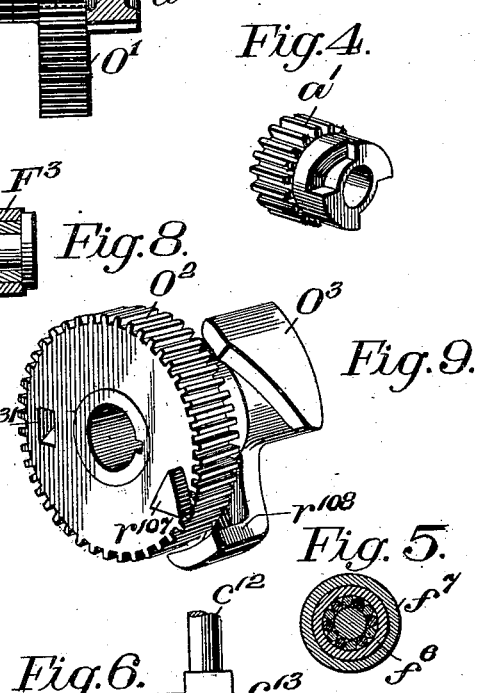
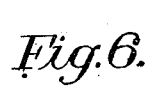
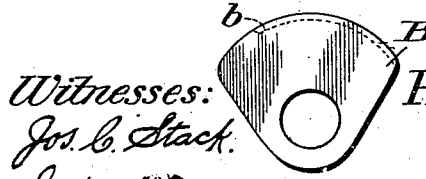
Witnesses:
Jos. C. Stack.
Rufus H. Thayer
Inventor:
Lucien A. Brott,
by
Walter F. Rogers
Attorney.

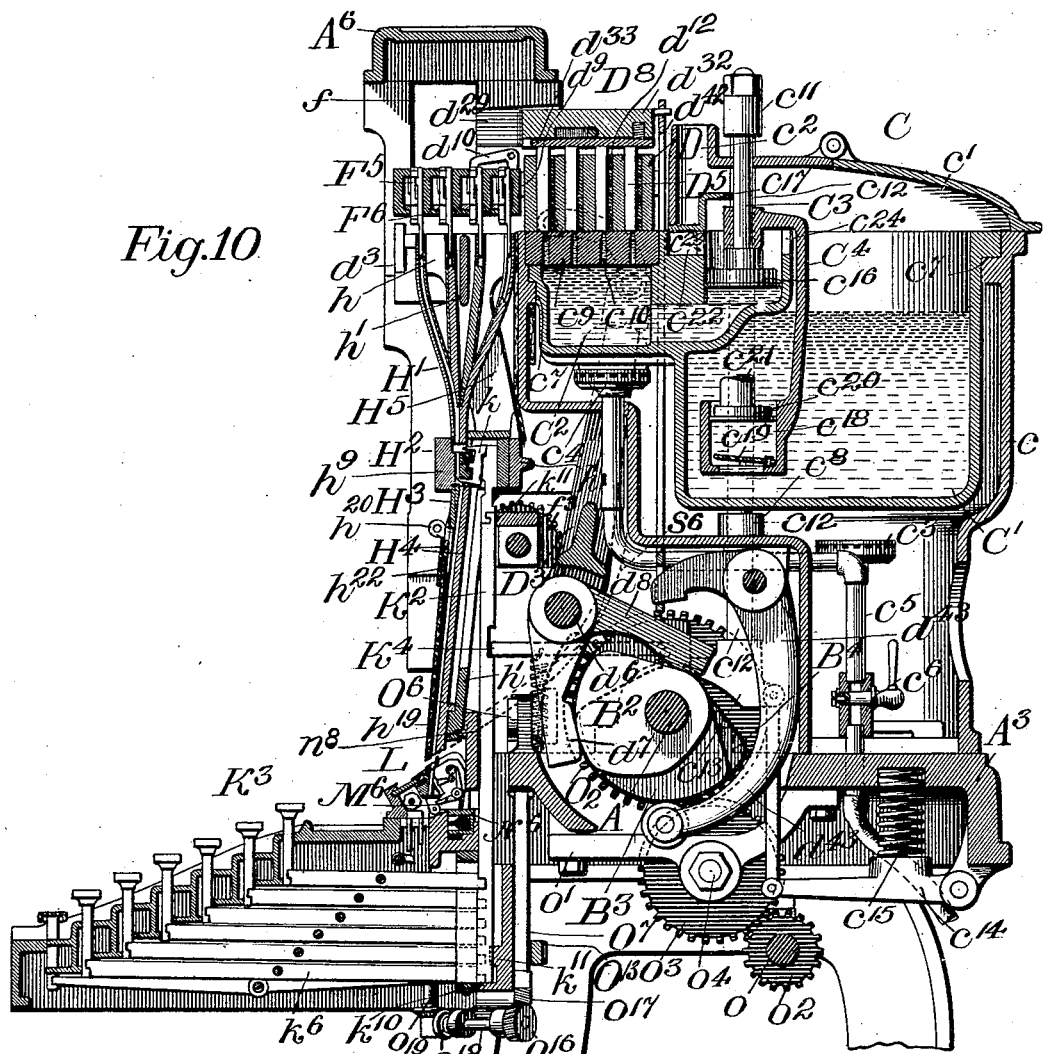

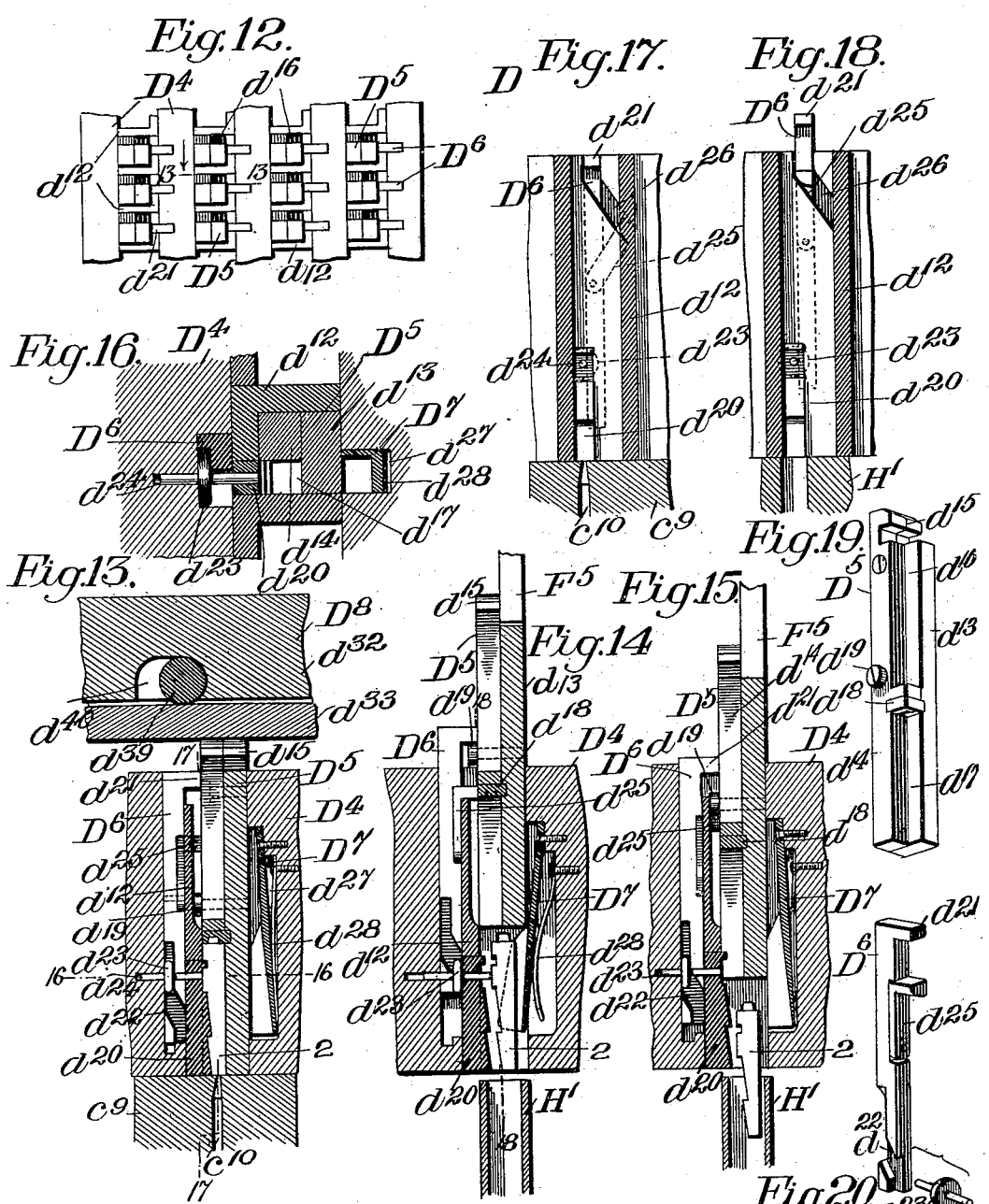

No. 694,307. Patented Feb. 25, 1902.
L. A. BROTT.
MACHINE FOR THE PRODUCTION OF TYPES AND TYPE BARS.
(Application filed Mar. 10, 1900.)
(No Model.) 32 Sheets—Sheet 5.

Witnesses:
Jos. C. Stack.
Rufus H. Thayer

Inventor:
Lucien A. Brott,
by
Walter F. Rogers
Attorney.

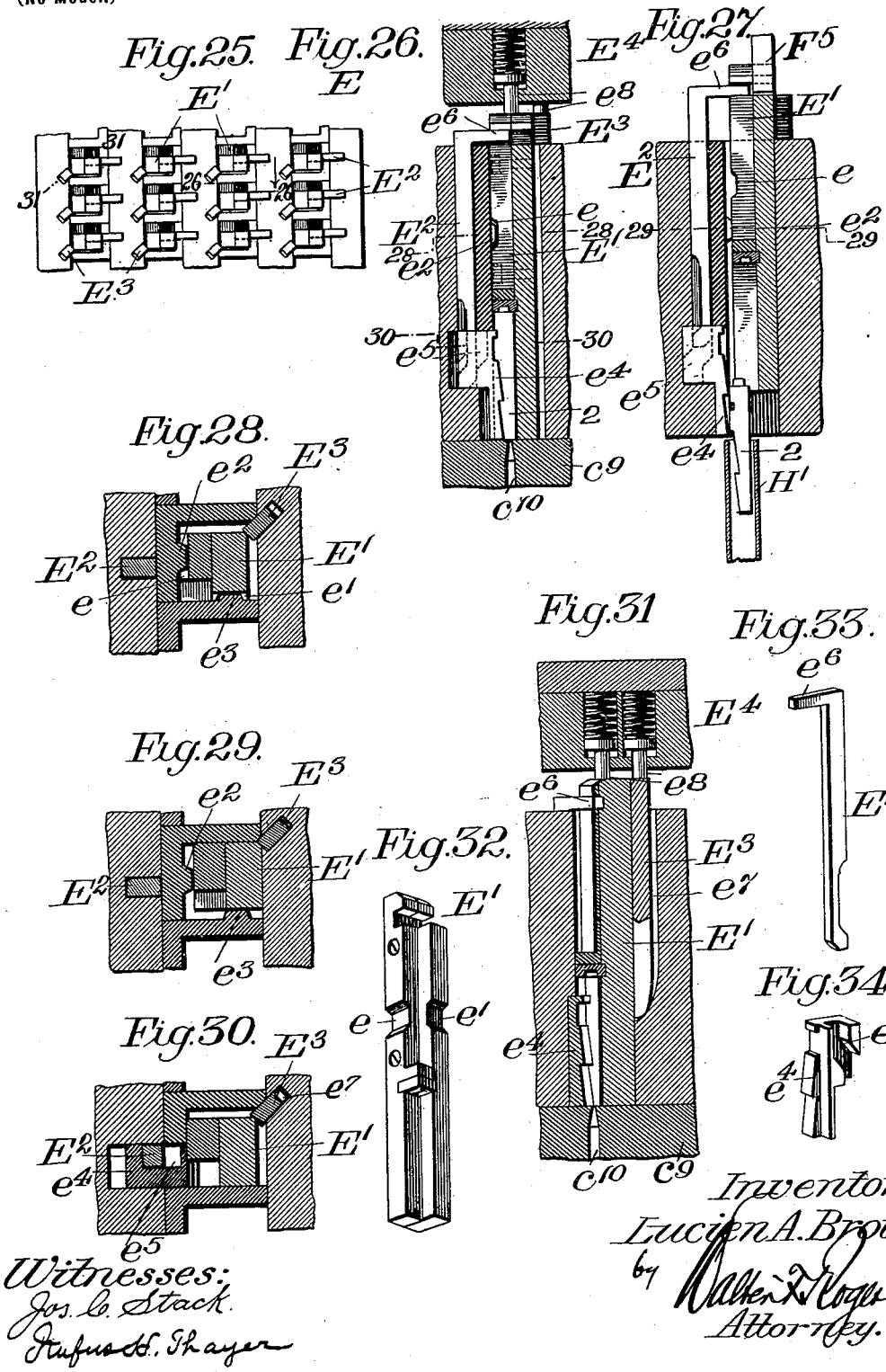

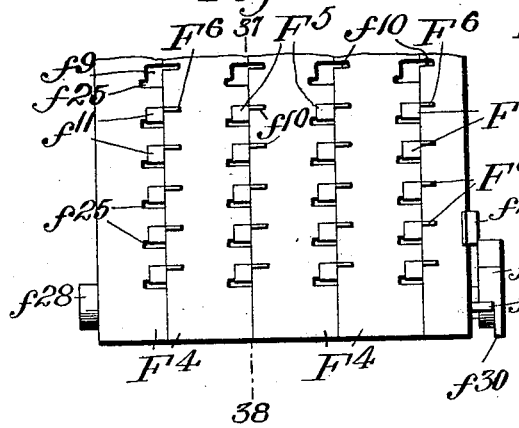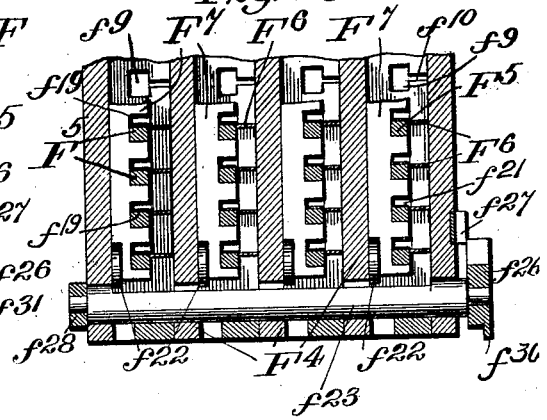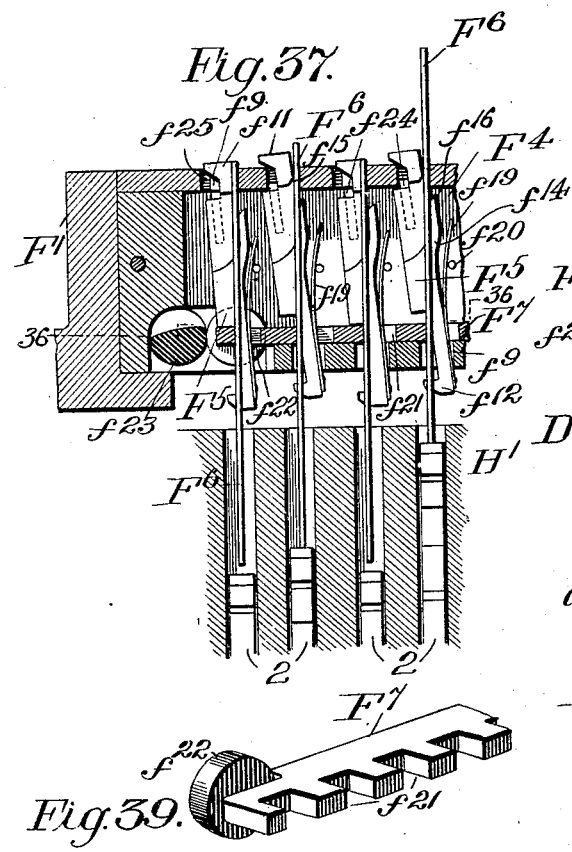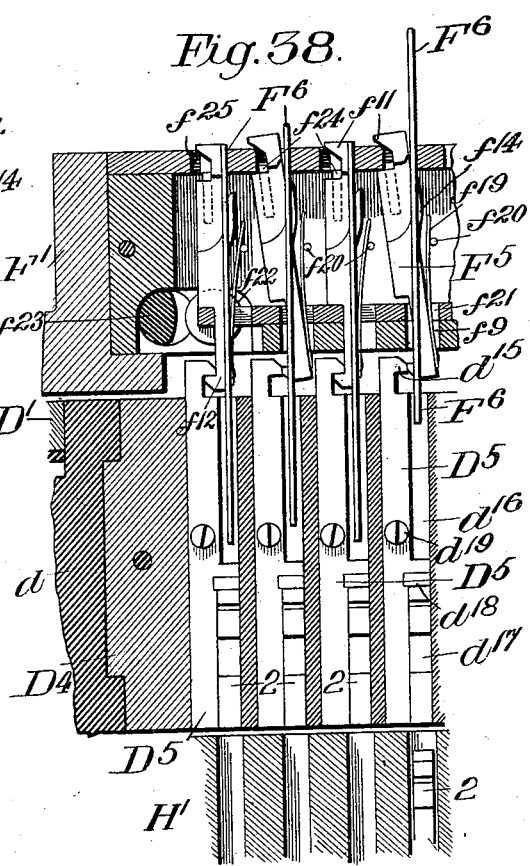

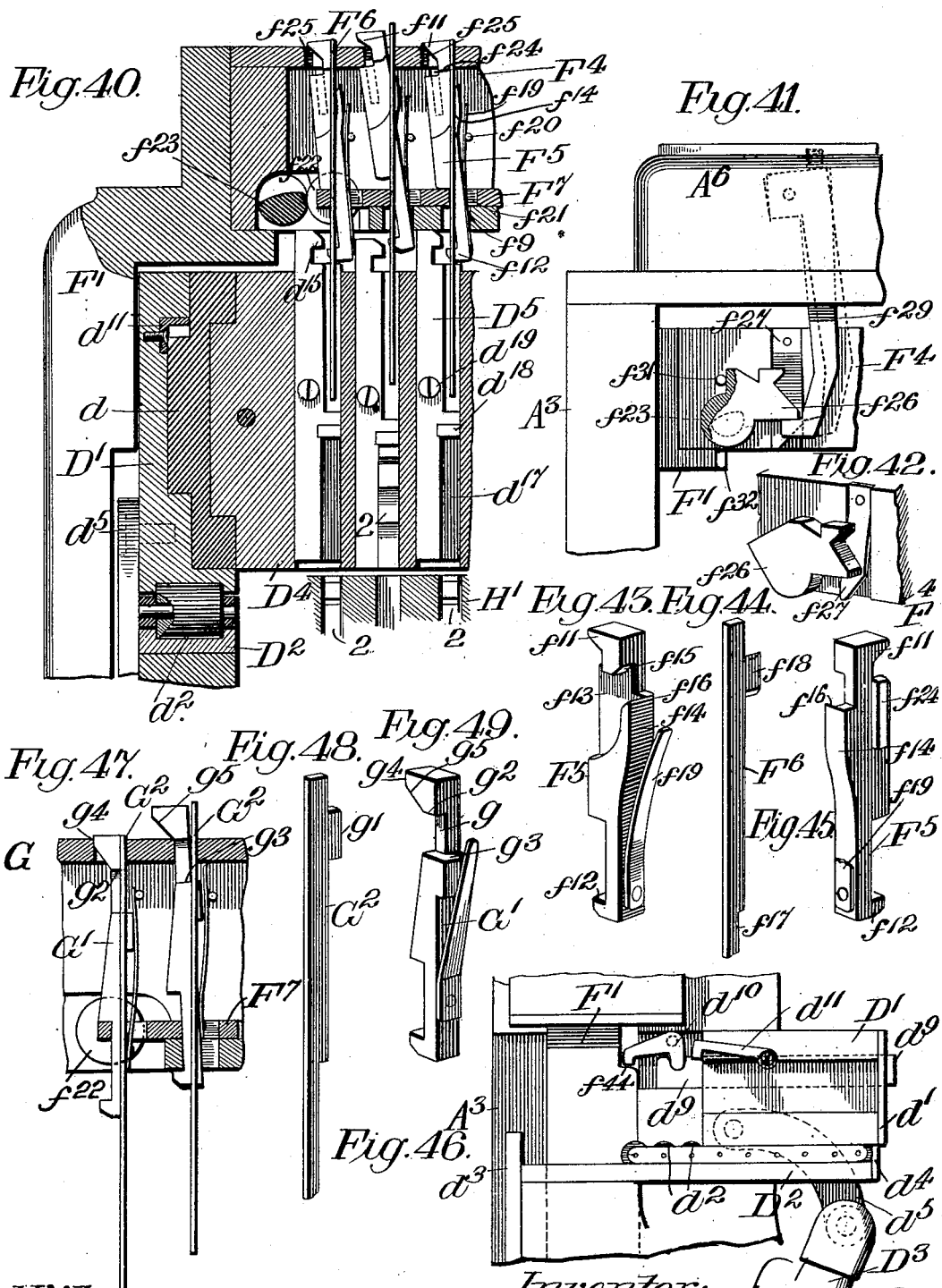

No. 694,307. Patented Feb. 25, 1902.
L. A. BROTT.
MACHINE FOR THE PRODUCTION OF TYPES AND TYPE BARS.
(Application filed Mar. 10, 1900.)
(No Model.) 32 Sheets—Sheet 9.
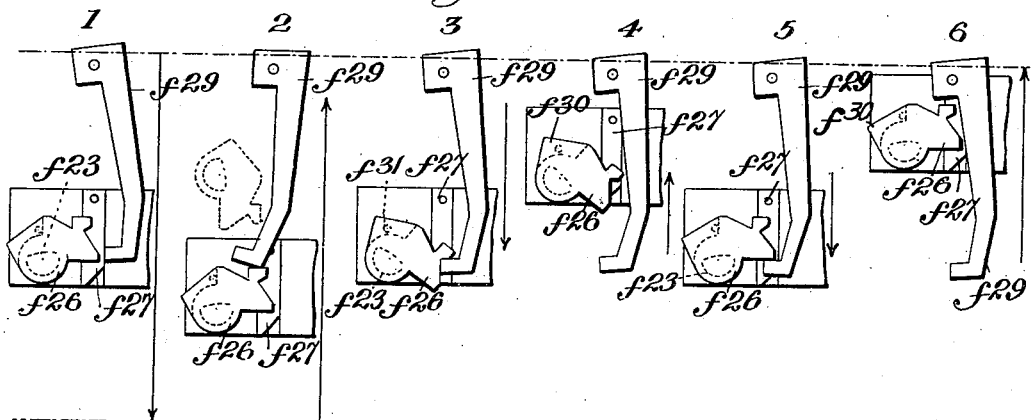
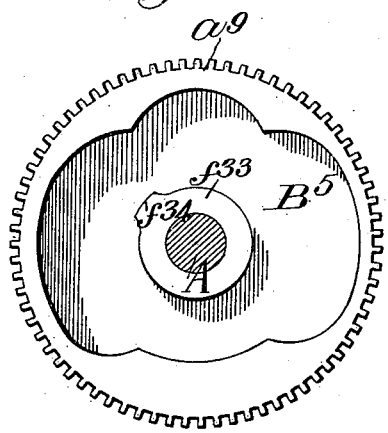
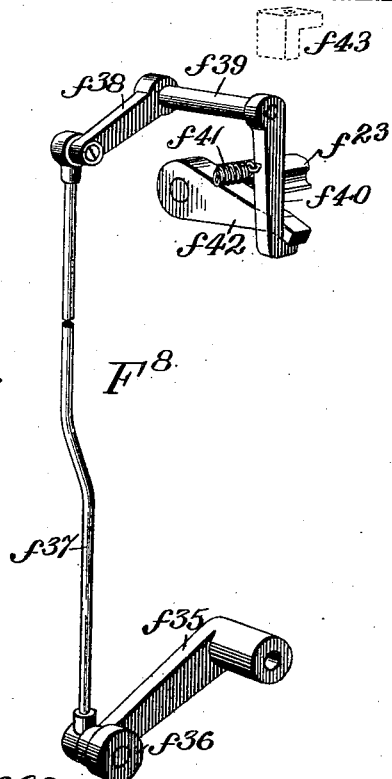
Witnesses:
Jos. C. Stack
Rufus H. Thayer
Inventor:
Lucien A. Brott,
by Walter F. Rogers,
Attorney.

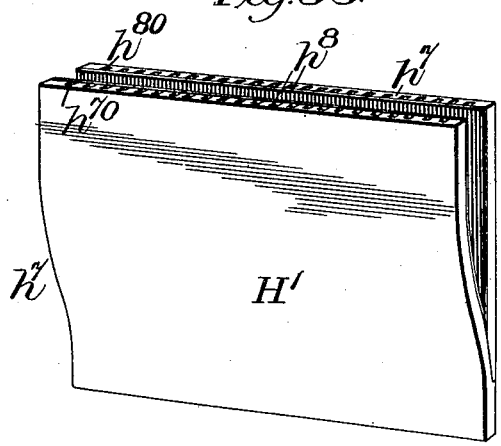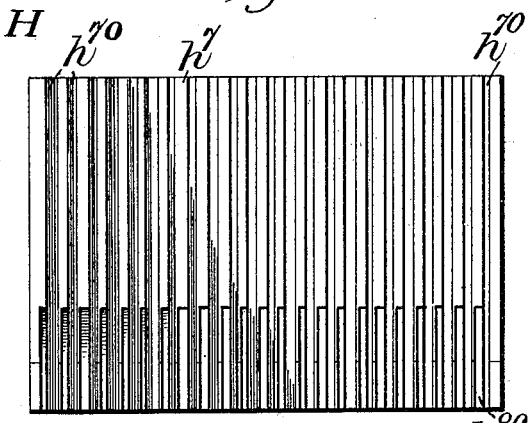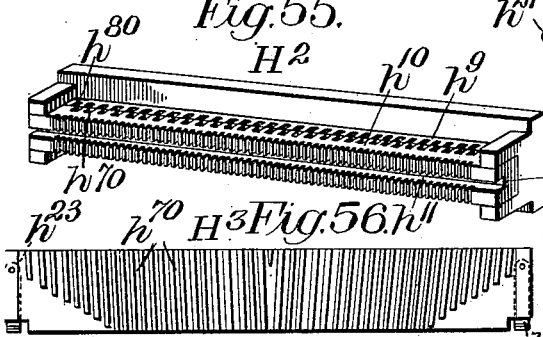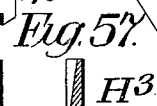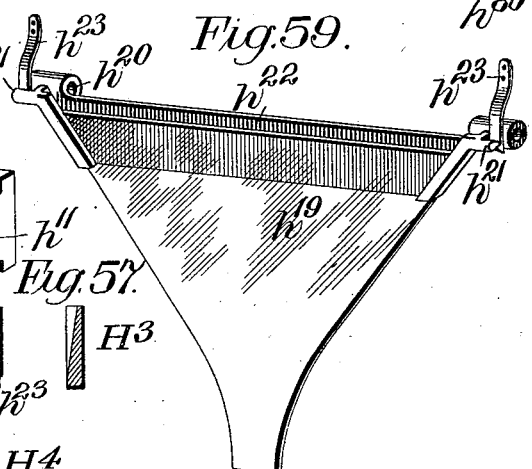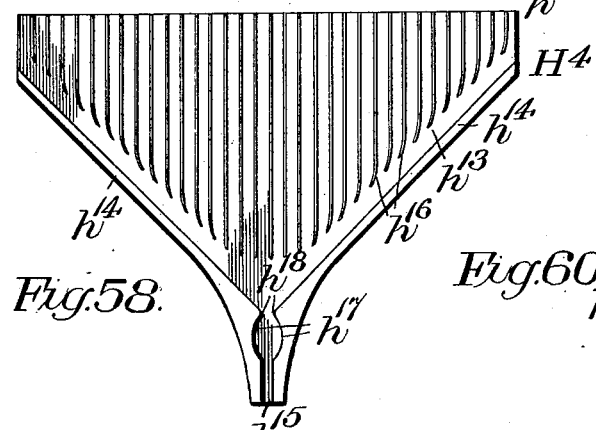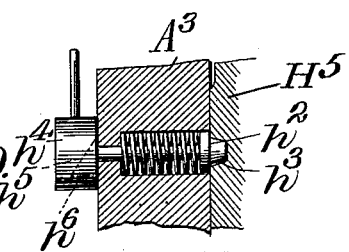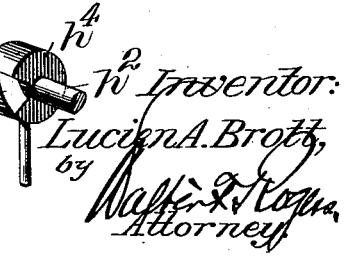

No. 694,307. Patented Feb. 25, 1902.
L. A. BROTT.
MACHINE FOR THE PRODUCTION OF TYPES AND TYPE BARS.
(Application filed Mar. 10, 1900.)
(No Model.) 32 Sheets—Sheet 11.
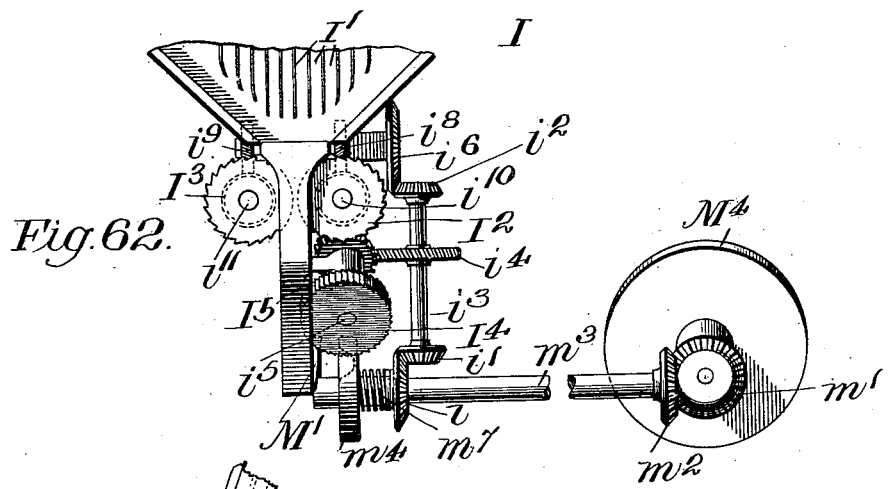
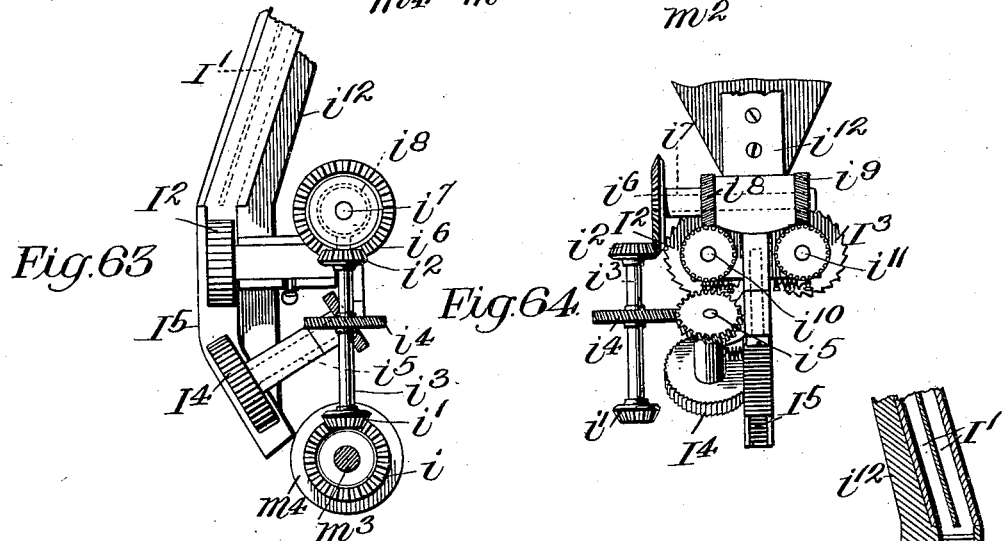
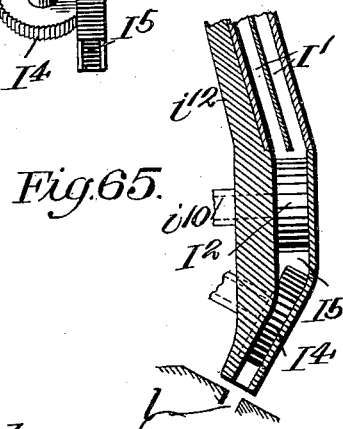
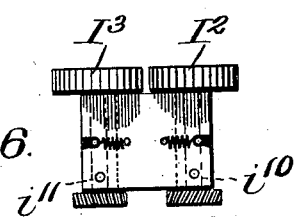
Witnesses: Jos. C. Stack
Rufus H. Thayer
Inventor: Lucien A. Brott,
by Walter T. Rogers
Attorney.

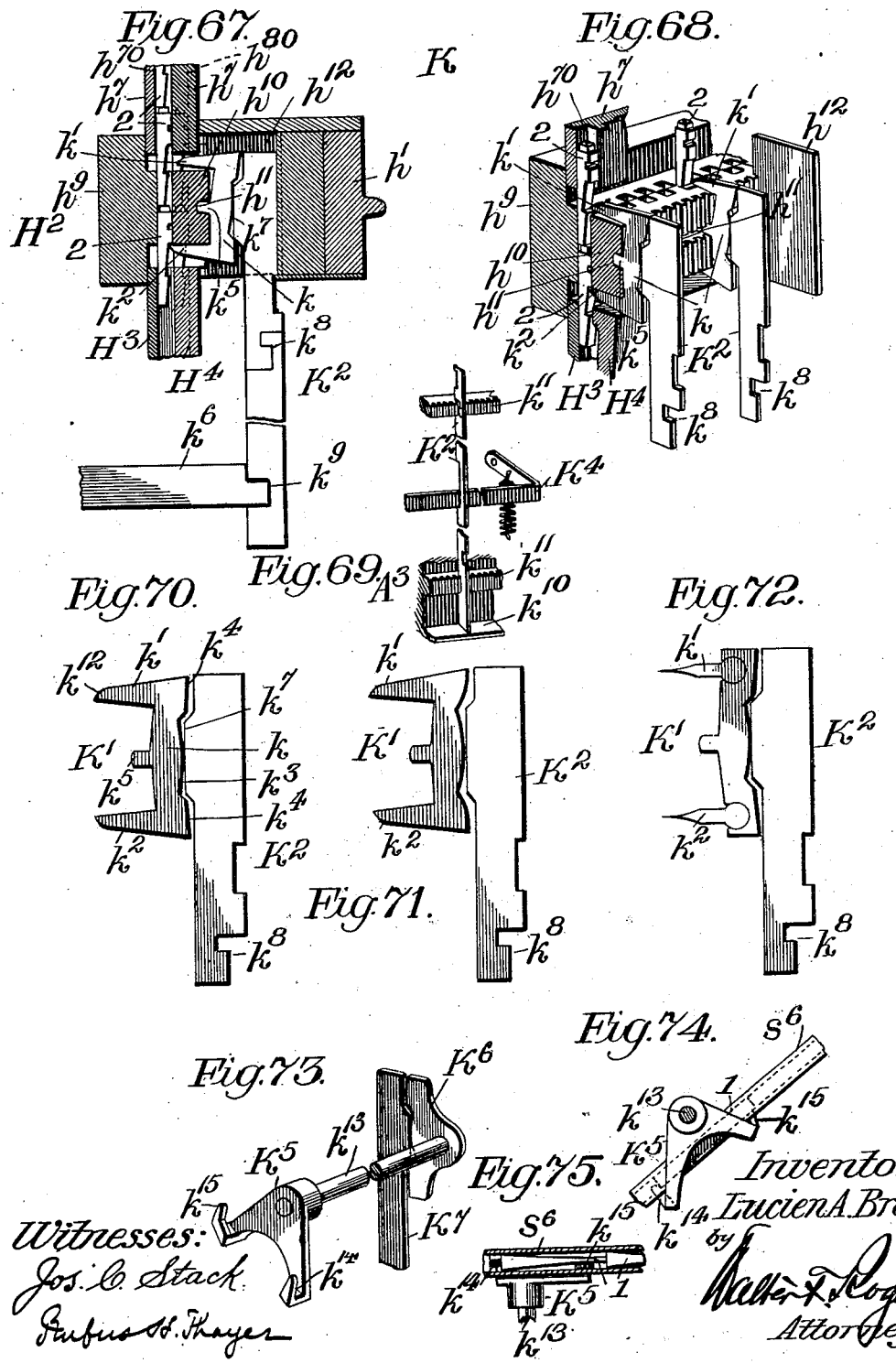

No. 694,307. Patented Feb. 25, 1902.
L. A. BROTT.
MACHINE FOR THE PRODUCTION OF TYPES AND TYPE BARS.
(Application filed Mar. 10, 1900.)
(No Model.) 32 Sheets—Sheet 13.
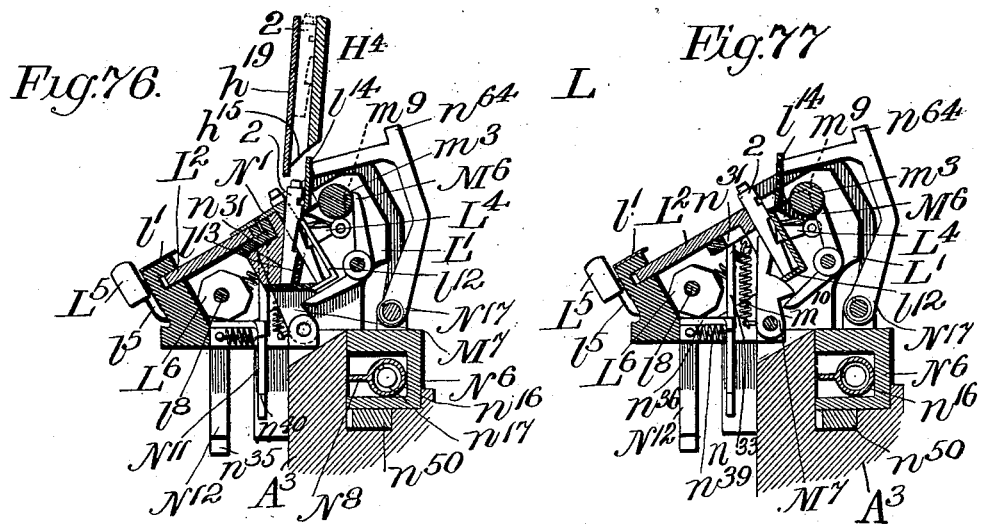
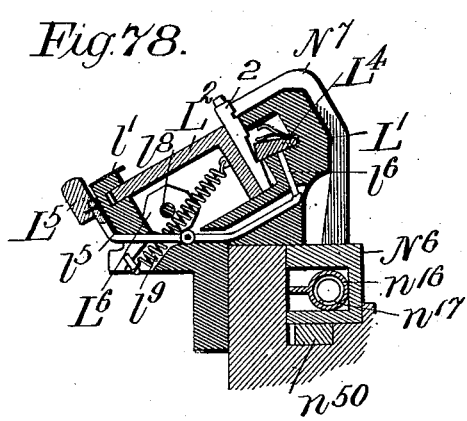
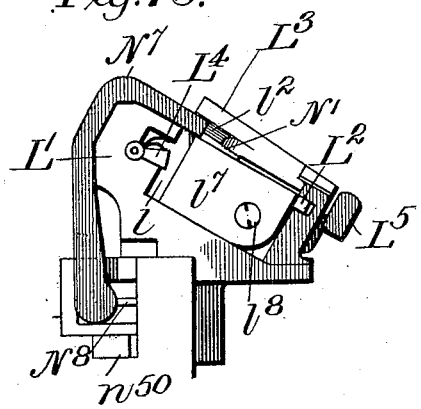
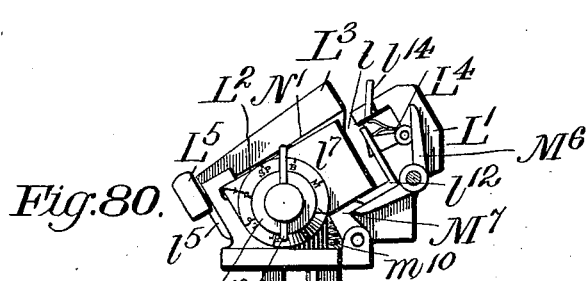
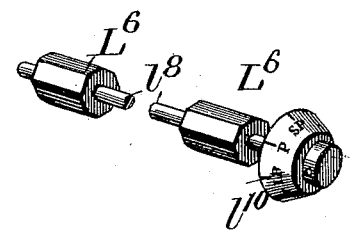

No. 694,307. Patented Feb. 25, 1902.
L. A. BROTT.
MACHINE FOR THE PRODUCTION OF TYPES AND TYPE BARS.
(Application filed Mar. 10, 1900.)
(No Model.) 32 Sheets—Sheet 14.
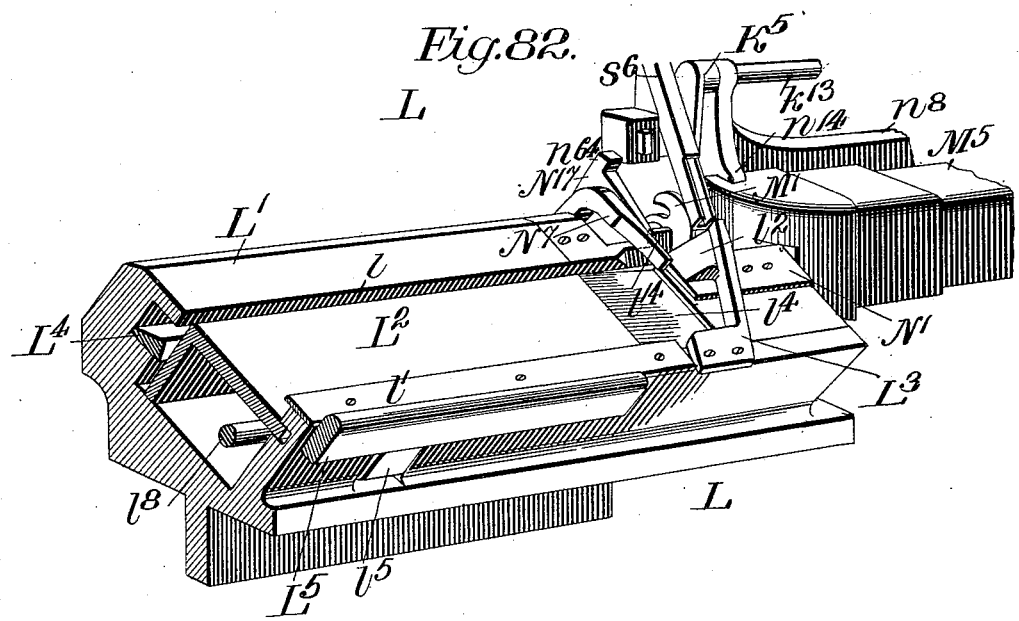

No. 694,307. Patented Feb. 25, 1902.
L. A. BROTT.
MACHINE FOR THE PRODUCTION OF TYPES AND TYPE BARS.
(Application filed Mar. 10, 1900.)
(No Model.) 32 Sheets—Sheet 15.
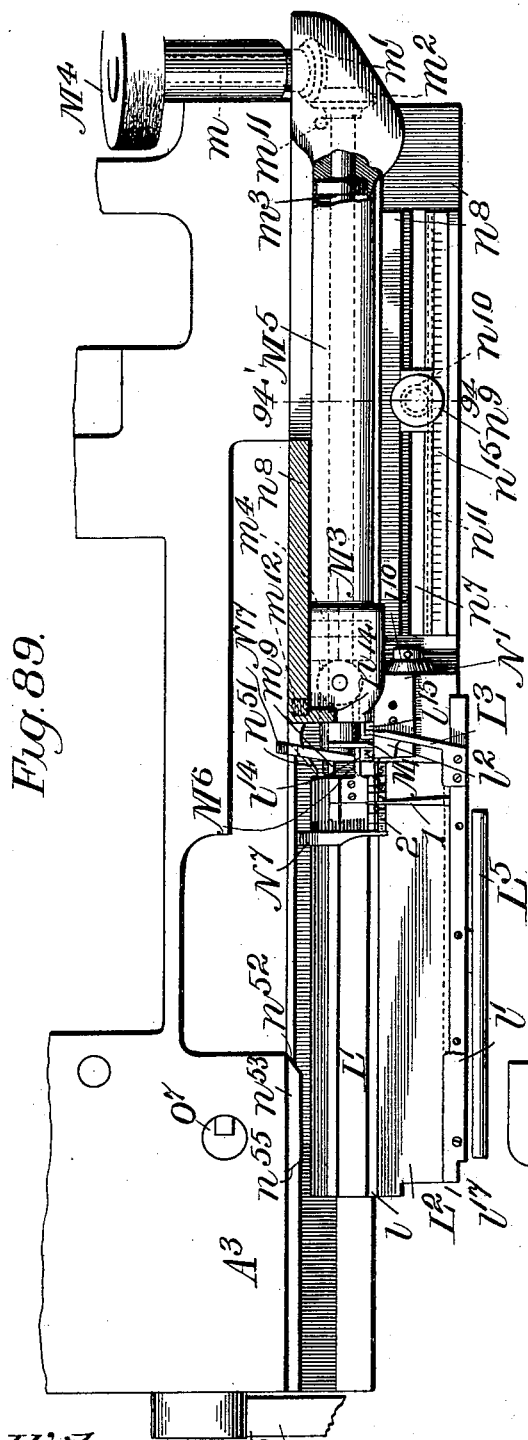
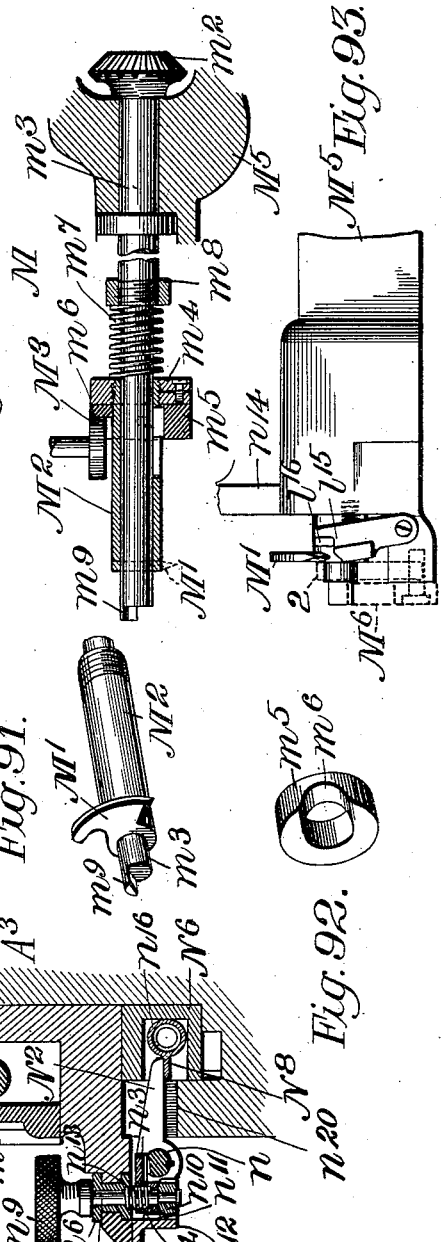
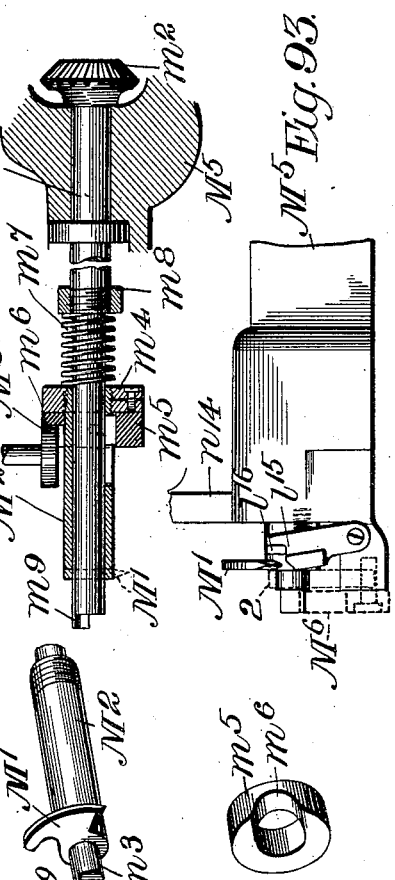
Inventor:
Lucien A. Brott,
by Walter F. Rogers,
Attorney.
Witnesses:
Jos. C. Stack.
Rufus H. Thayer.

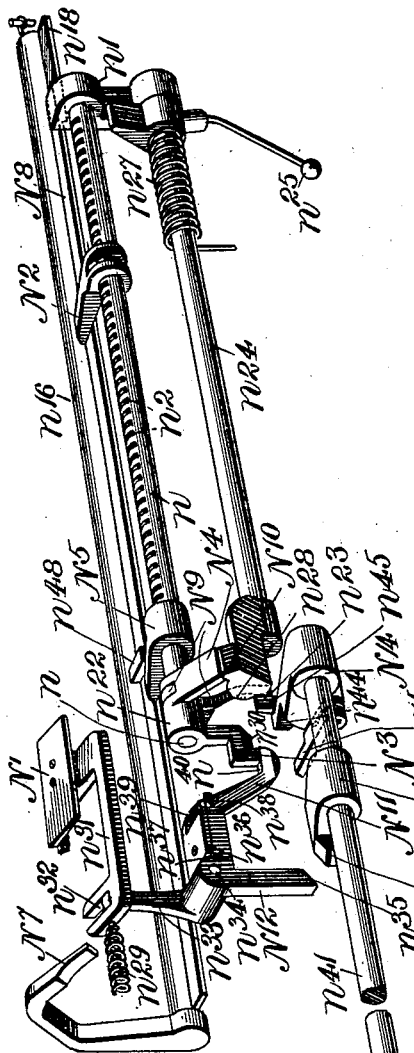

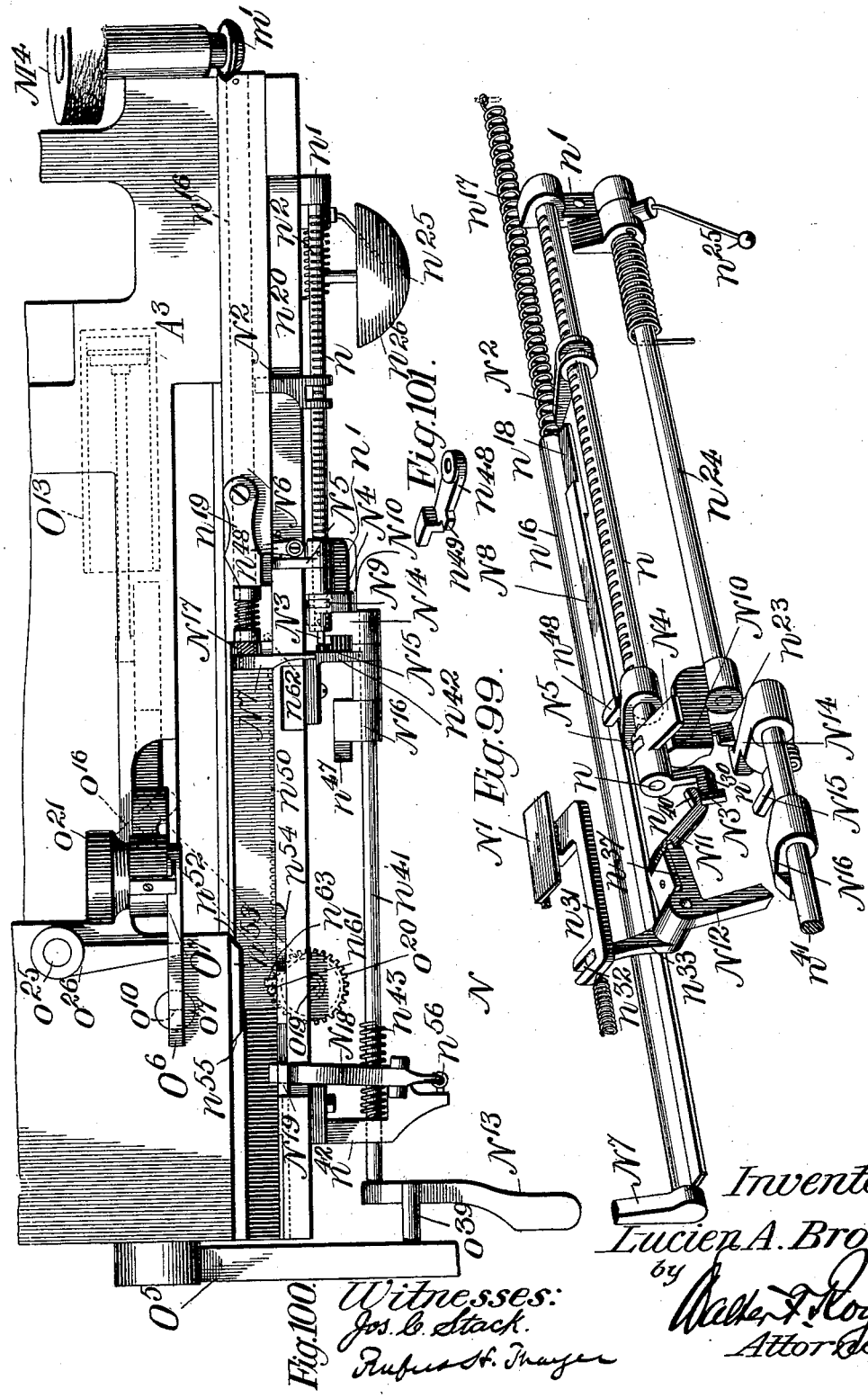

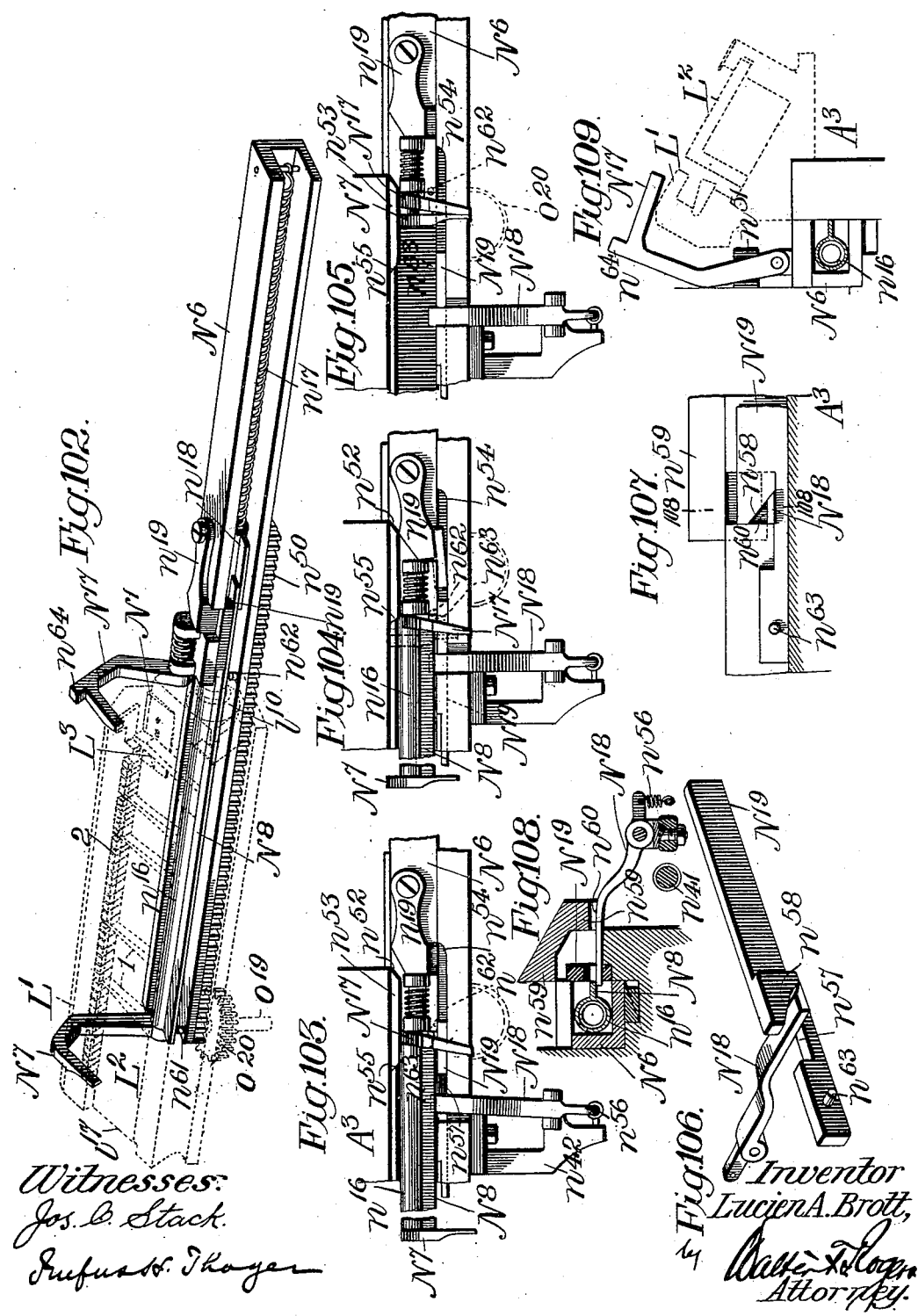

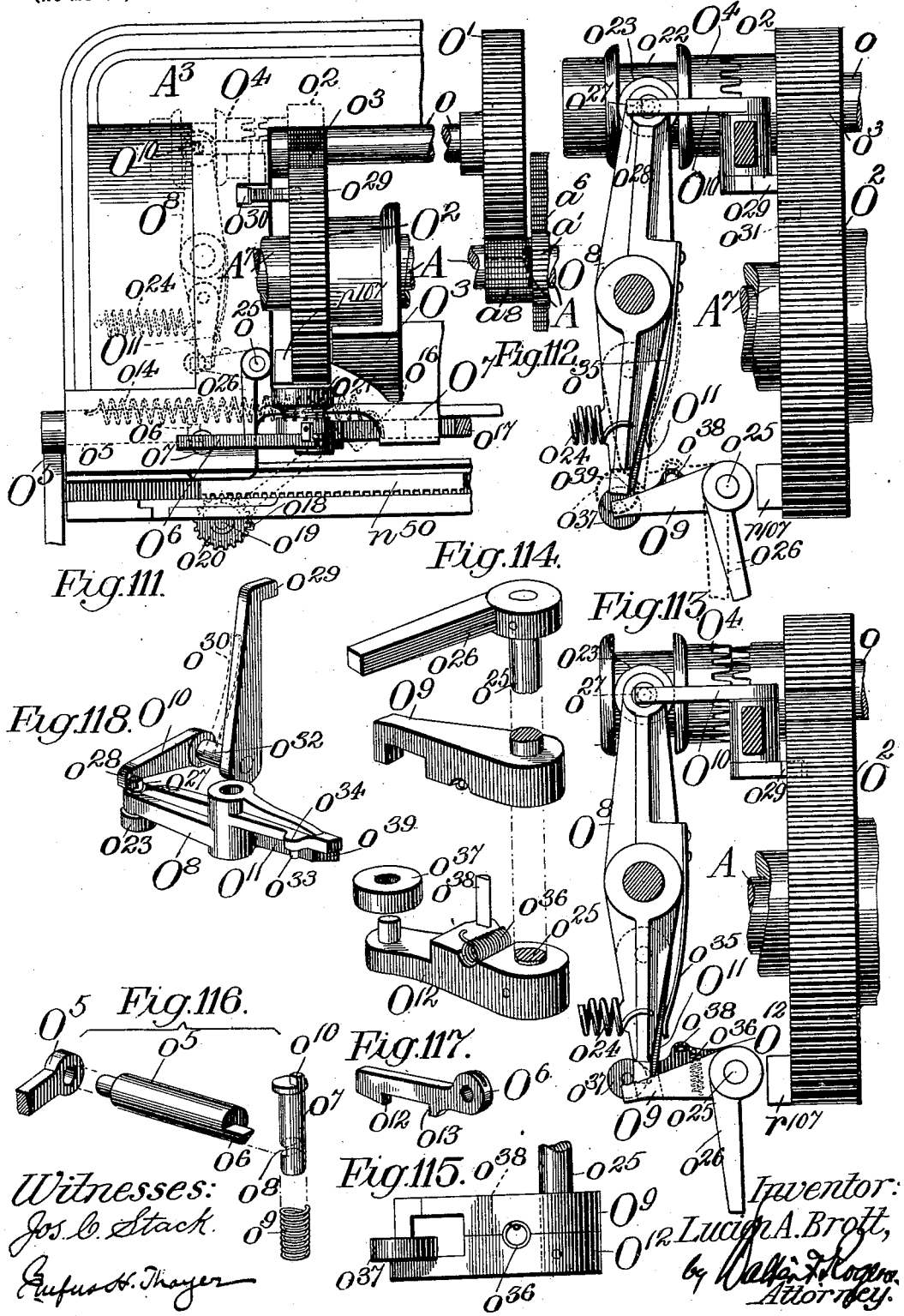

Inventor: Lucien A. Brott,

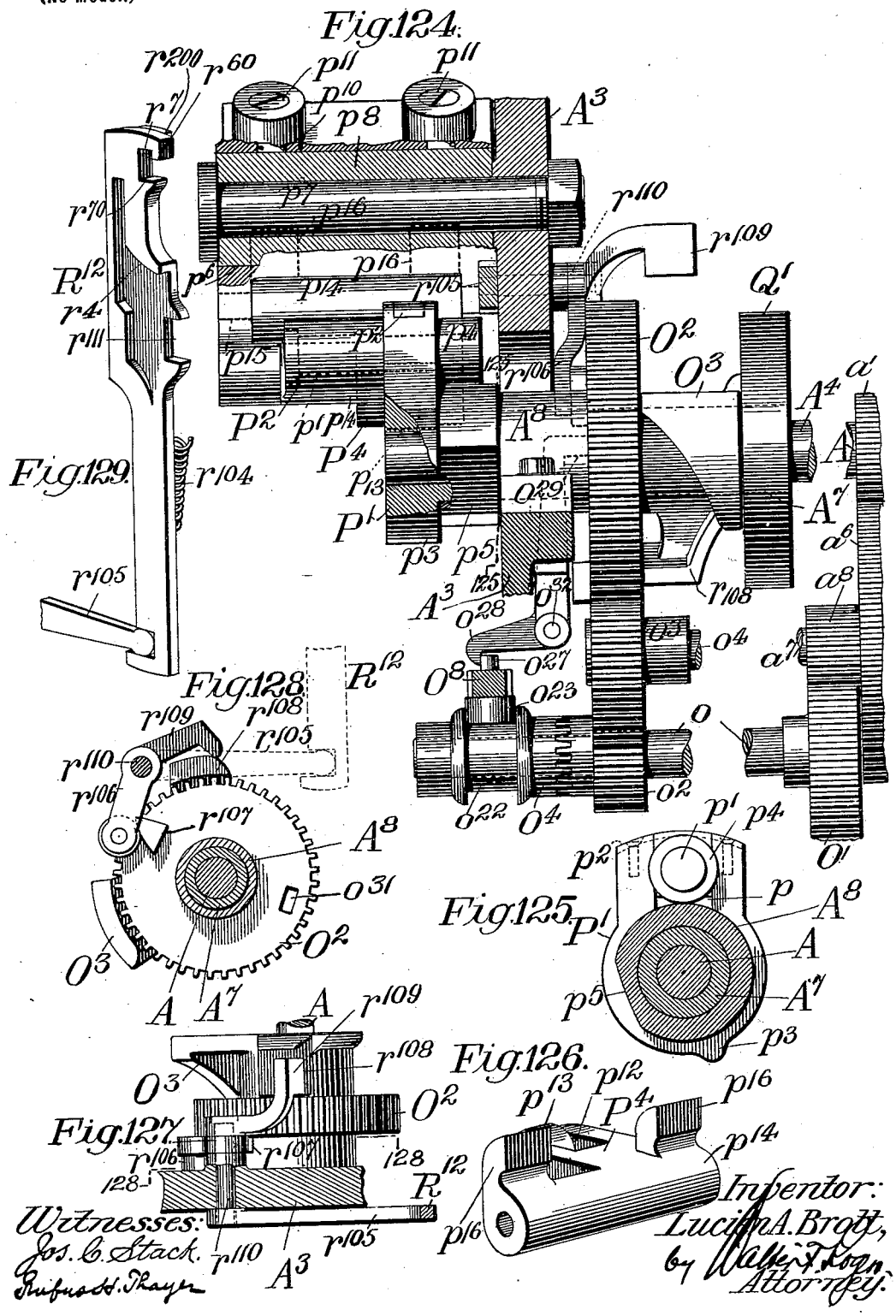

No. 694,307. Patented Feb. 25, 1902.
L. A. BROTT.
MACHINE FOR THE PRODUCTION OF TYPES AND TYPE BARS.
(Application filed Mar. 10, 1900.)
(No Model.) 32 Sheets—Sheet 23.
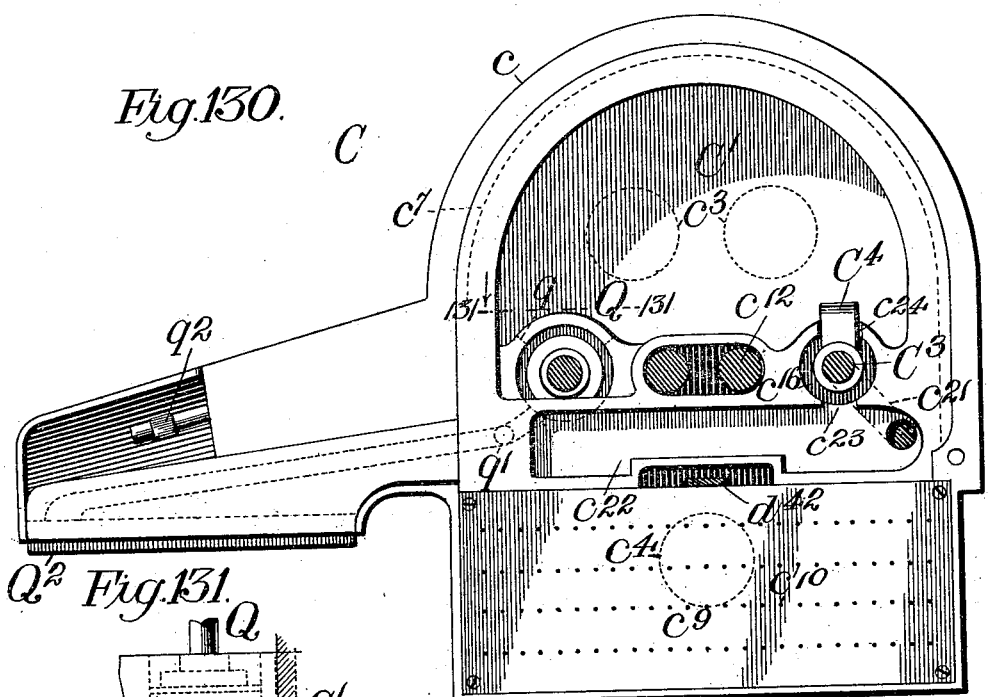
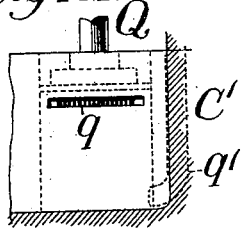
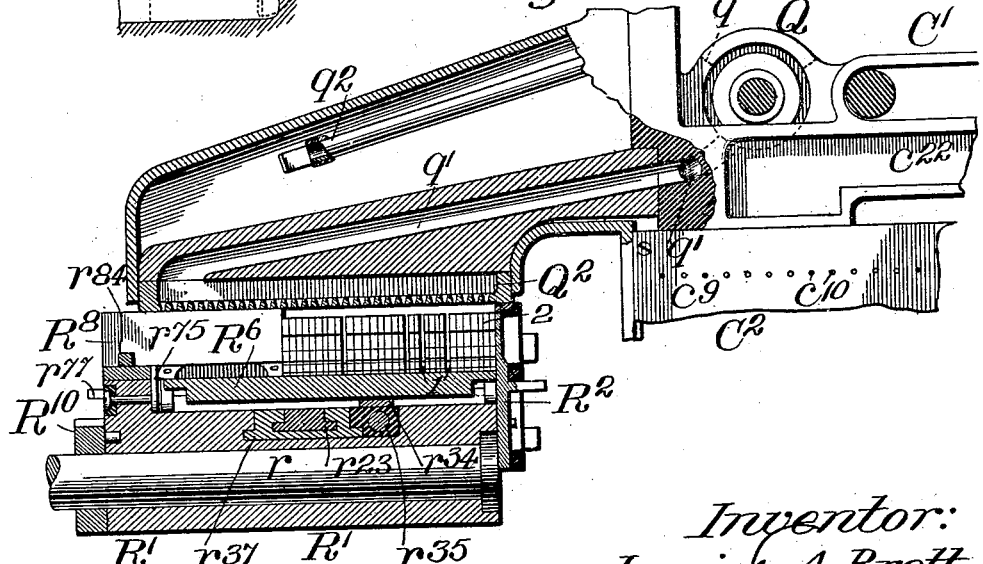

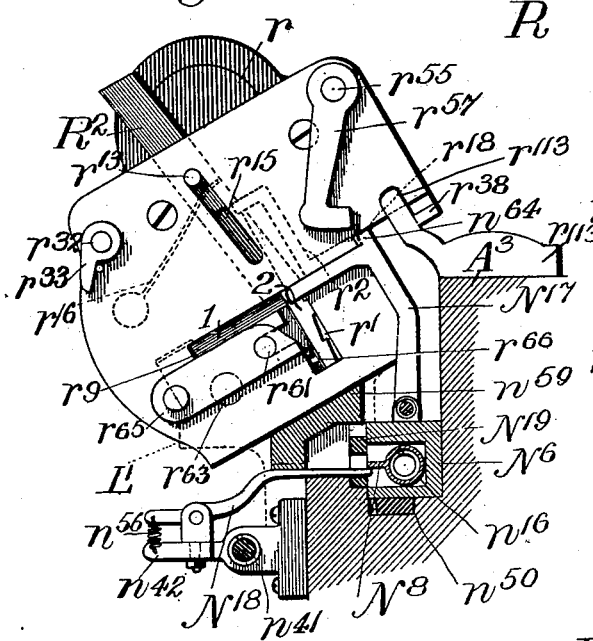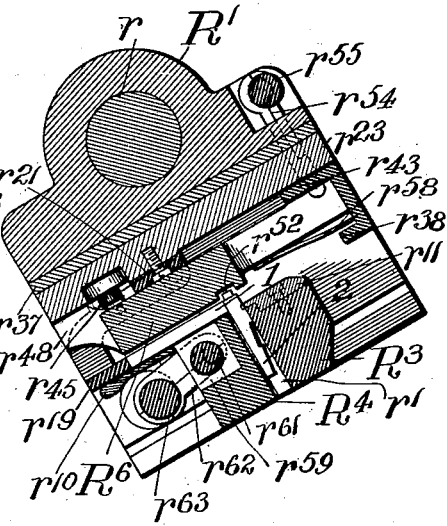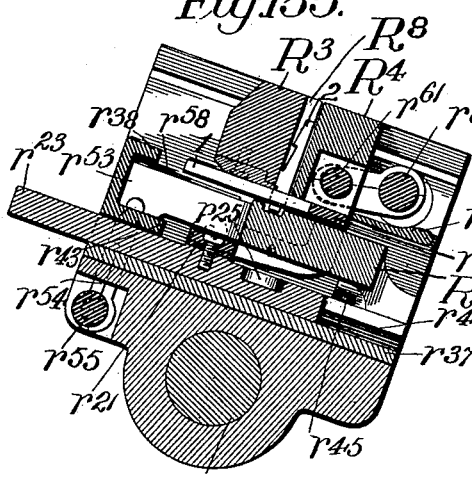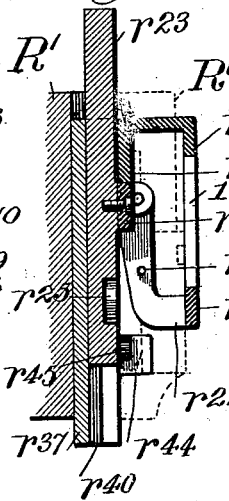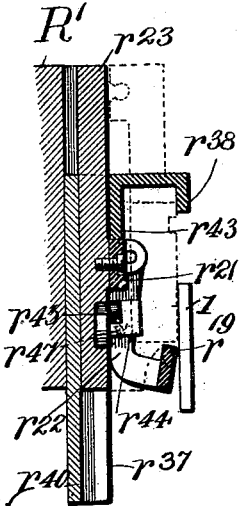

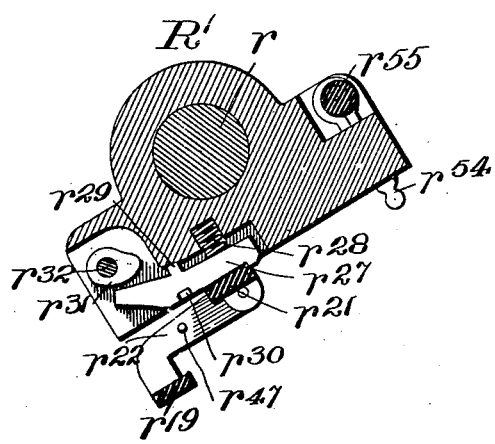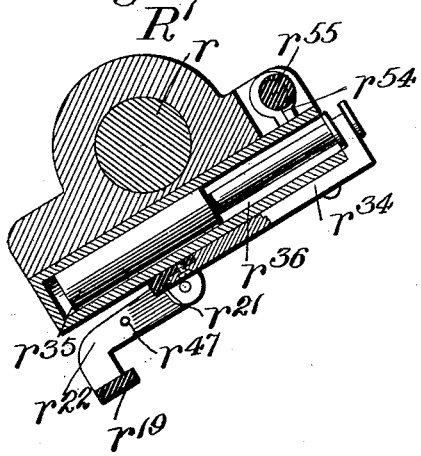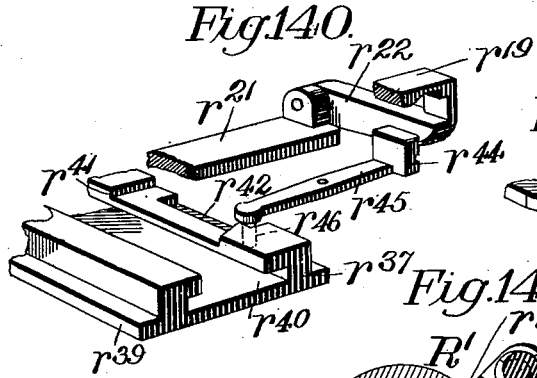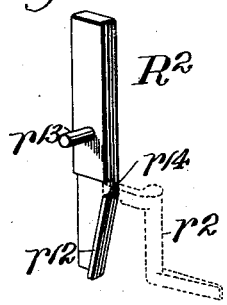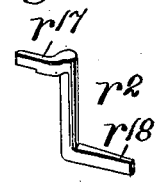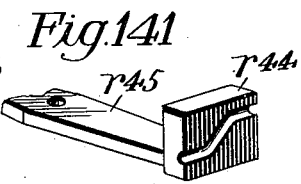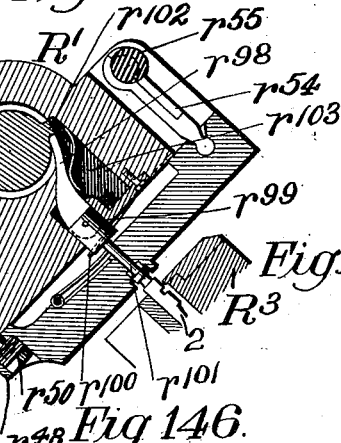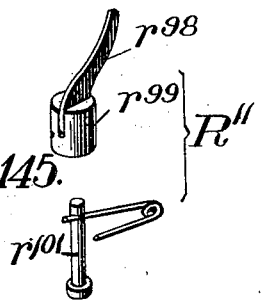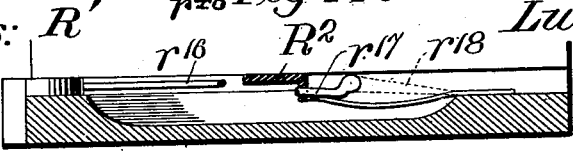

No. 694,307. Patented Feb. 25, 1902.
L. A. BROTT.
MACHINE FOR THE PRODUCTION OF TYPES AND TYPE BARS.
(Application filed Mar. 10, 1900.)
(No Model.) 32 Sheets—Sheet 26.
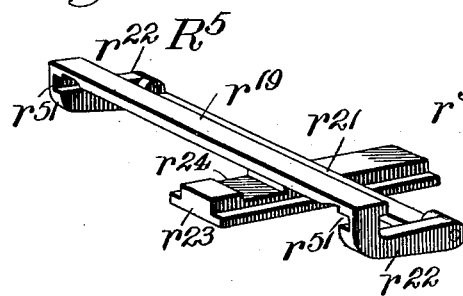
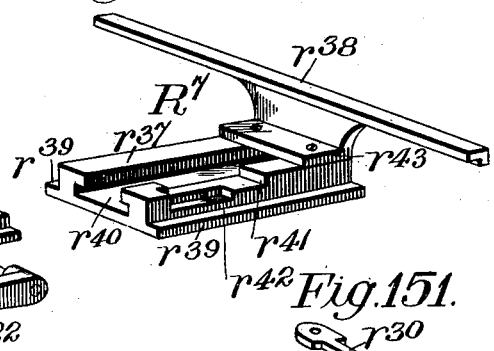
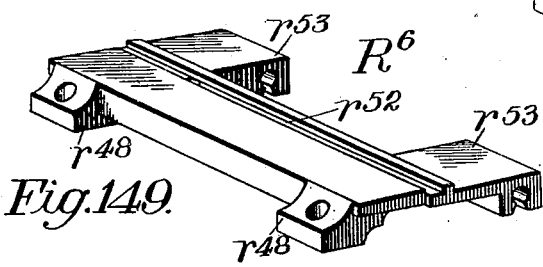
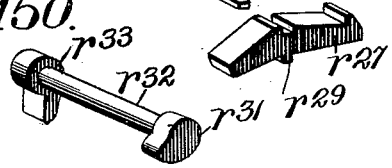
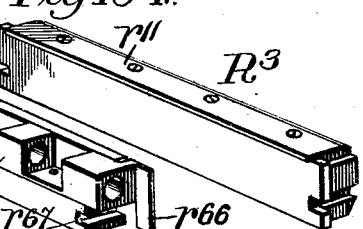
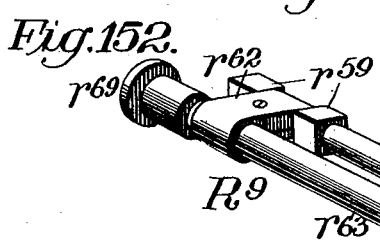
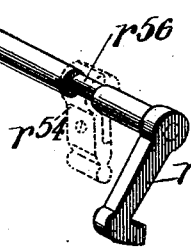
Witnesses:
Inventor:
Lucien A. Brott,
by Walker L. Rogers
Attorney.
THE NORRIS PETERS CO., PHOTO-LITHO., WASHINGTON, D. C.

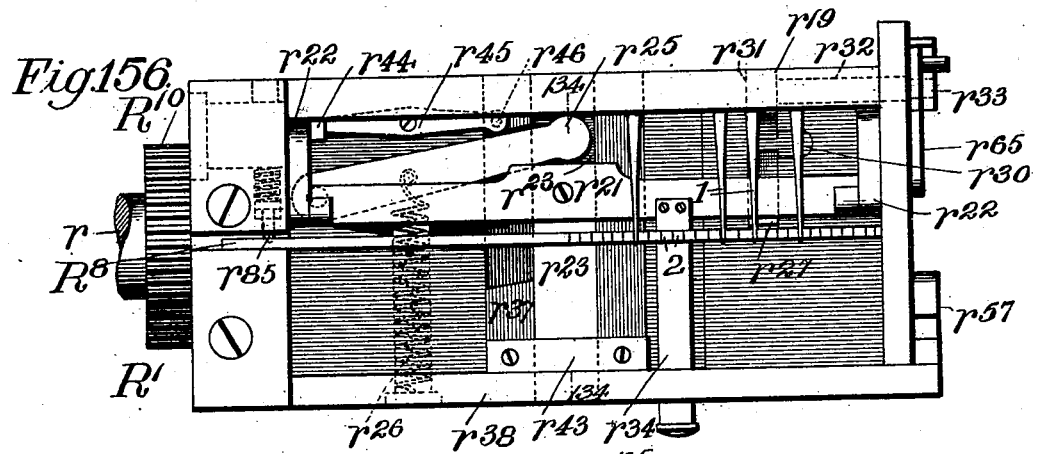
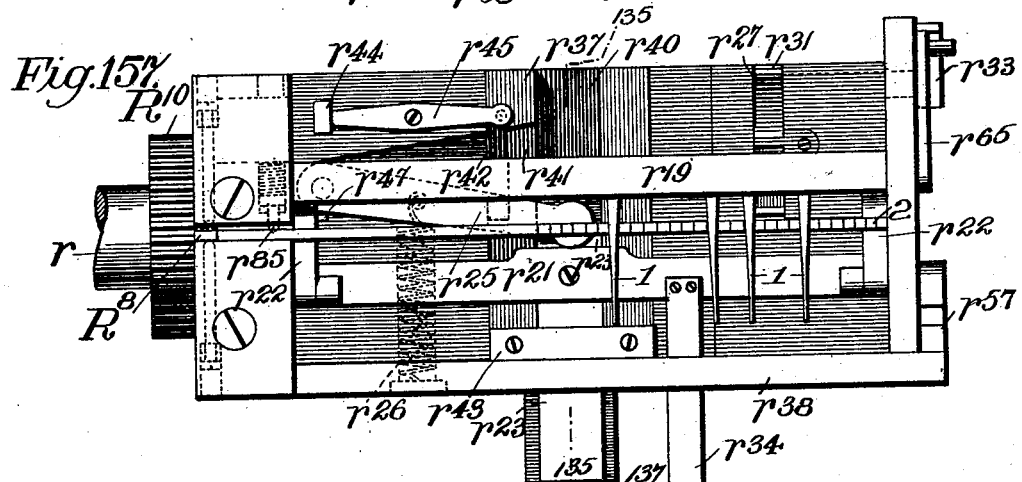
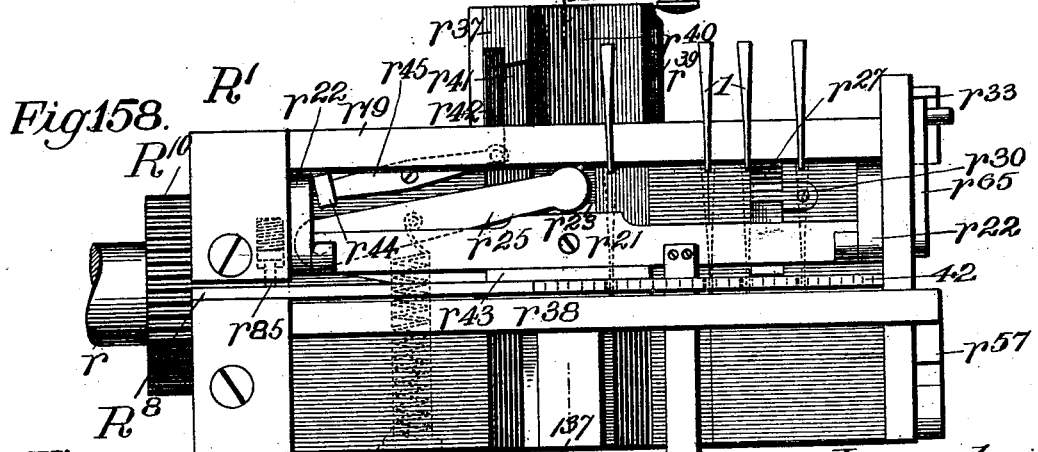

No. 694,307. Patented Feb. 25, 1902.
L. A. BROTT.
MACHINE FOR THE PRODUCTION OF TYPES AND TYPE BARS.
(Application filed Mar. 10, 1900.)
(No Model.) 32 Sheets—Sheet 28.

Witnesses:
Jos. C. Stack.
Rufus H. Thayer.

Inventor:
Lucien A. Brott,
by Walter H. Rogers,
Attorney.

No. 694,307. Patented Feb. 25, 1902.
L. A. BROTT.
MACHINE FOR THE PRODUCTION OF TYPES AND TYPE BARS.
(Application filed Mar. 10, 1900.)
(No Model.) 32 Sheets—Sheet 29.

Witnesses:
Jos. C. Stack.
Rufus H. Thayer.

Inventor:
Lucien A. Brott,
by Walter H. Rogers
Attorney.

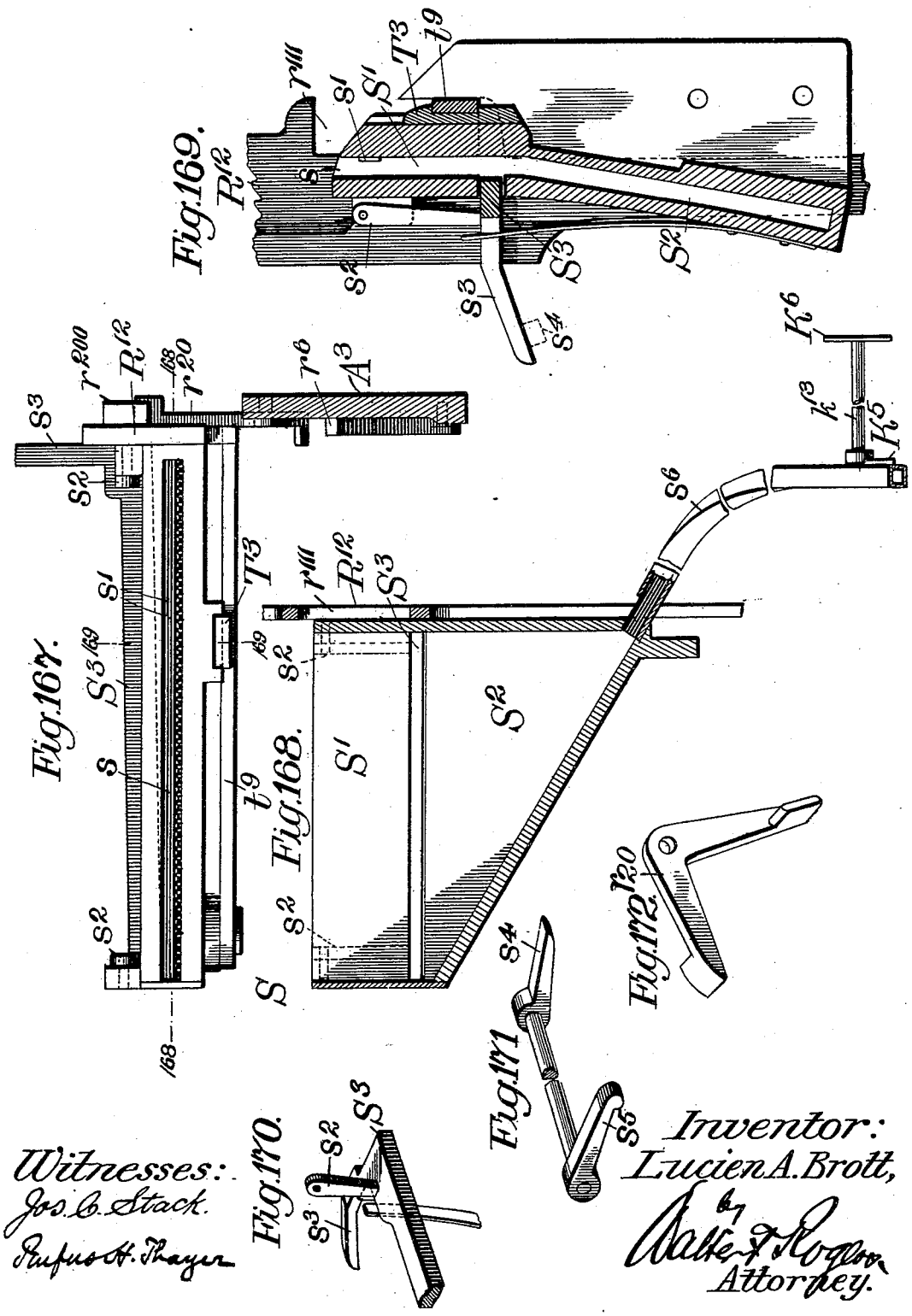

No. 694,307. Patented Feb. 25, 1902.
L. A. BROTT.
MACHINE FOR THE PRODUCTION OF TYPES AND TYPE BARS.
(Application filed Mar. 10, 1900.)
(No Model.) 32 Sheets—Sheet 31.
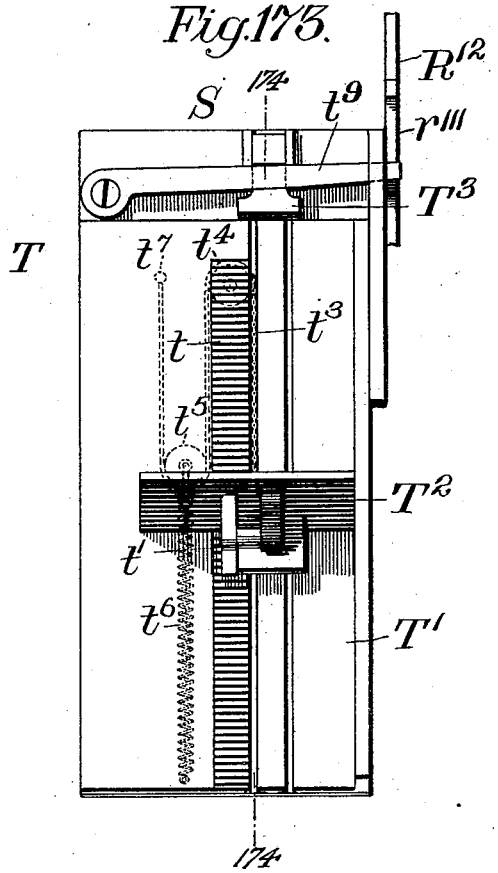
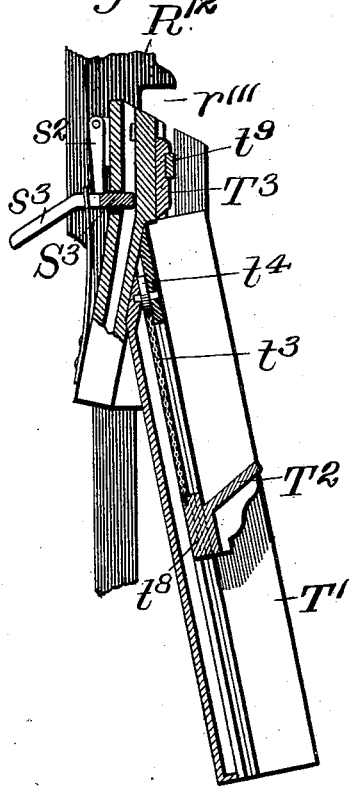
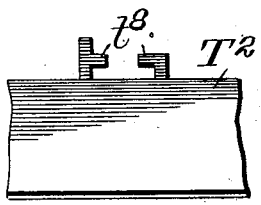
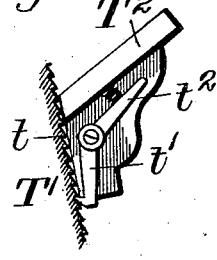
Witnesses:
Jos. C. Stack.
Rufus H. Thayer
Inventor:
Lucien A. Brott,
by Walter F. Rogers,
Attorney.

No. 694,307. Patented Feb. 25, 1902.
L. A. BROTT.
MACHINE FOR THE PRODUCTION OF TYPES AND TYPE BARS.
(Application filed Mar. 10, 1900.)
(No Model.) 32 Sheets—Sheet 32.
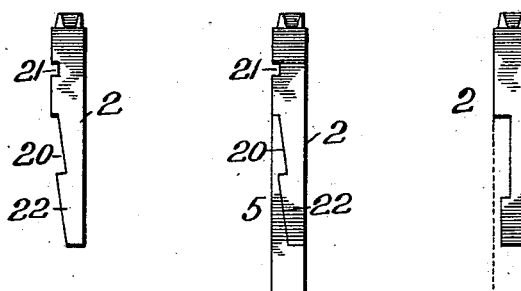
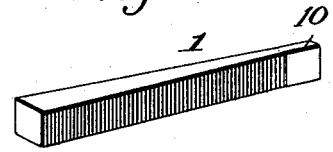
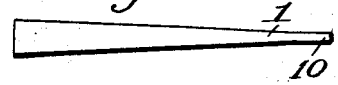
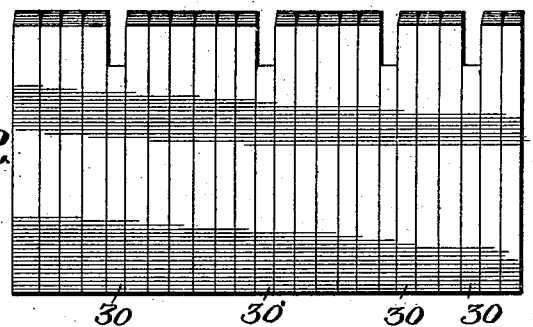
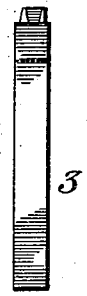
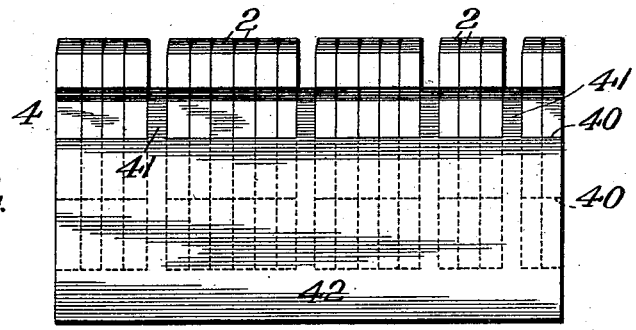
Witnesses:
Jos. C. Stach
Rufus H. Thayer
Inventor
Lucien A. Brott,
by Walker & Cross Attorney.

United States Patent Office.

LUCIEN A. BROTT, OF BROOKLYN, NEW YORK, ASSIGNOR TO THE COMPOSITE TYPE BAR COMPANY, OF JERSEY CITY, NEW JERSEY, A CORPORATION OF NEW JERSEY.

MACHINE FOR THE PRODUCTION OF TYPES AND TYPE-BARS.

SPECIFICATION forming part of Letters Patent No. 694,307, dated February 25, 1902.

Application filed March 10, 1900. Serial No. 8,220. (No model.)

*To all whom it may concern:*

Be it known that I, LUCIEN A. BROTT, a citizen of the United States, residing at Brooklyn, in the county of Kings and State of New York, have invented certain new and useful Improvements in Machines for the Production of Types and Type-Bars; and I do hereby declare the following to be a full, clear, and exact description of the invention, such as will enable others skilled in the art to which it appertains to make and use the same.

My invention as herein claimed is an improvement upon or additional to the invention described in my application, Serial No. 600,492, filed July 25, 1896, upon which a patent is to be granted of even date with this. Inasmuch as this patent discloses many modifications of the details of the earlier application and many additional features, I have retained the opening statement and brief of the invention, so that whichever patent may be read the general scope of the invention as disclosed and claimed in the earlier application and companion patent, as well as the proper relation of the distinctive features, may be clearly understood.

The article and the method herein described are the subjects, respectively, of my applications, Serial No. 643,105, filed July 1, 1897, and Serial No. 686,970, filed July 23, 1898, which are to be patented of even date with this.

The particular inventions herein claimed as improvements upon the invention as described and claimed in the companion patent based upon my aforesaid application, Serial No. 600,492, of July 25, 1896, are generally in the melting-pot, the molds and mold-carrier, the mold-operator, the composing elements, the bar-block, the justifier-magazine, and the bar-galley.

My invention pertains to the typographic art; and it particularly relates to that class of machines in which single types are cast in molds and assembled for printing; but it also and especially involves as the object of the invention the transformation of a line of such assembled units into a type-bar distinctive in general appearance and different in construction and type effect from any line of type or bar hitherto produced by any machine known to me.

The invention comprises mechanism to cast the units of a line of differing characters and to assemble these units into a line, then to permanently space the line and at the same time bind together the units to produce a type-bar of any desired length bearing characters of the most perfect formation and type effect and applicable to book, magazine, newspapers, or any other class of printing. Briefly, I combine in a single compact organized machine type-setting and line-transforming means or type-casting, type-storing, type-assembling, and bar-forming means.

My machine differs in principle from other machines, and it operates upon new lines in the manner and order of obtaining the cast type, regulating the supply thereof, assembling the units into a line, and regulating the formation, character, and transfer of the line and includes also new ideas of justification and alinement and a new means for binding together the units of a line by casting additional metal between and upon them, thus, in effect, at once producing and applying to the line all the required permanent spaces and transforming the line into a type-bar.

The machine which I have perfected includes the parts and mechanisms which by careful study and experiment I have found to be adapted to carrying out my system. While it will be obvious to any one skilled in the art who reads the description that many modifications of the parts may be adapted to perform the necessary functions, I have purposed describing the best means hitherto devised for so doing.

In my machine I cast simultaneously in sets of molds a series of types bearing different characters, having recessed and reduced shanks, by means which are susceptible of the most accurate arrangement with reference to the different widths of the several types, and I provide separate receptacles for the several types in the form of a compact magazine organized to accord exactly with the casting devices and to deliver the types with precision. I completely surround each matrix by its mold, the matrix being made in and a part of the mold or firmly fixed in the mold, so that it need not be separated from the mold and is not exposed and comes in contact with nothing but the molten metal.

In my machine the types are released from the molds and permitted to fall by gravity into the proper channels of the magazine. They are brought over a magazine. The molds are drawn away from them, leaving them hanging to a shank-block, which has a face projecting into the type-cavity to form recesses and a reduced shank on the type. The type is knocked off the shank-block and is at once free to fall into the magazine, the returning mold absolutely insuring the discharge of any type accidentally held.

I provide a mechanism for determining and regulating the feed of type to the channels of the magazine, so that no type shall be supplied to a full channel and so that the supply shall always be governed by the demand.

The regulating mechanism is operated by the column of type in a channel. When the channel is full, the device for releasing the types for that channel is thrown out of operation, so that it may not act to release the type last cast from the mold. The type then remains in and occupies the mold and prevents any further casting of that particular character until there is a demand for it, whereupon and without any care or attention on the part of the operator the supply is continued.

The magazine, which receives the type, and the escapement device, which is operated from the keyboard, may be of the usual constructions; but I prefer my inventions hereinafter described, by means of which I store in a compact space all the necessary types, a channel for each character or kind, and discharge them as required with a minimum of mechanism.

The magazine and the escapement are arranged to receive and sustain the types upright and to release a single type at a time with certainty. In my preferred system the recessed types stand end to end or in columns in the channels, each column carrying a distinct type, the shoulders of the types fitting the channels and the reduced ends clearing the inner reach of the fingers of the escapement-detents.

The escapement-detent is in one piece, and one movement releases a particular type and at the same time prevents the remainder from escaping, and the connection with the key-lever is the simplest possible—a free or detached bar—requiring no exact or measured movement to attain the desired result.

The composing or assembling mechanism receives the types upright, and I am enabled by my system to keep the types substantially upright throughout the storing and composing, thereby economizing space and time and simplifying the machine.

The composed types lie in an inclined type-channel, so that the line may be read as formed.

As the line is composed it is fed forward step by step by a type-packer of my invention, being locked in the type-channel by a bar which engages recesses in the shanks of the type.

The locking-bar may at the will of the operator be withdrawn and any of the types may then be removed. The line is moved away from the assembling-point either automatically at the completion of the line or at the will of the operator after the substantial completion of the line. The devices for shifting the line are locked against movement, either automatically or by the operator, until after an alarm has sounded, so that an incomplete line may not be transferred from the composing-block. The composing or assembling mechanism comprises means for regulating the length of the line and also means for regulating the width of the type-channel, both of which can be adjusted without any change in the mechanism, all the connected parts accommodating themselves at once to any regulation.

The line is composed with justifiers lying across the line ready to be forced in. The preferred justifiers are of wedge shape, except at the apexes, which have rectangular parallel faces. The rectangular apexes lie between the words, forming temporary spaces. The mechanism for transferring the line from the composing-block to the part, the "bar-block," which is to transform the line into a bar is organized to act quickly and surely and to forward the line and instantly return to engage the succeeding line.

In the bar-block the line is justified, alined, clamped, and presented to a mouth of the melting-pot. The metal is then cast about the shanks of the types, running up to the justifiers into the recesses and forming a base on the bottom of the line, so that the type-bar is strengthened and also made "type-high."

The bar-block is wiped across the mouth of the melting-pot, the justifiers are discharged and fall into a magazine of my invention, from which they are fed in order to the composing mechanism, and the type-bars are discharged to a bar-galley, where they are maintained in order for use and open to constant inspection.

The types I cast are incomplete—that is, short, recessed, and preferably reduced. They are peculiarly fitted to form elements of the composite type-bar I produce, and they are also especially fitted to enable me to readily store and handle them in large numbers and to readily control them in assembling.

The type-casting, type-storing, composing, and bar-forming elements, while having distinct functions, are all arranged with reference to the complete organized machine and the final product.

It will be observed that in carrying my system into effect I dispense with troublesome and costly movable matrices and with the mechanism necessary to handle and distribute them, thus at once avoiding a primary cause of expense and complication. Having but one and a fixed matrix for each individual type character, it is obvious that it may be made perfect and of the most durable material, so that the character cast thereupon will be more distinct, of sharper angles, and better formation than when movable matrices are used or when linotypes are formed by indentation. In case of a character in frequent requisition it may be of advantage to have its matrix multiplied; but in the most extreme case the number is limited, and the proportion is practically the same as in other machines in use, for the number of interchangeable matrices of the same character must be likewise multiplied in machines using them. The careful work done upon the face of the type is expended only upon that part of the type which is in all typographic machines required to be as perfect as the circumstances permit.

The peculiar opportunities presented by my system for producing accurate type-faces provide, at the same time, for a subsequent accurate alinement, for I bring down upon the faces of the types assembled and justified a level surface, securing thereby a correct alinement of any length of line. While the types are so alined I cast metal about their shanks and produce a composite type-bar bearing carefully and separately formed characters in accurate alinement.

My manner of using the types enables me to pay small attention to the finish of the shanks of the types, and, as stated, I purposely cast them less than the regular type height they have in the finished line or bar, so that the final casting about the line may add a solid base to them and make the type-bar strong.

The new principles and the specific details of the type casting and storing elements and the composing elements, or, considering them conjointly, of the type-setting division of my machine, while being improvements in the type-setting art, have constant reference to the distinguishing essential principle of my organized machine, the conversion or transformation of the line into a bar which shall have all the printing characteristics of a line of individual characters and yet be free from the difficulties of handling inherent in a line.

In short, while seizing the advantages pertaining to type-casting and type-setting machines I secure all the long familiar advantages of a spaced line or a type-bar by my mechanism for uniting the types by spaces cast between the words. I accomplish automatic justification and at the same time produce a type-bar, and with these qualities, at the same time, my machine has all the advantages of the best machines in use in its capacity for continuous, automatic, and rapid work, with the additional advantages of being small, compact, cheap, and doing perfect work without requiring skilled care and attention and without becoming inoperative.

Figure 21:
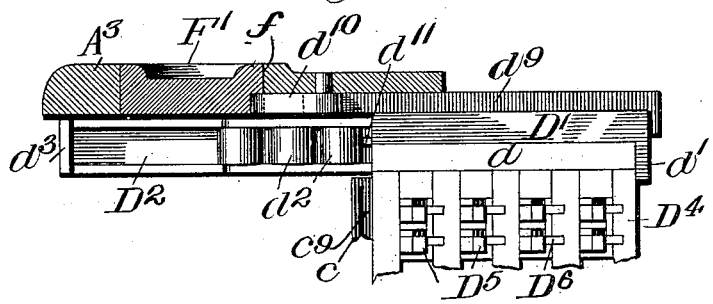
Figure 23:
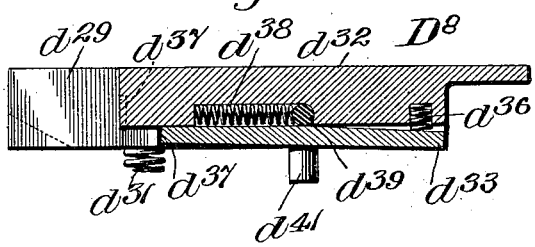
Figure 22:
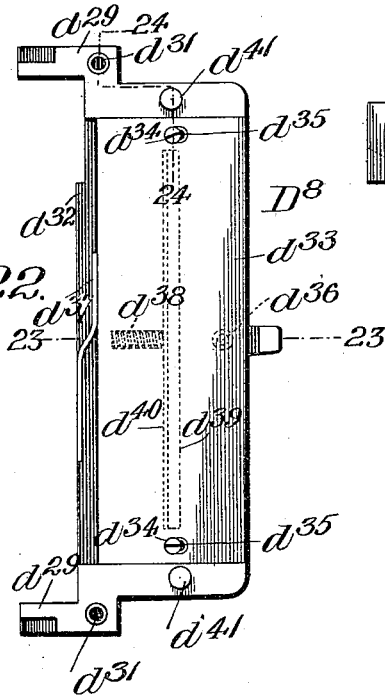
Figure 24:
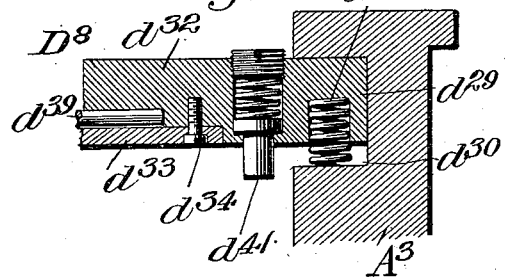
Figure 110:
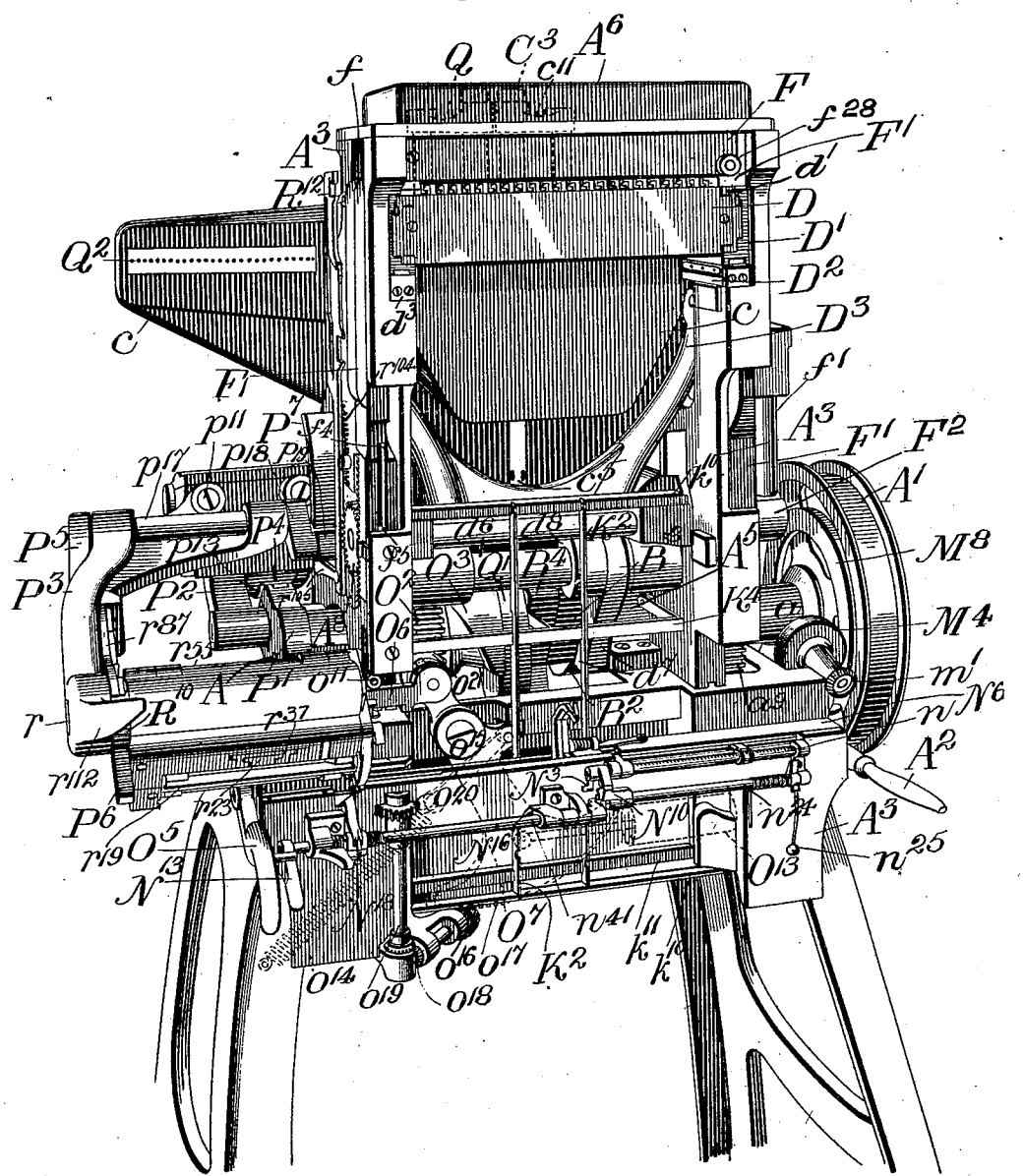
Figure 119:
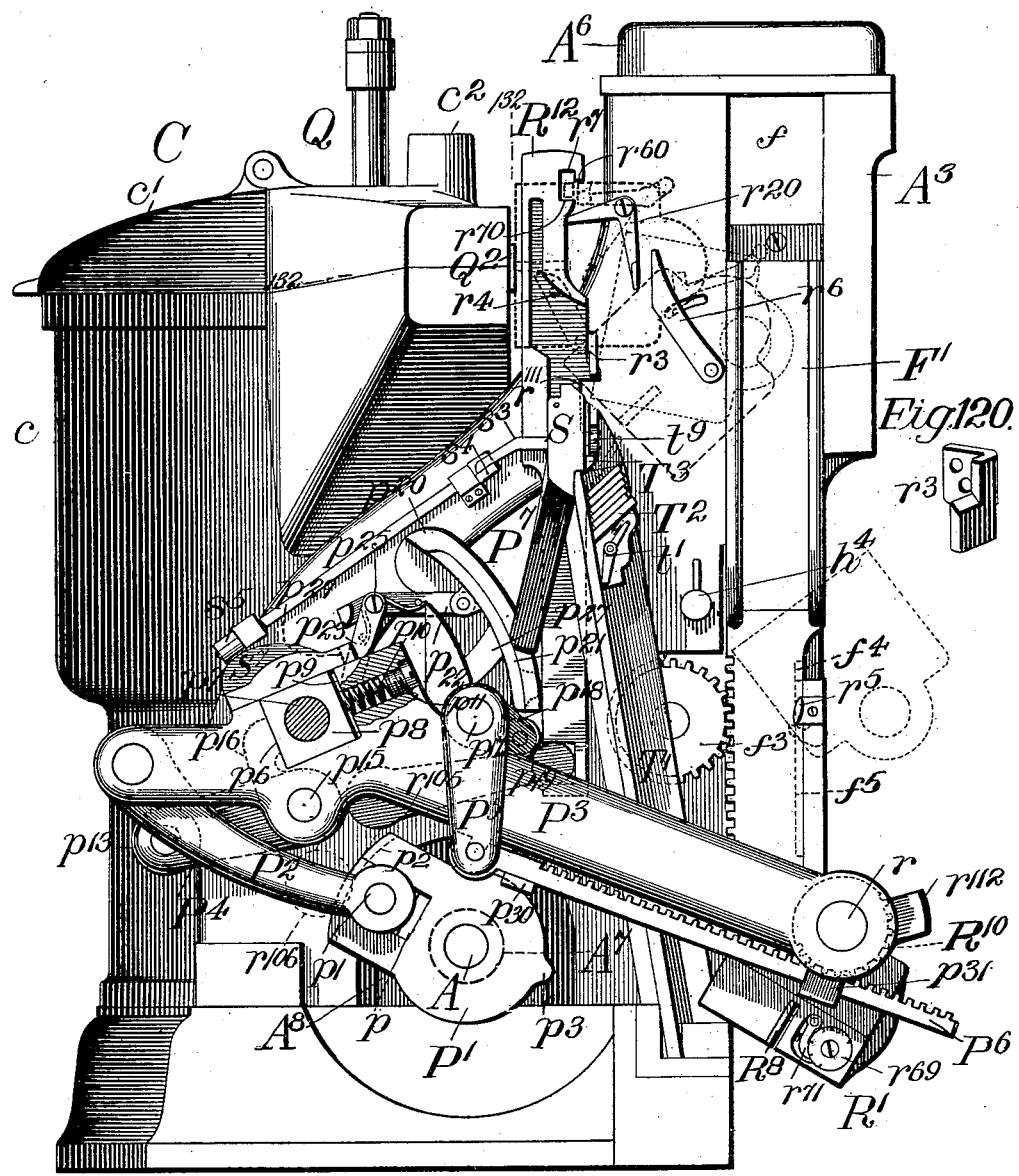

In the accompanying drawings, Figure 1 is a perspective view of the machine as a typesetter, taken from the right-hand side, some of the parts on the other side being omitted. Fig. 2 is a central longitudinal section through the actuating mechanism necessary to operate the type-setting division, the major part of the bar-forming section of said mechanism being omitted. The dotted line x x in this figure represents an imaginary division of the operating mechanism. Fig. 3 is a detail of the gearing, showing the transfer of the power from an initial gear through the machine. Fig. 4 is a detail of a gear-wheel. Fig. 5 is a detail section through a roller of an arm of the mold-operator mechanism. Fig. 6 is a detail of pump-cam and coacting shoe. Fig. 7 is a view of one of the cams for actuating the yoke of the mold-carrier. Fig. 8 is a detail section showing the pivotal mounting of arms of the mold-operator mechanism. Fig. 9 is a detail of the gear of the transferring mechanism. Fig. 10 is a section through the machine, taken on an irregular line to illustrate more fully the type-setting elements. Fig. 11 is a partial plan of the melting-pot and mouthpiece, showing the passage for the molten metal. Fig. 12 is a detail plan of the mold-carrier. Fig. 13 is an enlarged vertical section on the line 13 13 of Fig. 12, indicating the relation of parts while the type is being cast. Figs. 14 and 15 are similar sections showing the molds in action freeing the cast type. Fig. 16 is a section on line 16 16, Fig. 13. Fig. 17 is a section on line 17 17, Fig. 13. Fig. 18 is a section on line 18 18, Fig. 14. Fig. 19 is a detail illustrating a mold in perspective. Fig. 20 is a detail illustrating the type-freeing mechanism located in the mold-carrier. Fig. 21 is a partial plan of the mold-carrier and supporting means, illustrating the manner of imparting the initial movement. Fig. 22 is an inverted plan of the presser-plate. Fig. 23 is a section of Fig. 22 on line 23 23. Fig. 24 is an enlarged detail section on line 24 24, Fig. 22. Fig. 25 is a partial plan of a modified form of mold-carrier. Fig. 26 is a section on line 26 26 of Fig. 25, showing the relative arrangement of the parts coöperating with the mold-carrier during the casting of type. Fig. 27 is a like view showing the manner of releasing the type, so that it is free to fall. Fig. 28 is a section on line 28 28 of Fig. 26. Fig. 29 is a section on line 29 29 of Fig. 27. Fig. 30 is a section on line 30 30 of Fig. 26. Fig. 31 is a section on line 31 31 of Fig. 25, carried through the superimposed presser-plate and the mouthpiece underneath the mold-carrier. Fig. 32 is a view of a modified mold. Figs. 33 and 34 are details of elements. Fig. 35 is a partial plan of the mold-operator, the first series of fingers being omitted to disclose the configuration of the openings in which they are seated. Fig. 36 is a horizontal section taken on the line 36 36 of Fig. 37. Fig. 37 is a vertical section on line 37 37 of Fig. 35, showing the descent of the feelers into the magazine. Fig. 38 is a similarly-located view illustrating the engagement of the mold by the fingers of the mold-operator. Fig. 39 is a detail view. Fig. 40 is a section on the same line as Figs. 37 and 38, showing the release and return of the molds. Fig. 41 is a detail showing the mechanism for actuating certain elements of the mold-operator. Figs. 42-45 are detail views of elements. Fig. 46 is a detail view of the carriage provided for the reception of the mold-carrier. Fig. 47 is a detail section of a modified form of mold-operator. Figs. 48 and 49 are views of modified elements. Fig. 50 is a diagrammatic view illustrating the movements of the mold-operator. Fig. 51 is a view of the cam for operating the mechanism shown in Fig. 52. Fig. 52 is a detail of means for actuating one of the elements of the mold-operator. Fig. 53 is a view of one-half of the upper section of the type-magazine. Fig. 54 is a detail of a plate of the type-magazine. Fig. 55 is a view of the intermediate section of the type-magazine. Fig. 56 is a detail of a section of the type-magazine. Fig. 57 is a section of Fig. 56. Fig. 58 is a view of the chute-division of the type-magazine. Fig. 59 is a detail of the covering provided for the chute. Figs. 60 and 61 are detail sections of the means for releasing from the machine proper the frame supporting the several sections composing the magazine. Fig. 62 is a detail of an attachment which may be applied to the chute-division of the magazine and the type-packer. Fig. 63 is an elevation of the mechanism shown in Fig. 62. Fig. 64 is a rear elevation of Fig. 62. Fig. 65 is a central section through the discharge-chute of Fig. 62. Fig. 66 is an inverted plan of the yielding gears controlling the discharge of type in the attachment. Fig. 67 is a detail section illustrating the manner of controlling the discharge of the type by means of the escapement. Fig. 68 is a sectional perspective of the same. Fig. 69 is a detail illustrating the manner of guiding and returning to normal position the detent-actuating bar of the escapement. Fig. 70 is a detail of the detent and actuating-bar of the escapement. Fig. 71 is a view of a modified escapement. Fig. 72 represents another modification. Fig. 73 is a view of the escapement provided for the temporary justifiers. Fig. 74 is a side elevation of the same. Fig. 75 is a section through the justifier-chute. Fig. 76 is a section of the composing-block, showing the type in its initial position as discharged into the composing-block. Fig. 77 is a section of the composing-block, showing the type tilted after having been forwarded by the type-packer. Fig. 78 is a central transverse section through the composing-block. Fig. 79 is an end elevation of the composing-block. Fig. 80 is an elevation of the opposite end from that shown in Fig. 79. Fig. 81 is a detail view of the polygonal adjusters. Fig. 82 is a perspective detail of a portion of the composing-block and type-packer housing. Fig. 83 is a partial plan of the composing-block. Fig. 84 is a detail section of the composing-block on line 84 84, Fig. 83. Fig. 85 is a transverse section of the composing-block. Fig. 86 is a detail of the line-shifter. Fig. 87 is a detail of a portion of the composing-block. Fig. 88 is a detail of a guide for the justifiers. Fig. 89 is a plan of the composing-block, line-gage, and type-packer. Fig. 90 is a longitudinal section of the type-packer mechanism. Fig. 91 is a detail of the type-packer. Fig. 92 is a view of the cam-collar for controlling the movements of the type-packer. Fig. 93 is a detail illustrating the manner of supporting the type in its initial position in the extension of the composing-block. Fig. 94 is a section on the line 94 94, Fig. 89. Fig. 95 represents the line-gage and line-shifting mechanism in its normal position. Fig. 96 is a view of the same subsequent to the sounding of the alarm. Fig. 97 is a transverse section of Fig. 95. Fig. 98 is a like view taken through Fig. 96. Fig. 99 represents the position the parts illustrated in Figs. 95 and 96 assume by reason of the automatic shifting of the line. Fig. 100 is a plan of the line-transferring mechanism. Fig. 101 is a detail of a latch. Fig. 102 is a detail of the transfer-carriage, showing the composing-block in dotted lines. Figs. 103-105 are details of different stages in the movement of the transfer-carriage. Fig. 106 is a detail, and Fig. 107 is an elevation, of elements of the transfer mechanism. Fig. 108 is a section on line 108 108, Fig. 107. Fig. 109 is a detail elevation illustrating the withdrawal of the finger guarding the type upon the return of the transfer-carriage to its normal position. Fig. 110 is a perspective of the machine, the magazine and composing-block being omitted. Fig. 111 is a detail plan of the clutch-shifting lever and means of communicating power. Fig. 112 is a detail plan of the clutch mechanism, showing the clutch closed. Fig. 113 is a similar view showing the clutch-opening and the controlling lever. Figs. 114-118 are details of the clutch mechanism. Fig. 119 is a side elevation of the machine, taken from the left and illustrating in dotted lines the positions of the bar-block during the various operations of its parts. Figs. 120-123 are details. Fig. 124 is a detail vertical section through the bearing of the arm carrying the bar-block, also illustrating the means for communicating motion. Fig. 125 is a transverse section on line 125 125 of Fig. 124. Fig. 126 is a detail. Fig. 127 is a detail cross-section. Fig. 128 is a section on line 128 128 of Fig. 127. Fig. 129 is a view of a slide which coöperates with the bar-block. Fig. 130 is a plan of the melting-pot and mouthpieces for type and bar forming, the cover being removed. Fig. 131 is a section on line 131 131 of Fig. 130, showing the bar-pump.

Figure 159:
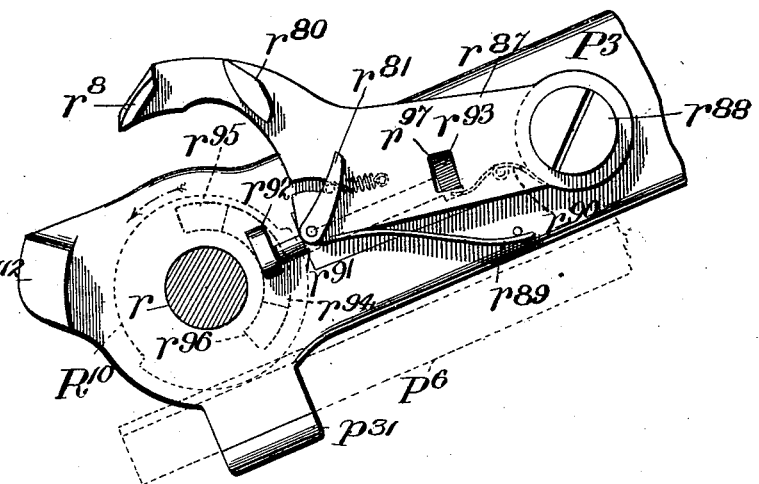
Figure 160:
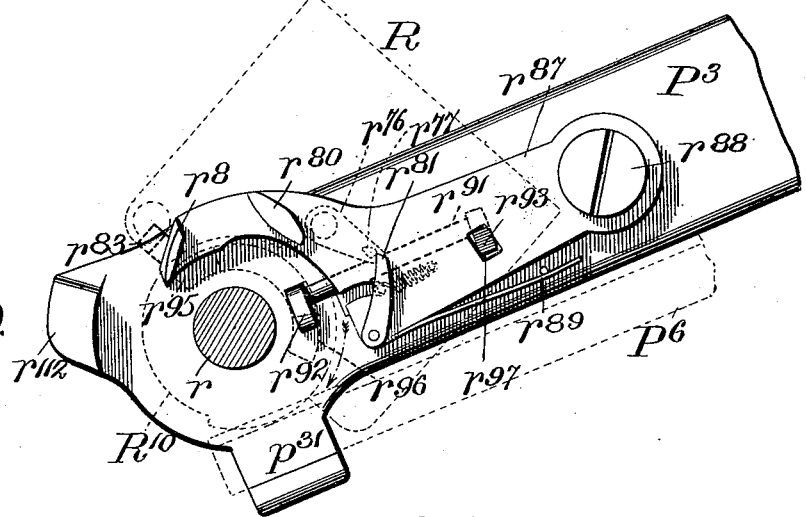
Figure 161:
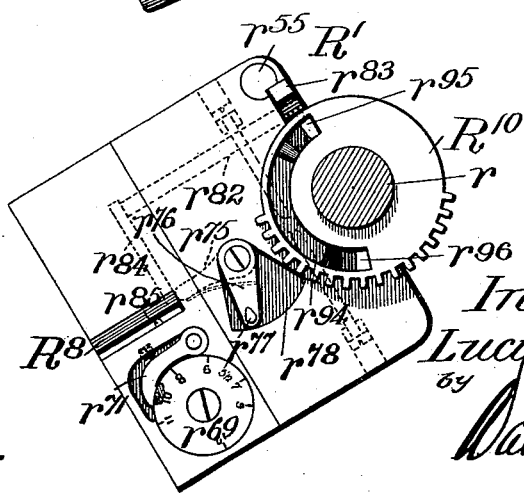
Figure 162:
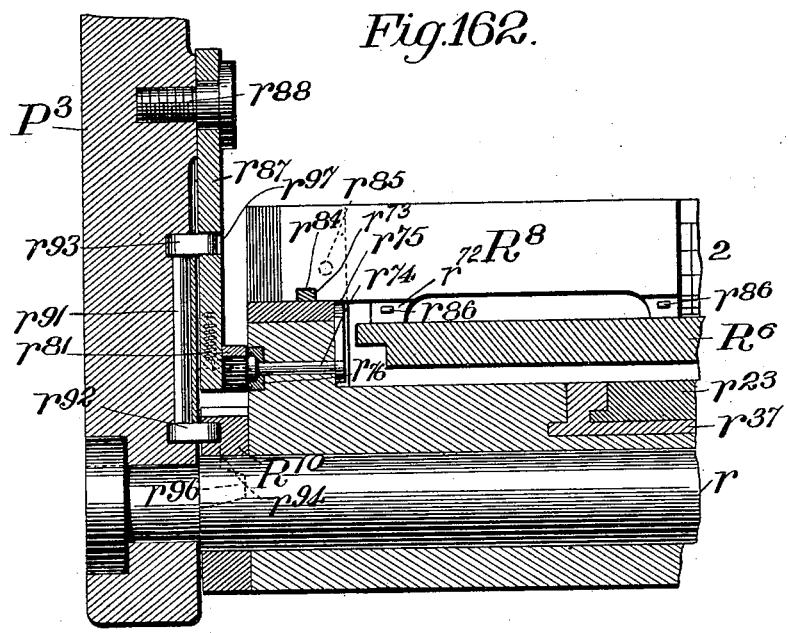
Figure 163:
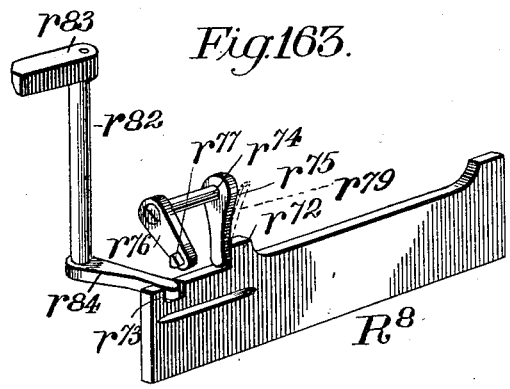
Figure 164:
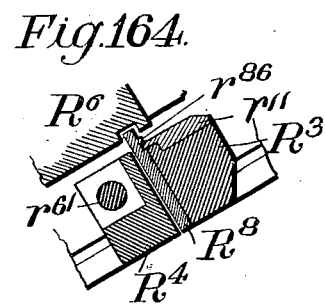
Figures 165, 166:
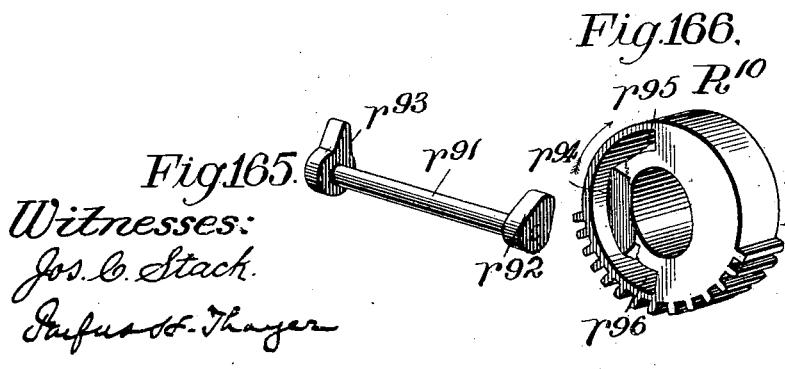

Fig. 132 is a horizontal section on line 132 132, Fig. 119, the bar-block being at the mouthpiece. Fig. 133 is a section through the transfer-carriage and connections, showing the bar-block in elevation and the composing-block in dotted lines. Fig. 134 is a transverse section through the bar-block on line 134 134, Fig. 156, showing the position of parts prior to the justification of the line. Fig. 135 is a similar view on line 135 135, Fig. 157, showing the line-justifier. Fig. 136 is a detail section showing the manner in which the justifiers are forced into the line. Fig. 137 is a detail section on line 137 137, Fig. 158, showing the retraction of the justifying-bar from in front of the justifiers as they drop into the justifier-magazine. Fig. 138 is a detail of the device for locking the justifying-bar. Fig. 139 is a detail of the vacuum resistance of the justifying device. Fig. 140 is a detail illustrating the manner in which the justifying-bar is elevated and depressed. Fig. 141 is a detail of an arm carrying a grooved block which controls the elevation of the justifying-bar. Fig. 142 is a view of the end gate of the bar-block. Fig. 143 is a detail of the rocking lever controlling said end gate. Fig. 144 is a detail section of the means employed to eject the completed bar from the bar-block. Fig. 145 illustrates in perspective details of Fig. 144. Fig. 146 is a horizontal section through the right-hand end of the bar-block. Fig. 147 is a view of the justifying device. Fig. 148 is a view of the justifier-remover. Fig. 149 is a detail view of the alining-plate. Fig. 150 is a view of the rock-shaft which releases the justifying device. Fig. 151 is a detail of the latch which locks the justifying device, also its retaining-pin. Fig. 152 is a view of the means employed to adjust, position, and actuate the movable jaw of the bar-block. Fig. 153 is a perspective view of the movable jaw. Fig. 154 is a perspective view of the fixed jaw. Fig. 155 is a detail of the mechanism which moves the alining-plate. Fig. 156 is an inverted plan of the bar-block, the jaws being removed and the line ready to be justified. Fig. 157 is a similar view, the line being shown as justified. Fig. 158 is a similar view showing the spaces ejected. Fig. 159 is an elevation of the arm provided with stops which control the movement of the gage-plate. Fig. 160 is a similar view showing the arm in operative position. Fig. 161 is an elevation of the bar-block, taken from the left. Fig. 162 is a horizontal section through the bar-block and its carrying-arm, showing the relation of the arm illustrated in Figs. 159 and 160 to the bar-block. Fig. 163 is a detail of the means employed to move and lock the gage-plate. Fig. 164 is a detail of the gage-plate and its support. Fig. 165 is a detail of the rock-shaft operating the arm illustrated in Figs. 159, 160. Fig. 166 is a detail of the gear on the bar-block which actuates the rock-shaft shown in Fig. 165. Fig. 167 is a plan view of the justifier-magazine. Fig. 168 is a central section on line 168 168, Fig. 167, showing the chute for said justifiers to their point of discharge. Fig. 169 is a transverse section of justifier-magazine on line 169 169, Fig. 167. Fig. 170 is a detail of a portion of the swinging bottom of the justifier-magazine. Fig. 171 is a detail of the rock-shaft for moving the bottom of the magazine. Fig. 172 is a detail of the lever for opening the end gate. Fig. 173 is an elevation of the bar-galley. Fig. 174 is a transverse section of the bar-galley on line 174 174 of Fig. 173. Fig. 175 is a detail plan of the stick or holder of the bar-galley. Fig. 176 is a detail elevation of the stick or holder of the bar-galley. Fig. 177 is an end elevation of a preferred form of type. Fig. 178 is an elevation of the completed bar. Fig. 179 shows a modified form of type and bar. Fig. 180 shows in perspective a temporary justifier. Fig. 181 is a plan view of a justifier. Fig. 182 illustrates an application of my idea to a line of type. Fig. 183 is an end elevation of Fig. 182. Fig. 184 is a view of the bar, taken at right angles to Fig. 178. Fig. 185 is an elevation of the metal-backing of the bar. Fig. 186 is an edge or end view of Fig. 185.

The drawings are arranged as nearly as possible in the order of the operation of the several parts, and the description follows a like order, as indicated by the accompanying index, the reference-letters being applied in the drawings and in the description to separately designate divisions of the machine, the upper-case letters and the powers thereof designating the essential or principal elements and the lower-case letters the details of the several elements.

INDEX.

*I. Type Casting and Storing Elements.*

1. Driving and cam mechanism...... A B
2. Melting-pot and pump............ C
3. Mold-carrier and molds.......... D
4. Modified mold-carrier and molds .. E
5. Mold-operator and selector........ F
6. Modified mold-operator.......... G
7. Magazine........................ H
8. Magazine attachment............. I

*II. Composing Elements.*

9. Escapement..................... K
10. Composing-block................. L
11. Type-packer.................... M
12. Line-gage and transfer-carriage ... N
13. Relations and operation of the type-casting and type-setting elements.
14. Line-transfer mechanism......... O

*III. Bar-Forming Elements.*

15. Bar-block-actuating mechanism... P
16. Metal-supply................... Q
17. Bar-block...................... R
18. Justifier-magazine.............. S
19. Bar-galley..................... T
20. Operation.
21. Modifications and equivalents.

IV. *Type Elements and Products.*

22. Justifier ........................... 1
23. Type ............................... 2
24. Justified line ...................... 3
25. Composite type-bar................. 4

The several features are to be first described with particular reference to details of construction and function. The successive steps and operations by which the types are produced, stored, and assembled into a line are set forth under heading "13. Relations and operation of the type-casting and type-setting elements," the intermediate transfer mechanism being described under heading "14" as an adjunct of the "composing elements." While the function and operation of the several features of the "bar-forming elements" are detailed in the several sections, the importance of this feature of the case calls for a recapitulation in the form of a connected narrative including the action of the machine as a whole, under "20. Operation."

In the last division the description of "types" and "justifiers" is in part a repetition of what has necessarily preceded; but the fact that these products may have a wide application independent of any mechanical means for producing them and, on the other hand, their intimate relation to the "composite type-bar" demands a separate and connected description.

I. *Type Casting and Storing Elements.*

1. *Driving and cam mechanism A B,* Figs. 1, 2, 7, 10, 110.—Power is applied to the main shaft A through the pulley A'. The pulley carries a sleeve-clutch $a$, which is normally pressed into engagement with a pinion-clutch $a'$ by means of a spring $a^2$, lying between the sleeve-clutch, and a cap $a^3$, secured to the main shaft. The pinion-clutch $a'$ is loose on the shaft A and is confined by a collar $a^4$, fixed to the shaft. The clutch may be thrown into and out of engagement by means of a shifting-lever $A^2$, pivoted to a bracket on the frame $A^3$ of the machine. The lever may be locked when thrown out by a vertical spring-pressed pin $a^5$, lying in the bed of the machine and playing into a cavity on the face of the lever, or *vice versa*. The pinion $a'$ engages a gear $a^6$, whose shaft $a^7$ is journaled in the bed of the machine. A pinion $a^8$, integral with the gear $a^6$, transmits the power to a gear $a^9$. The gear $a^9$ is secured to the shaft A and transmits power to that shaft. Secured to the gear $a^9$ is a cam B', which engages and operates a roller-head of the main actuating-lever of the mold-operator, as hereinafter described.

The shaft A has an enlargement $A^4$, resting in a bearing $A^5$, antifriction-rolls $a^{10}$ being interposed between the enlargement and the bearing. Beyond the bearing $A^5$ are two cams $B^2$ and $B^3$, the first being to cause the mold-carrier to move to the mouth of the metal-pot and the second being to cause the mold-carrier to move away from the melting-pot, thus securing a positive movement in both directions. The cam $B^3$ has a groove $b$ in its periphery, in which plays the end of a lever which operates an adjunct of the mold-carrier—the presser-plate $D^8$—hereinafter described. The last cam of the series $B^4$ operates the pump $C^3$, as described in the next section.

The gear $a^9$ has formed in its face a cam-groove $B^5$, in which plays the roller-foot of one arm of the lever auxiliary to the main lever for reciprocating the mold-operator, as later described under "5. Mold-operator and selector."

The gear $a^9$ and the cam B', which actuate the mold-operator F, are, with the initial gears, preferably located upon the smaller diameter of the main shaft, while the other cams named are attached to the enlargement $A^4$ of the main shaft, the enlargement also forming an abutment for the mold-operator cam B' on one side and on the other side for other actuating elements not immediately connected with the casting and storing of the types, but having further and distinct functions hereinafter described, (headings 14 and 15.) The additional actuating elements are shown to the left of the vertical dotted line $x\ x$, Fig. 2, and are mainly described hereinafter under the headings "14. Line-transferring mechanism" and "15. Actuating mechanism," it being observed that they receive power through the pinion $a^8$, gear O', and gears $o^2$, $o^3$, and $O^2$.

The description of the action of the several cams is reserved for the description of the parts operated by them.

2. *Melting-pot and pump C,* Figs. 1, 10, 11.—The melting-pot is stationary. It has a vessel C', which is preferably surrounded by a jacket $c$, having a hinged lid $c'$ and a fume and vapor-chimney $c^2$, and which may be termed the "main or reservoir chamber." Heat is supplied by burners $c^3$ $c^4$, furnished with gas or other fuel by a pipe $c^5$, having a regulating-cock $c^6$. A flange $c^7$ sustains the pot, and the pot does not elsewhere touch the jacket, so that as little heat as possible is transmitted to the jacket.

$c^8$ is a hollow boss attached to the jacket $c$ and serves as a flame-shield and guide for the piston-rod of the pump herein described. As shown, it does not touch the bottom of the vessel C', a precaution against transmitting heat.

The burner $c^4$ heats an auxiliary chamber $C^2$, which feeds nipples $c^{10}$ in a separable mouth $c^9$ with the metal supplied from the main chamber by means of a pump $C^3$. The pump $C^3$ is connected by a yoke $c^{11}$ to a rod $c^{12}$, terminating in a shoe $c^{13}$, which is supported by the cam $B^4$, Fig. 6. The shoe has pivoted to it a rod connected to a lever $c^{14}$, which is pivoted to the bed of the machine. The lever is operated by the spring $c^{15}$ when the cam $B^4$ releases the shoe $c^{13}$. The pump has a piston $c^{16}$, which operates in an extension of the auxiliary chamber $C^2$, guarded by a plate $c^{17}$ to prevent the metal from splashing out. Attached to the pump-rod above the piston $c^{16}$ is a yoke $C^4$, which carries at the lower end a chamber $c^{18}$, having a valve $c^{19}$ in its bottom, adapted to alternately open and close the port of the chamber. Playing in the chamber $c^{18}$ is a fixed hollow piston-head $c^{20}$ at the end of a pipe $c^{21}$, communicating with a transverse chamber or passage $c^{22}$ and through that passage with the auxiliary chamber $C^2$. The pipe $c^{21}$ is shown broken off in Fig. 10, while the transverse passage $c^{22}$ is there shown in section. In Fig. 11 the passage appears in plan, the pipe $c^{21}$ in dotted line, (shown passing over to and down into one end of the passage.) The shape as illustrated is not essential. It is sufficient for this feature that there be a chamber or passage to receive the flow from pipe $c^{21}$ and then deliver it into the chamber $C^2$, in this instance through the cylinder or neck in which the piston $c^{16}$ plays. The wall of the vessel $C'$ may form the inner wall of the passage $c^{22}$, the outer wall being formed by a strip, or the passage may be, as in effect illustrated, simply a depression in the upper part of the pot. The passage may be of any convenient size and may lead into the cylinder in which the piston $c^{16}$ plays through an opening or port such as is shown at $c^{23}$. On the upstroke of the pump the metal which has flowed into the chamber $c^{18}$ will be forced up through the pipe $c^{21}$ into the transverse passage $c^{22}$, flowing from the transverse passage to the neck of the auxiliary chamber $C^2$ beneath the piston $c^{16}$. On the downstroke the metal is forced from the auxiliary chamber $C^2$ into the molds pressed against the mouth $c^9$. This arrangement provides for the economical maintenance of the metal near the molds in the best condition and also provides against any cooling of the metal about the mouth of the pot and insures an equal pressure and steady flow of the metal at all points.

It will be observed that the nipples are deep. This provides for keeping metal standing in the bottom of the nipples at the same height or level of the metal in the transverse passage $c^{22}$. The transverse passage in fact forms an intermediate chamber which regulates the level of the active body of the fluid. The molten metal flows into the transverse passage or intermediate chamber. The piston $c^{16}$ rises above the passage, whereupon the metal flows through the opening or port $c^{23}$ into the neck or piston cylinder of the chamber $C^2$, beneath the piston. In the top of the neck is an opening $c^{24}$, leading into the vessel $C'$, so that if there be a surplus of metal beneath the piston there will be an overflow through the opening $c^{24}$ before the piston descends. A level is thus maintained which is slightly above the bottom of the mouth $c^9$, so that some metal may lie in the bottom of each of the nipples $c^{10}$, and thus minimize the amount of air to be disposed of when the metal is forced up into the molds and at the same time have the metal ready for instant casting. I have found by experiment that no air-cushion forms with my device as described.

*3. Mold-carrier and molds D*, Figs. 1, 10, 11, 12–24, 40, 46, 110.—It is the function of the mold-carrier D to bear the several molds, which, for example, may be arranged in four rows of twenty-three each, and to carry the molds to and fro between the melting-pot and the magazine in each cycle of casting and storing a series of types.

The mold-carrier, as described herein, comprises a number of sections held together by a tie-plate, and these may be considered as a whole as the body of the mold-carrier. At each end the body may be, as shown, Figs. 21, 40, and 46, tenoned to fit into the tie-plate $d$, and that may in turn be tenoned to fit the arms of an embracing frame D'. The frame, as illustrated, is composed of two L-shaped plates, the short arms $d'$ of the L turning inward, so that when the removable mold-carrier is placed in the frame D' the short arms form a securing grip or abutment at the back of the body. A supporting-frame $D^2$ extends from the frame of the machine and forms a way in which travel a series of antifriction-rollers $d^2$, which may be journaled in side bars, as shown. These rollers support the embracing frame D', the frame during action traveling upon rollers, which in turn travel in the supporting-frame $D^2$ to the limits imposed by upturned ends or stops $d^3$ $d^4$, Figs. 21, 40, and 46. The rollers have the usual action—that is, they roll forward with the body traveling upon them, covering half the distance that the body moves. The mold-carrier body and the embracing frame may be locked together at the front by any securing means, preferably an easily-adjustable means, such as I have illustrated and will describe under this heading. When power is applied to the frame, the two will move as one. While under this heading the term "mold-carrier" is employed to include the adjunctive actuating devices and the molds are separately named, the term is generally used in the specification to designate the body and frame carrying a complement of molds.

It is apparent that the mold-carrier may reciprocate with a minimum of frictional resistance. The reciprocation is imparted by means of the yoke $D^3$, through the links $d^5$, pivoted to each of the arms of the yoke and to each side of the mold-carrier frame D', Figs. 10, 40, 46, and 110. This arrangement prevents any longitudinal disturbance of the mold-carrier and gives an easy sure movement in a right line. The yoke $D^3$ is attached to a shaft $d^6$ and bears two arms $d^7$ and $d^8$. The arm $d^7$ is operated by the cam $B^2$, while the arm $d^8$ is operated by the cam $B^3$, the first moving the mold-carrier to the melting-pot and the second moving the carrier from the melting-pot to the magazine.

I deem it advisable to have the mold-carrier move away from the pot immediately after it receives the charge. While the operating parts described are constructed to secure such action, I have provided against any lost motion or inertia by applying a nearer source of power. I insure the initial movement of the mold-carrier by a slide $d^9$ (one on each side,) which embraces the carrier-frame and is operated by the rising mold-operator slide F', through the medium of a bell-crank lever $d^{10}$, which is struck by the projection $f^{44}$, as shown in Fig. 46, the slide having a periodic reciprocating motion, as described later under heading 5. The mold-carrier may be readily removed and replaced by hand. Latches $d^{11}$ are pivoted to each side of the frame D' and are adapted to drop over the front of the mold-carrier to hold it securely in place from the front. They may be lifted, and the body of the mold-carrier can then be slid out by simply drawing it forward, placing the hands on the bottom. It may as easily and readily be slid into place and locked.

The mold-carrier (see Figs. 12-20) comprises separate and removable section-bars $D^4$. These may be tied together by a bolt, as indicated in Fig. 40, and, as stated, they are secured by a tie-plate $d$, which may be screwed or bolted to the section-bars at convenient points. Between the sections are inclosed series of angle-pieces $d^{12}$ of a rude L shape, which inclose and guide series of molds $D^5$. Each mold is composed, preferably, of two parts $d^{13}$ and $d^{14}$, cut away at the top to form a hook $d^{15}$. One part is wider than the other, so that when they are secured together there is formed between the mold and confronting angle-pieces a recess $d^{16}$ and a recess $d^{17}$. The recess $d^{16}$ receives the reduced end of a feeler $F^6$, hereinafter described. The recess $d^{17}$ is the type-cavity. A matrix $d^{18}$ may be attached to an offset on the side of one part above the recess $d^{17}$ or may be held in a mortise, as shown. One side of the mold bears a tappet $d^{19}$—in this case a projecting screw-head. At the bottom of the type-cavity between the angle-pieces is a block $d^{20}$, attached to the adjacent section-bar, which is to determine the form of the shank of each type, and which I therefore term the "shank-block." Abutting the transverse arm of each angle-piece and lying in the adjacent section-bar is a finger $D^6$. This finger has a hook $d^{21}$ at the top. At the bottom is a recess $d^{22}$, a portion of which is obliquely disposed, presenting inclined faces, as shown. The finger is thus shaped at the bottom to govern the action of a freeing device—in this case a button $d^{23}$ on a pin $d^{24}$. Lying in a recess in the upper part of the finger $D^6$ is a pivoted arm $d^{25}$, having a hook with a curved or inclined bottom. The tappet $d^{19}$ on the mold is adapted to engage the hook $d^{21}$ of the finger $D^6$, so that the finger will be drawn up with the mold. As it goes up the lower face in the inclined way $d^{22}$ strikes the button $d^{23}$ and drives it in so that the end of its pin $d^{24}$ strikes the shank of the type, knocking it off or freeing it from the shank-block. The mold moves up some distance before this operation takes place, and it is obvious, therefore, that upon the return of the mold the finger $D^6$ cannot be given the full movement of the mold. The hook of the arm $d^{25}$ travels in an oblique path $d^{26}$ in the angle-piece. As the tappet $d^{19}$ on the mold comes down it engages the hook of arm $d^{25}$, forcing down the arm and its attached finger, while at the same time the lower face of the path $d^{26}$ gradually guides the arm out of the path of the tappet. This motion permits a full movement of the mold with only a partial movement of the finger $D^6$. On the downward movement of the finger $D^6$ the recess $d^{22}$ passes over the button $d^{23}$, reversing the movement of the button and carrying it and the pin back to the position shown in Figs. 13 and 15. In a recess $d^{27}$ lies a guide-shell $D^7$, preferably adapted to partially embrace a type, a spring $d^{28}$ tending to force it in toward the type. When the mold is down, the guide-shell is forced back, but when the mold is withdrawn from the type it springs forward. The type is struck from the shank-block by the pin $d^{24}$ and centered by the vibrating guide, so that the type is entirely freed and at the same time surely guided to the center of the cavity, from which it drops into its appropriate channel of the magazine. No ejectors are used upon the head of the type and none is needed; but the downward movement of the mold when the type is thus centered would absolutely prevent the possibility of any type remaining in a type-cavity after the descent of the mold.

A presser-plate $D^8$ lies above the mouth of the melting-pot, the mold-carrier passing under it in moving to the pot, Figs. 13, 22-24. It has two projecting arms $d^{29}$, which lie in cavities $d^{30}$ in the side frame of the machine, resting upon springs $d^{31}$, which normally sustain the presser-plate in its inoperative position. The arms are cut away, as shown in Figs. 22 and 23, to permit the play of the bell-crank levers $d^{10}$. The arms are a part of or attached to a plate $d^{32}$. A plate $d^{33}$, decreasing in thickness from the center, is secured to the plate $d^{32}$ by the screw-bolts $d^{34}$. Slots $d^{35}$ permit a lateral play of the plate $d^{33}$, governed by the shanks of the screw-bolts. In the plate $d^{32}$ are seated springs $d^{36}$ and $d^{37}$. The spring $d^{36}$ serves to insure a horizontal position of the plate $d^{33}$ when in action. It is the function of $d^{37}$ to press against the front of the plate $d^{33}$ to permit a slight yielding of the plate when in action. In a recess in the plate $d^{32}$ lies a spring $d^{38}$. This spring presses against a cylindrical roller $d^{39}$, playing in a slot $d^{40}$, Figs. 13 and 22, somewhat larger than the roller, so as to accommodate its play. On each side of the plate $d^{32}$ are spring-pressed pins $d^{41}$ with screw-heads to secure them and to regulate the pressure of their springs, the pins being adapted to press upon the upper surface of the mold-carrier at each side. The presser-plate is operated by a rod $d^{42}$ through a bell-crank lever $d^{43}$, which has at the end of its lower curved arm a roller taking into the depression $b$ in the cam $B^3$ to relieve the presser-plate from tension, the other end of the lever operating through an opening in the bottom of the rod $d^{42}$ to draw down the plate by the action of the full surface of the cam on the roller of the curved arm, Fig. 10. The presser-plate is arranged to be brought down on the tops of the molds, so as to firmly hold all the molds in place during the casting. When the mold-carrier is drawn away by the action of the mold-operator on the slide $d^9$ and the bell-crank lever $d^{10}$ and by the yoke $D^3$ and connecting parts, as described, the tops of the molds are still pressed firmly down, causing the bottom of the molds to wipe over the mouth of the melting-pot. The formation of the plate $d^{33}$ and its relation to the cylindrical spring-pressed roller $d^{39}$ and springs $d^{36}$ and $d^{37}$ permit that plate to yield under the friction of the tops of the molds to prevent any binding or straining of the molds to rock on a center, so as to immediately and exactly accommodate its surface to the tops of the molds, thus insuring correct action, even if the arm $d^{42}$ should not bring the plate to an exact level, and also to give backward and be returned after the passage of the molds, the cylindrical roller maintaining the central relation. The presser-plate may, in fact, travel with the tops of the molds, the molds traveling, of course, faster and leaving the plate as it finishes its reciprocation. I may have a modification, especially when used with the modified mold-carrier E, hereinafter described, by using spring-pressed pins, as described under the following heading:

*4. Modified mold-carrier and molds E, Figs. 25-34.*—My modified form of mold-carrier and molds E has the same general construction of section-bars and angle-pieces as my preferred form, and in the drawings the reference-letters have been applied as far as feasible to the distinctive features only. The mold E' in this case has two notches $e$ and $e'$, each having one vertical face and two inclined faces. On the angle-pieces are two projections $e^2$ and $e^3$, adapted to enter the notches. The shank-block $e^4$ has the same face conformation, but is movable, having a projection carrying an inclined way $e^5$. The finger $E^2$ has a hook $e^6$, as in the other example, (finger $D^6$,) but at its lower end is differently shaped, as shown, being cut away and beveled on the bottom. The finger $E^2$ is operated by the mold, but by one side of the top hook of the mold, and plays the full length of movement with the mold, (which has a shorter movement than in the preferred form,) drawing the shank-block $e^4$ inward and away from the type by means of contact of the bottom of the finger $E^2$ with the inclined sides of the way $e^5$. The projections $e^2$ $e^3$ fit loosely in the notches $e$ $e'$ when the mold is down waiting for a cast, a pin $E^3$ lying in a cavity $e^7$, facing against a corner of the bar and holding the mold into close engagement with the opposite side of the mold-recess. When a mold moves up, it carries by frictional contact this pin $E^3$, the projections forcing over the mold; but when the mold is down the presser-plate $E^4$, acting here upon the same principle as in my preferred form, holds down such mold and also presses down each pin $E^3$, for example, by a corresponding spring-pressed pin $e^8$. The bottom of the cavity $e^7$ turns in toward the mold and the bottom of the pin $E^3$ is made to conform to the bottom of its cavity, so that as the pin is pushed down it is wedged in toward the mold and shoves the mold over against the opposite corner, the projections $e^2$ and $e^3$ entering the notches $e$ and $e'$, so that the mold is put into close contact to form the correct type-cavity. When the mold is withdrawn, the inclined sides of the notches $e$ and $e'$ easily slide up the side of the relative projections, the mold being at once loosened by releasing the pressure of the pin $E^3$ and forcing it over and up by the frictional contact of the mold.

*5. Mold-operator and selectors F, Figs. 1, 2, 3, 5, 8, 10, 35-46, 50-52, 110, 119.*—It is the function of the mold-operator and selector F (which for convenience I shall hereinafter term the "mold-operator") to draw out and push back the molds which are to be active in casting, the mold-operator also carrying selecting devices which independently regulate the action of any mold in accordance with the quantity of types stored in the corresponding channel of the magazine.

The body of the mold-operator reciprocates vertically in the space between the top of the magazine H and the cap-plate $A^6$ of the machine, its motion when operating upon the molds being of course confined to the space between the cap-plate and the mold-carrier, which has been moved under the mold-operator. It is carried by slides F' playing in ways $f$, one in each side of the machine, Figs. 1, 110, 119. The slides are actuated by means of a lever $F^2$ and connecting-link $f'$, the lever being operated by the cam B'. Each slide has a rack at the bottom, the one on the power side of the machine driving a pinion $f^2$, and through a connecting-shaft imparting power to the slide on the opposite side by means of a pinion $f^3$. The lever $F^2$ prevents any lateral movement of the slide on the lever side. On the opposite side a groove $f^4$ is cut into the face of a slide, and a tongue $f^5$ takes into the groove to prevent any lateral displacement, Figs. 110 and 119. The tongue may be integral with the frame $A^3$ of the machine or separate and attached thereto, as shown. The arm $f^6$ of the lever $F^2$ ends in a roller-head $f^7$, Figs. 1-3, 5, 8. This roller-head is composed, essentially, of a T-cap placed in a bore at the end of the arm, with antifriction-rolls lying between the shaft of the T-cap and the periphery of the bore, an arrangement which prevents any binding of the head upon the cam B'. The vertical movements upward are imparted by the action of the surface of the cam B' upon the lever F², the downward movements, where this cam alone is used, being due to the weight of the mold-operator, the roller-head offering no material frictional resistance.

The cam B' is sufficient to impart the necessary movement to the mold-operator; but to insure the absolute accuracy of the succession of movements I have added an auxiliary bell-crank lever F³, which is journaled on the sleeve of the lever F². The power-arm of the lever F³ has a roller-head which plays in the cam-groove B⁵ in the face of the gear $a^9$. The driving-arm is flat on the bottom and plays upon a flat-faced projection $f^8$ on the side of the lever F², making a split union for the two levers. If, without regard for economy of space, the gear $a^9$ were sufficiently large, a cam-path could be cut in it exactly corresponding in design to the contemplated action of the mold-operator, and the cam-path could cause the series of movements through a single lever-arm. There are but two movements, however, in the operation of the mold-operator that are required to be peculiarly accurate—downward to engage the molds and upward to release them. I therefore arrange the cam-path B⁵ so that there may be a sharply-defined action at two points, the rest of the path being designed to conform to the subsequent movements of the mold-operator as nearly as the restricted limits will permit. The split union between the parts enables this difference in action to be accomplished without detriment to the parts. It should be observed that the two movements with the molds, to which reference has just been made, are comparatively limited, the other movements of the mold-operator being of a character easily and surely performed by the alternating effects of the cam B' and gravity.

The mold-operator, Figs. 10, 35–45, comprises, essentially, a block composed of a series of section-bars F⁴, having the top and bottom joined by a web, and may, like the mold-carrier D, be taken apart. Each of the bars has a series of openings $f^9$ at the top and bottom, and also communicating with the openings $f^9$ a series of openings $f^{10}$. A series of unattached fingers F⁵ pass through the openings $f^9$ and each finger has a hook $f^{11}$ at the top and a hook $f^{12}$ at the bottom. The upper hook is adapted to retain and guide the finger in the upper opening, while the lower hook is adapted to engage with the upper hook $d^{15}$ of a mold. Each finger is, preferably, as shown, Figs. 43 and 45, cut away near the bottom and recessed near the top at $f^{13}$. The back of the finger has a swell $f^{14}$, and the recess has at the top and back two inclined faces $f^{15}$ and $f^{16}$. An unattached selecting pin or feeler F⁶ passes up beside each finger, through the offset openings $f^{10}$, being so placed with relation to the fingers that it moves vertically through the upper openings, and therefore vertically through the lower openings. Each pin or feeler, Fig. 44, is reduced at the bottom $f^{17}$, so that a feeler may enter any channel of the magazine whether wide or narrow, and has a projection $f^{18}$, beveled at the top and the bottom in the same direction, and normally lying behind the top of a finger. This feeler lies in such relation to the finger F⁵ that the projection $f^{18}$ passes up in close engagement with the wall formed at the recessed portion $f^{13}$, so that on its upward movement it will contact with the incline $f^{15}$ and press in the top hook $f^{11}$, the opening $f^9$ having a rounded face upon which the incline of the hook plays. The projection $f^{18}$ acting upon the incline $f^{16}$ in a downward movement produces a reverse effect. Each finger is constantly pressed inward by a spring $f^{19}$ bearing against a pin $f^{20}$, and inasmuch as the inclined face of the hook $f^{11}$ of each finger bears against the rounded face of an opening $f^9$ this inward pressure will lift the finger, the whole force of all the springs tending to hold forward a series of bars F⁷, having cuts $f^{21}$, corresponding with the cuts of the lower parts of the section-bar, the shoulders of these cuts engaging the shanks of the several fingers. Each bar F⁷ has at one end a roller $f^{22}$, adapted to be engaged by a cam-roller $f^{23}$. Each finger has near the top and on one side a rib $f^{24}$, which is adapted to enter a small opening $f^{25}$ at one side of each of the larger openings $f^9$. When a finger is in its normal position, it is held from movement by the projection $f^{18}$, lying between the inclines $f^{15}$ $f^{16}$, and the rib $f^{24}$, lying against the under surface of one of the bars F⁴; but when the finger is freed from the restraint of the projection $f^{18}$ and is moved over or tilted by the action of a feeler the rib $f^{24}$ comes into line with the opening $f^{25}$, and the finger then freely moves upward under the impulse of its spring $f^{19}$ and is guided in its upward movement by the rib. It is the purpose of this movement to throw up and back the bottom hook $f^{12}$ of any finger when its corresponding feeler is lifted by coming into contact with a type in the magazine, so that the hook may not engage the corresponding mold when the mold-operator acts upon the mold.

The bars F⁷, Fig. 39, as stated, are operated by a cam-roller $f^{23}$, Figs. 37–40, and this roller extends across the mold-operator and carries at the outer end a suitably-toothed ratchet $f^{26}$, Figs. 35, 36, 41, 42, 50, back of which lies a flat spring $f^{27}$ bent outward, so that when the side of the ratchet $f^{26}$ bears against the bottom portion of the spring $f^{27}$ the spring will be pushed into a recess, in which it lies, while at the same time the ratchet is forced out sideways, drawing on the cam-roller $f^{23}$, and thus binding a collar $f^{28}$ at the opposite end, so that the cam-roller may not easily turn. A dog $f^{29}$ is pivoted to the cap-plate A⁶ and is normally swung outward by a spring placed above and back of the plane of the pivot or in any appropriate position.

The mold-operator has a series of movements with relation to the magazine and the mold-carrier. It moves from the highest position down to the lowest position to place the feelers in the channels of the magazine. It then moves upward to next to its highest position to permit the mold-carrier, with its molds, to slide beneath the mold-operator, clearing the projecting feelers. It then comes down to permit the fingers not thrown out to engage the molds. It then moves up toward the top to draw the molds and then comes down to disengage and replace the molds, at which time all the fingers must be thrown back, so that when the next final movement up to the top and highest point takes place none of the molds shall be engaged by any of the fingers. This final movement brings the feelers and fingers against the cap-plate $A^6$. It forces down all of the feelers, and if any feeler be elevated it will as it comes down tend to replace its finger, the inclined lower edge of the projection $f^{18}$ playing against the inclined edge $f^{16}$, so that the head of the finger is drawn down and over to bring the rib $f^{24}$ out of the opening $f^{25}$ and permit the finger to be forced down to its original position when it strikes the cap-plate $A^6$. It is the function of the ratchet $f^{26}$ and its parts and the spring-pressed dog $f^{29}$ to govern the throwing over of the fingers at their disengagement with the mold. It should be borne in mind, having reference to Figs. 41 and 42, that the ratchet lies over the spring $f^{27}$, so that when the ratchet turns down over the projecting end of the spring the end of the spring will be carried in out of the line of travel of the lip of the dog $f^{29}$.

The several movements are illustrated in succession in Fig. 50, the arrows indicating the movements of the mold-operator between the dotted lines. In movement 1 the operator is going down the full stroke to place the feelers in the magazine. The ratchet $f^{26}$ is just passing the dog $f^{29}$, which is held back by the outer edge of the spring $f^{27}$, the bottom incline of which first struck the dog, the outer edge of the spring completing the effect. The ratchet passes some distance below the dog, and the movement 2 takes place, carrying the mold-operator nearly to the top and bringing the upper tooth of the ratchet into contact with the projecting lip of the dog, whose spring has thrown it forward after the passing of the spring $f^{27}$. As the ratchet rises it is turned a quarter to the position indicated in dotted lines, the cam-roller turning to permit the fingers to return to the engaging position. 3 indicates the downward movement of the mold-operator after the mold-carrier has passed under it to permit the fingers to engage the molds. The ratchet comes down from the dotted position 2 to the lip of the dog, going just far enough to turn it an eighth, and not, therefore, passing below the dog in movement 3, the top tooth of the ratchet taking upon the dog, which swings out a little. The ratchet then goes up (drawing the molds) a short distance, as in movement 4, and then back (replacing the molds) and releasing the fingers, as in movement 5, the ratchet being given another eighth turn by the dog which is swung into the normal position, and therefore engages the bottom tooth, the cam-roller $f^{28}$ being against the roller-head $f^{22}$ of the bar $F^7$ and throwing back the fingers so that their hooks will be out of the line of engagement with the molds, as in Figs. 37 and 40. The ratchet is still above the lip of the dog and on the final movement 6 rises, the feelers being driven against the cap-plate $A^6$ of the machine to reset the fingers. It will be observed that there are but two points at which the cam-roller must be moved. These points are in movements 2 and 5. At the other stages the precise position of the cam-roller is immaterial.

It may be desired at times to work the mold-operator by hand or out of the regular order for some purpose when it is below the dog. To provide for permitting it to pass the lip of the dog without effect other than those in the regular order, I have filled in the edge of the ratchet at $f^{30}$, so that it may pass the dog without action if any but the regular cycle of movements be attempted. This has reference to the shape of the ratchet shown. I have applied two stops $f^{31}$ $f^{32}$, Figs. 50 and 41. The stop $f^{32}$ prevents a turn too far down and out. For this latter stop I have shaped the ratchet so that it will have a tooth, as shown, which may abut against the stop. Now if this tooth in some backward movement should come against the lip of dog $f^{29}$ the effect would be to turn the ratchet to a position from which it could not be recovered. I therefore, as stated, fill in the tooth at the point where the lip might strike, so that it will not get any purchase on the ratchet. Of course these provisions result solely from the peculiar shape of the ratchet. I have described this ratchet-and-pawl connection in some detail, because it enables me to illustrate the several steps which are incident to the action of the mold-operator. It has been noted, however, that there is one point only when the fingers need to be moved laterally and one point when they need be returned, and I prefer, therefore, to use in my machine a mechanism by which I may throw out all the fingers and then replace them without any intermediate and idle movements of the governing mechanism. To this end I have devised the mechanism shown in Figs. 51 and 52, which I purpose using rather than the alternative ratchet-and-pawl mechanism. It comprises, essentially, a rock-shaft and lever $F^8$. For the operation of the rock-shaft and lever the gear $a^9$ must be modified in its camway, so as to form a ring $f^{33}$ with a projection $f^{34}$. A roller $f^{36}$ of the arm $f^{35}$ lies in the camway $B^5$. The arm $f^{35}$ is pivoted to the side frame of the machine. It is connected by a rod $f^{37}$ to a rocking arm $f^{38}$, which is joined by a shaft $f^{39}$, which may be journaled in the cap-plate $A^6$ to a catch $f^{40}$, normally retracted by a spring $f^{41}$, connected to the side of the machine. The end of the cam-roller $f^{23}$ bears a trip $f^{42}$. When the roller-head $f^{36}$ is struck by the projection $f^{34}$, the arm $f^{35}$ is depressed, and through the rod $f^{37}$ and connections $f^{38}$ $f^{39}$ the latch $f^{40}$ is thrown forward in the path of the trip $f^{42}$ as the mold-operator comes down to replace the molds. The effect is to turn the cam-roller $f^{23}$ so that its full face strikes the rollers $f^{22}$ of each of the bars $F^7$, carrying back all the fingers of each row. On the movement up away from the molds the trip will strike a lug $f^{43}$ on the cap-plate and be returned to its normal position. This device is on that side of the machine illustrated by Fig. 1; but I have omitted it from that view because it interferes with the scheme of illustration. As before stated, the bell-crank lever $d^{10}$, which operates the slide $d^9$, is partially actuated by the mold-operator. As shown in Fig. 46, a shoulder $f^{44}$ on the slide F' strikes an arm of the lever $d^{10}$ as the mold-operator goes up from the magazine in movement 2.

6. *Modified mold-operator G*, Figs. 47–49.— As illustrating a modification of the mold-operator I have shown a slightly different form of finger and feeler. The finger G' has the same hooks and spring as in my preferred form; but instead of the swelling curve $f^{14}$ in the back and the inclined faces $f^{15}$ $f^{16}$ at the top I have reduced the neck $g$ below the top hook so that a shoulder is formed, and I modify the faces of the top hook, having a clearly-defined vertical face $g^4$ and an inclined face $g^5$. The feeler $G^2$ is as in my preferred form, except that the projection $g'$ has horizontal faces. The projection lies between the top and bottom shoulders $g^2$ $g^3$ of the reduced portion of the corresponding finger. When the feeler is pushed up, it presses upon the shoulder $g^2$, carrying up the finger until its vertical face $g^4$ is clear of the upper edge of its opening, when the finger is then carried on by its spring. As the finger tilts the feeler slips out from beneath the shoulder $g^2$, being thus capable of extended movement. When the feeler is returned by contact with the cap-plate, the lower face of its projection $g'$ strikes the shoulder $g^3$ and carries down the finger, the projection taking its position between the two shoulders as the finger assumes a vertical position. The vertical face $g^4$ is situated in advance of the inclined face $g^5$ and prevents any side play of the finger until the vertical face passes above the top of the recess in which it lies. The finger is then pushed over so that the lower shoulder $g^3$ is in line with the projection $g'$ of the feeler. In this modification it will be observed that the feeler has a more positive action in lifting and returning the finger than it has in the preferred form, where the feeler has simply a directing or controlling action upon the finger.

7. *Magazine H*, Figs. 1, 10, 53–61, 67, 68.— It is obvious that any one of many magazines adapted to receive type may be employed in my machine; but I prefer to use the magazine of my invention herein described. It is the purpose of this magazine to store the types which are being cast continuously and independently of the operation of the keyboard or the production of the composite type-bar.

The magazine H is in the present example composed of four divisions H', $H^2$, $H^3$, and $H^4$. These several divisions are illustrated in their relative arrangement in Fig. 10. They may all be joined together by screws and plates and easily separated or may be made up in separate divisions. When joined together, they form the magazine, the divisions of which may readily be applied to or removed from the magazine-frame $H^5$, lying within the frame of the machine. The magazine-frame is a skeleton frame whose sides are joined by the bars $h$ and the web $h'$, Fig. 10. The magazine-frame is removably secured to the machine by a spring-pressed pin $h^2$. This pin takes into a recess $h^3$ in the side of the magazine-frame and extends through the frame of the machine. On the outer face is a head $h^4$, having an incline $h^5$, adapted to play upon the inclined face of a projection $h^6$. When the head is turned away from the operator, the incline of the head rides upon the inclined face of the projection, drawing out the pin away from the recess. By a turn of this attaching device the magazine may be freed for removal or secured in place.

The essential characteristic of the upper portion H' of the magazine is a grooved plate $h^7$, backed by a plain plate $h^8$, thus forming the type-channels $h^{70}$ $h^{80}$, which are designated by separate reference-letters not because of any difference in form, but because of the difference in location. The same reference-letters are used in the several figures illustrating the divisions of the magazine to bring out the fact that the several separated channels meet to form continuous channels. Three sides of the type-channels in this example, it will be observed, are formed by the smooth sides of the grooves of the plates $h^7$, the separating-plate forming the fourth side. In my present example I have shown four rows of type-channels in the part H'. (See Figs. 10, 53.) This part of the magazine is strengthened by the central web of the magazine-frame $H^5$, lying between the two divisions, which are nearly straight and vertical. (See Fig. 10.) The outer divisions are curved in toward the bottom, so that a central division and a curved division meet near the bottom, their channels then running side by side. At the top the type-channel mouths are opposed—that is, each mouth is opposite corresponding mouths in the other divisions. The mouths are made to correspond to the width of the type to be received, and as these widths are varying it is obvious that to have four rows of the channels merge into two rows the path must be arranged in accordance with the final destination of the type. For this reason the direction of the channels will vary.

The part $H^2$ forms the base for the part $H'$. It consists, essentially, of a block into which fits a block $h^{10}$. Both the blocks are channeled and when one is placed within and against the other, as in Fig. 55, two series of alternating type-channels are created. These type-channels in the two rows correspond in number to the channels in the four rows at the mouth of the magazine, so that at this point the types are brought into the closest relation consistent with the easy management and storage of the types, while at the top of the magazine the mouths are proportionately separated. The block $h^{10}$ is recessed on the back at $h^{11}$ to receive the pivots of the escapement-detents, as hereinafter described. The block has a series of slots to receive a series of partitions $h^{12}$ to separate the several escapements. The partitions are also secured in grooves in the surrounding walls of the magazine-frame. These serve to separate and guide the escapement-detents, Figs. 67 and 68.

The part $H^3$ receives the discharged types of the front row $h^9$ of the part $H^2$ and guides them into the chute-division $H^4$. Its channels are arranged with special reference to the fact that all the types must be guided to the single row of comparatively wide channels of the part $H^4$. The part $H^3$ is attached to and faces the top of the part $H^4$, the bottom of a channel in the part $H^3$ facing a side and the rear wall of a channel in the part $H^4$. The part $H^3$ takes the types from the front row of channels in the part $H^2$ and carries them down to the channels of the part $H^4$. Each channel of $H^4$ receives at the top types from a rear channel of $H^2$, the types shooting straight down the channels of $H^4$. The types received by $H^3$ slide down the inclined base of each channel, (see sectional detail, Fig. 57,) coming into a channel of $H^4$ at a point below where the types of the rear channel of $H^2$ were received. Each channel of $H^4$, therefore, acts as a discharge for two channels of $H^2$ and four channels of $H'$. The chute-division $H^4$ delivers the type to the composing-block. It consists, essentially, of a plate $h^{13}$, having inclined ribs $h^{14}$ at the bottom converging toward the discharging-point $h^{15}$. A series of ribs $h^{16}$, generally curved at the bottom to direct the types, are formed on the face of the plate $h^{13}$. I have provided a simple expedient for permitting the rapid and easy discharge of a type and at the same time bringing it to a vertical position. I cut away the ribs $h^{14}$ at $h^{17}$ to form opposing curves or recesses. As the type slides down from either side on a rib $h^{14}$ its butt-end shoots over into one of the recesses and passing along its curved side brings the type to a vertical position, its head between the approaching points $h^{18}$ of the two ribs and its butt-end in the vertical discharge $h^{15}$.

On the face of the part $H^4$, below $H^3$, I apply a glass plate $h^{19}$, hinged to the side of the magazine-frame by knuckles $h^{20}$, a clamp $h^{21}$, in conjunction with a spring, serving to hold down the glass plate, which may be cemented to a bar $h^{22}$, extending across the face of the part $H^4$ and joining together the two knuckles. Behind the knuckles I place a spring $h^{23}$. The spring has at the bottom a projection which has two inclined faces corresponding with two inclined faces on the projecting end of each of the clamping-arms. When the upper faces of the spring projections bear against the lower faces of the clamp projections, the force tends to hold the plate down, but when the arms are snapped down the lower inclined faces of the springs abutting the upper faces of the clamps will serve to hold the plate part way up or open.

8. *Magazine attachment I*, Figs. 62-66.— As a modification or addition I have shown an attachment which is adapted to be applied to the magazine to feed the type forciby from the chute (which, as shown, comprises a double series of channels $I'$) directly into the type-channel I of the composing-block, inclining the types as they fall instead of after, as described later. The motive power is derived from the type-packer, which has in this illustration the essential features hereinafter described, a friction-disk $M^4$, gears $m'$ and $m^2$, shaft $m^3$, spring $m^7$, notched collar $m^4$, and sector-wing $M'$ to strike the types and forward them. I have applied in this example a gear $i$ to the shaft of the type-packer and this drives two gears $i'$ $i^2$ on a shaft $i^3$. The shaft $i^3$ carries a spiral gear $i^4$, which drives a similar gear on the end of a pivoted shaft $i^5$, carrying a toothed wheel $I^4$, taking into the lower bend of a channel $I^5$. The beveled gear $i^2$ drives a gear $i^6$, which rotates a shaft $i^7$, bearing two spiral gears $i^8$ $i^9$, operating similar gears on pivoted and spring-pressed shafts $i^{10}$ $i^{11}$, carrying toothed wheels $I^2$ $I^3$. The several parts are attached to a bracket $i^{12}$, hanging from the bottom of the magazine. As a type comes down from one of the channels $I'$ it is caught on each side by the yielding toothed wheels $I^2$ $I^3$ and carried down to the lower turn in the channel $I^5$, where it is finally forwarded by the yielding toothed wheel $I^4$. It is obvious that this device will insure the forwarding and inclining of the type; but my preferred form—that is, the magazine without the addition—is much more simple, and I also regard it as the more efficient form. I may also observe that, as shown and described, this attachment may be applied to the magazine of Figs. 53-59.

II. *Composing Elements.*

9. *Escapement K*, Figs. 10, 67-75, 110.—In common with several features of this machine which are well known and essential elements of all typographic machines the escapement may be of any kind adapted to carry out the purposes I have in view. I prefer, however, to use the escapement herein described, which while peculiar and applicable to my machine is broadly applicable to all typographic machines and which secures an immediate discharge of an individual unit while retaining the rest of a column without requiring exact measurements and relations of the parts.

The escapement-detent K′ may be constructed of metal or any suitable material, in sections or preferably in one piece, and it consists, essentially, of a body $k$ and two fingers $k'$ $k^2$, these fingers being preferably integral with the body, though they may be attached in any way—as, for example, in Fig. 72, where they are shown swiveled in the body. It will be observed that in the form shown in Fig. 70 the back of the body has a curved face $k^3$ and oblique faces $k^4$, while in the form shown in Fig. 71 the back has three curved faces. The detent rocks upon a pivot $k^5$, projecting into a groove $h^{11}$ in the magazine-section H². As stated in describing the magazine, the escapement-detents are separated by partition-plates $h^{12}$, which are sustained in grooves in the block $h^{10}$ and by grooves in the rear wall of the magazine-frame. The grooved rear wall may be the part $h'$; but I prefer to insert a separate plate, as shown in Fig. 67.

The detent may be operated by any suitable means, preferably a bar K², loosely connected to a pivoted lever $k^6$ of a keyboard K³. The bar herein shown has an enlargement $k^7$ at the upper end and is cut away obliquely at the top and bottom of the operating-face of the enlargement upon lines coincident with the oblique lines of the face of the back of the body of the escapement, leaving a vertical face which rides upon the curved face $k^3$ of the detent. The bar K² is preferably made in sections, with joints, as shown at $k^8$, and is notched at the bottom $k^9$ to receive a corresponding projection of the key-lever $k^6$. Each bar may have a shoulder catching over a projecting plate on the bottom of the grooved plate or rear wall $h'$, as shown in Fig. 67, so that it will hang in place when the magazine-frame is removed. In case of such removal the bar breaks joint at $k^8$, the part $h'$, the top of each bar, and the detents going with the magazine. After action the bar will drop by gravity; but to insure the immediate return I have provided a universal spring return-bar K⁴. The row of bars is limited in the downward throw by a stop-plate $k^{10}$, and each bar is guided by notched plates $k^{11}$. It is obvious, for example, that the escapement may have its upper finger thrown into engagement with the recess of a type by the upward movement of the key-bar while the lower finger is withdrawn from the recess of the type next below. The type will thereupon fall into the lower chute H⁴ of the magazine, taking its place in the line of type assembled in the type-channel of the composing-block L. In Figs. 67, 68 the types are shown as sustained by the lower finger and awaiting the action of the escapement-bar. Fig. 68 illustrates and Fig. 67 indicates the necessary alternating variation in the length of the fingers of the detent to reach the inner and outer channels. Suppose a key to have been struck by the operator. The key-lever $k^6$ is depressed at the front and elevated at the rear, and the bar K² is forced upward, removing the lower finger of the detent from beneath the column of type, permitting the bottom type to escape, the upper oblique cut of the key-bar in its upward movement coming in contact with the upper oblique face $k^4$, and thus forcing the upper finger into the recess of the type that is next to the lowermost and supporting it and the imposed types. The relations of the escapement to the magazine are such that the upper finger of the detent is passed into the recess of the type it is to support before the lower finger is withdrawn from the lowermost type, thus preventing the escape of more than one type at a time. The principal object of retaining the upper types is attained at the meeting of the oblique faces of the bar and the escapement; but as the bar proceeds upward the engagement is completed by the effect of the coincidence of the vertical or projecting faces. When the bar has completed its upward drive, it falls back, the return being insured by the action of the spring return-bar K⁴. The operative face of the bar passes down the upper vertical face and over the curved central face of the detent without effect, its next action being upon the lower oblique and vertical faces of the detent to produce the reverse action of the escapement, the lower finger being pushed in to receive and support the type now lowermost, from the recess of which the upper finger is withdrawn at the same time. In this, as in the preceding action, the finger being immediately driven to support precedes the finger being withdrawn, so that however the drive of the bar be varied the column is sure to be caught and supported. It is obvious that no exactly-measured movement of the bar is required. All that is necessary is to have the operative faces in contact, and the key-bar may have an excess of movement in either direction, the result being the same, the fingers being simultaneously moved in opposite directions and the escapement being locked between the movements. The fingers of the detent are arranged to reach the back row and the front row of the type-channels, the detents for the back row having the shorter fingers. The fingers embrace the block $h^{10}$, entering the channels from above and below the block. The pivots of the escapement, as described, rock in a channel in the block $h^{10}$, the body of the escapement and the head of the key-bar lie in a channel formed by the plates $h^{12}$, and the walls of the magazine-frame, the heads of the bars, serving to retain in position the several escapements. No difficulty can be experienced in assembling the parts, and there is no attachment liable to weaken, and no delicate connection to be considered. I have already described the manner in which the escapement goes with the magazine in removing that part. In replacing the magazine the escapement and bars are held in such correct alinement by the guides described that the joints $k^8$ easily and immediately lock.

I have described the escapement as in operation with a recessed form of type, and it is peculiarly applicable to perform the function it has in my machine and system of sustaining a column of upright types by contact with the lowermost and in one movement releasing a single type—the lowermost—and contacting with the succeeding type. This action is made surer by the reduced shank I give to my preferred form of types. Either of the fingers of a detent when projected into a channel of the magazine will engage the upper shoulder of a type-recess, but will permit the reduced shank to pass freely without contact. It is apparent that by this relative arrangement the types are released easily and rapidly, and while the fit of the shoulder of a type in its channel insures the engagement of the detent friction of the type in the channel is reduced as much as possible and no possibility is left for any obstruction once the support is removed from a type. At the same time the margin is such that one type cannot be released until the succeeding one is secured, and the slightest movement into a channel in advance of a type is sufficient to enable the detent to catch the type.

The action of this escapement demonstrates the advantages of my preferred form of type and also illustrates what I have hereinbefore indicated, that the type not only has an ultimate advantage in the production of a bar, but is at the same time formed to secure rapidity and economy in the operation of the machine.

While the type with the reduced shank permits the quickest and surest action of the escapement, other types are readily handled by the escapement. It may be supposed, for example, that a column of recessed full-shanked types are resting upon the lower finger of a detent. When the key-bar is operated, the upper finger will enter the recess of the succeeding type, and immediately thereafter the lower finger will be withdrawn from the base of the lowermost type, permitting it to fall. On the down movement of the operating-bar the lower finger will be projected into the path of the now lowermost type, and the upper finger being withdrawn the type will drop to the lower finger, which will then again support the column. My device is applicable also to plain types or types presenting smooth sides. In such a case the fingers of the escapement may be made the same distance apart as the length of the type and the entering end of the upper finger made thin or brought to a knife-edge, so as to engage the edge of the bottom of the next to the lowest type and not come in contact with the cameo or top of the type below, (see Fig. 72,) or the escapement may be longer than a type, the end of the upper finger engaging the side of the type and holding it by pressure until it can be dropped upon the lower finger. The ends of the upper finger, as indicated, may have various conformations to suit the peculiar situations. In the form used with my types it is preferable to curve the upper corner of this finger, as at $k^{12}$, Fig. 70, upon an arc whose center is at the pivot $k^5$, so that the finger upon withdrawing may not slightly raise the column of types.

In the preceding description the operation has been defined without reference to the number of rows of channels in the magazine.

Under the heading "7. Magazine" I have described the peculiar construction which enables the escapement to discharge units of any number of differing measures from a plurality of channels. (See Fig. 10 of the drawing.)

I provide a separate escapement for the justifiers, which, as hereinafter described, are fed from the justifier-magazine S by way of the chute $s^6$. The escapement-detent $K^5$ is a forked arm carried by a shaft $k^{13}$, journaled in brackets on the plate $n^8$, Figs. 1, 82, 73-75. The detent has two fingers $k^{14}$ $k^{15}$, the first being arranged to project into the chute $s^6$ in front of the butt-end of the justifier, while the other projects into the chute near the thin end of the justifier, so that it forms a stop for the succeeding justifier. It will be observed that the detent $K^5$ is shorter in reach than the length of a justifier and that the finger $k^{15}$ is so disposed that when actuated it will project up alongside the end of the justifier, and thus intercept the butt-end of the next succeeding justifier. At the opposite end of the shaft $k^{13}$ is a head $K^6$, which carries out the principle of construction of the face of the type-escapement detent. Its operating-bar $K^7$ is also constructed on the same principle as the bar $K^2$, and the operation is the same with respect to the face of the head $K^6$, the effect being to rock the escapement-detent, releasing the lowermost justifier and temporarily restraining the succeeding justifier until the bar is released, whereupon the succeeding justifier takes the place of the previous lowermost justifier against the finger $k^{14}$.

*10. Composing-block L, Figs. 1, 10, 76-89, 102, 109.*—The line-composing block L, Figs. 76-89, has two sections, a fixed section L' and a movable section $L^2$, lying in a cut in the fixed section and having the outer edge of its top plate seated in a groove in the outer wall of the fixed section. The upper face of the section $L^2$ receives the justifiers as they are supplied from the justifier-magazine S, supporting them so that they may lie at right angles to the assembling type and with their rectangular apexes across the line and between the words, which are held in a variable type-channel $l$ between the downwardly-turned side of the section $L^2$ and the inner wall of the fixed section $L'$, the bases of the types resting upon the bottom of the channel. The outer wall of the fixed section $L'$ has a ledge $l'$, projecting inward, which is adapted to cover the butt-ends of the justifiers and to serve to maintain them in position during the transfer of the line in a fixed relation to the type-channel.

A justifier-guide $L^3$ is attached to the outer wall of the fixed section of the composing-block and extends across the upper face of the movable section $L^2$, being inclined inward from the point where it receives the justifiers to the point at which they reach the surface of the movable section $L^2$. At its head the guide has a downwardly-inclined offset $l^2$. The justifiers, therefore, as they shoot in by the channel $s^6$ are guided over and down to the surface of the movable section $L^2$. The bottom surface of the justifier-guide is cut away, as shown at $l^3$, Figs. 85 and 88, so that a justifier in shooting down may be held on the farther side by the shoulder of the cut in order to prevent the butt-end of the justifier slipping to the left. The surface of the movable section $L^2$ is reduced or cut down at $l^4$, so that when the justifier reaches its final position it will lie in the reduced portion and between the side of a type and the shoulder of the reduced portion. The justifier has, however, an intermediate position. The edge of the inclined offset $l^2$ and the edge of the top plate of the line-shifter $N'$, hereinafter described, stop short of the shoulder of the recess $l^4$, and in the space thus formed the thin end of the justifier first rests, one side lying against the preceding type and the other side against the line-shifter, the butt lying in the cut $l^3$. When the justifier and the preceding types are pushed forward, as hereinafter described, by the type-packer M, the justifier will drop into the space between the type and the shoulder of the recess or reduced portion $l^4$.

It has been observed that the types I prefer to use are centrally recessed, as shown. In the inner wall of the fixed section $L'$ is a cut in which lies a pivoted spring-pressed locking-bar $L^4$, illustrated as of triangular form in cross-section, which projects into the central recesses of the types and, pressing against the lower shoulder of the recesses, holds down the types against any possible upward throw. The locking-bar $L^4$ may be swung upon its pivot by means of a pivoted lever $l^5$, which strikes a free pin $l^6$ and which is operated by a bar $L^5$, located on the front of the composing-block. It is apparent that when the bar $L^5$ is struck the locking-bar $L^4$ is turned up out of the recesses, and the operator may at will remove any type for the purposes of correction. The movable section $L^2$ has at each end a flange or side wall $l^7$, and these flanges close the ends of the cut in the fixed section $L'$ and serve also as bearings for the shaft $l^8$, to which are secured the polygonal adjusters $L^6$. A spring $l^9$ is attached to the inner side of the depending front wall of the movable section $L'$ and the other end to a pin in a recess of the composing-block. This spring tends, through the movable section and shaft $l^8$, to draw down and hold the polygonal adjusters $L^6$ against the inner side of the outer wall of the fixed section. These adjusters are polygonal sleeves or enlargements carried by the shaft $l^8$ and have in the present example eight faces arranged eccentrically with reference to the shaft $l^8$, though of course any desired number of faces may be used. The shaft $l^8$ has on the outer end an enlarged head $l^{10}$ and a pin $l^{11}$, passing through the shaft. The face of the head is marked to indicate eight grades or widths of type. On the flange or side $l^7$ an arrow may be placed to fix the register for the indicating-mark. The tendency of the spring $l^9$ is to draw the depending wall of the movable section $L^2$ away from the opposing wall of the fixed section $L'$. This movement is governed by the polygonal adjusters, the distance between the shaft $l^8$ and the face of the adjuster abutting against the inner side of the front wall of the fixed section determining the extent of movement of the movable section, and therefore determining the width of the type-channel.

The types fall from the magazine into an extension $l^{12}$ of the type-channel, Figs. 82, 83, and 89. When a type drops into the extension, it stands nearly vertical, held on three sides. Its back rests against a wall of the type-channel extension and a downwardly-projecting flange of a line-shifter and channel-guard $N'$, hereinafter referred to and described. The flange is preferably, as shown, triangular in cross-section to make a proper support, Figs. 83, 86, 87. The front of the shank of the type lies against a piece $l^{13}$ at the bottom and a guide-piece $l^{14}$ at the top, which practically form a continuation of the chute leading from the magazine, Figs. 76, 77, 80, 82, 89. On the side, at the end of the extension, pivoted to the housing $M^5$, hereinafter referred to, is a spring-pressed piece $l^{15}$, Figs. 89, 93, whose action inward is limited by a stop $l^{16}$, while on the other side the type is at one point adjacent to the preceding type, which has been pushed over by the type-packer, as hereinafter described and as indicated in Figs. 76 and 89. Each type is then to be inclined to register with the type-channel, pushed forward, and locked in the forward position progressively, so that the assembled units shall not interfere with the subsequent composition. These acts are performed by the type-packer and its adjunctive devices.

11. *The type-packer M,* Figs. 1, 10, 76, 77, 80, 89–94.—The device for pushing forward the types and feeding the line step by step (the type-packer M, Figs. 89–94) comprises a rotating wedge sector-wing M', a spring-pressed sleeve $M^2$, a guide or stop roller $M^3$, a driving friction-disk $M^4$, a pivoted spring-pressed housing $M^5$, and, as adjuncts in the composing-block, lever and finger $M^6 M^7$ to rock the type. The friction-disk $M^4$ is adapted to engage the main pulley A', a contact-ring $M^8$ being provided, as shown, Fig. 1. The disk is attached to a short shaft $m$, which bears a gear $m'$, adapted to engage a gear $m^2$ on the end of a shaft $m^3$. The shaft $m^3$ is journaled, as shown, in the housing $M^5$, so as to sustain the several parts, though it may also have a bearing at the opposite end. The inner end of the shaft $m^3$ bears the sleeve $M^2$, having a slot playing over a key on the shaft and threaded at one end to receive a nut $m^4$, which is split or kerfed on one side to form a lock, a screw serving to bind the divided edges upon the thread of the sleeve. The sleeve $M^2$ bears a collar $m^5$, having a recess $m^6$, and this collar lies between the nut $m^4$ and the stop or guide roller $M^3$, which turns upon a short shaft depending from the top of the housing $M^5$. The sleeve $M^2$ is pressed forward by means of a spring $m^7$, held between the nut $m^4$ and a nut $m^8$, secured to the shaft $m^3$. The sector-wing M' on the end of the sleeve $M^2$ may be integral with the sleeve and gradually increase in thickness or may have one side inclined so that it presents a wedging-face in action, or it may simply be beveled at the acting edge. It is the function of this wing to enter behind a type and push it forward. It is evident that the thin edge is admirably adapted for the engagement and that the increasing thickness will tend to force forward the type; but in addition to the rotary movement of the type-packer the sleeve $M^2$ and the attached wing have an intermittent reciprocating movement. While the full part of the collar $m^5$ wipes the roller $M^3$ the sleeve is held back; but when the recess $m^6$ registers the spring $m^7$ throws forward the sleeve, imparting a blow through the wing in addition to its rotary wedging action. This action is regulated by the relative position of the parts so the blow is not given until after the engagement of the wing with the type. The wedging action is sufficient in itself to carry a type partly or entirely out of the path of a succeeding type; but the blow insures the forwarding of the line. The pivoted spring-pressed piece $l^{15}$ at the end of the extension of the type-channel is beveled at the top, so that the sector-wing may wipe down the incline, pressing back the piece and making an opening between the types and the piece. This insures a gradual and sure engagement for the sector-wing behind the last type. The arrangement is such that it is not possible to have any interference between the types as they drop from the magazine and the packer, for the wing is turning in a direction parallel with and away from the path of a type, and when the wing comes up on the opposite side it presents the thin edge in its retracted position. The end of the shaft $m^3$ is cut down or, in effect, bears an offset $m^9$. It is the function of this offset to engage and force back at intervals the upper arm of the bell-crank lever $M^6$, Figs. 76, 77, 89, pivoted to the housing $M^5$, its lower member engaging the finger $M^7$, drawn by a spring $m^{10}$. The finger $M^7$ tends to strike against the shank of a type in its path below the center of the type and swing it into line with the inclined type-channel, the type being first dropped into the extension $l^{12}$ of this channel, standing about vertically therein, and then moved forward just beyond the channel-guard and line-shifter N' and in front of the finger $M^7$ by the action of the sector-wing. The finger $M^7$ has a projection against which the lower member of the lever $M^6$ plays. When the lever $M^6$ is forced back by the offset $m^9$, the finger $M^7$ is thrown back and held until a fresh type drops, when it is released and at once springs forward, rocking the last type as it is fed forward into line with the type-channel. The relative positions of the wing M' and the offset $m^9$ are such that the type is pushed forward and swung upon its axis into line with the type-channel in rapid succession, so as to impart a continuous compound movement to exactly and rapidly place each type; but the details of construction and the relations of these actions may of course be varied as circumstances may suggest.

The parts of the type-packer are carried and protected by a housing $M^5$, pivoted to the machine at $m^{11}$, Figs. 1, 82, 89, 94. The front of the housing and the movable section $L^2$ of the composing-block abut. The back of the housing lies against and is held from upward displacement by a continuation $n^{14}$ of the top plate $n^8$ on the front of the bed of the machine, Figs. 82, 89, and is pressed forward by a spring $m^{12}$, so that when the movable section is adjusted to regulate the width of the type-channel the housing and the type-packer it carries will follow the section, that the same relations may obtain at all times. The line of type is forced forward against the resistance of a spring-held finger $N^7$, a resistance just sufficient to maintain the upright position of the types and to keep the units of the line in their proper relations. This finger is a part of the transfer-carriage now to be described.

12. *Line-gage and transfer-carriage N,* Figs. 1, 10, 76, 79, 82, 89, 94–110.—I provide a transfer-carriage under the control of the operator for carrying the line out of the composing-block, mechanism which may be set to regulate the length of a line, accompanied by mechanism for sounding an alarm when the line is complete or approximately complete, mechanism for preventing the forwarding of an incomplete line, and mechanism also for at once furnishing a rear guard for the types being assembled and for forwarding the line in the channel in advance of the action of the transfer-carriage to carry the line away from the point at which the types enter under the action of the type-packer, so that the operator cannot overcharge a line. This latter mechanism is in certain of its functions so intimately associated with the type-packer that it will be first described as an adjunct of the type-packer and finally in order in its proper relation to the line-gage mechanism. The mechanism lies at the front of the machine, immediately before the operator, and so placed between the composing-block and the keyboard as to be protected. The parts may be made of light material and may be nicely adjusted, being subjected to but little strain. The essential feature is the provision of a device for forwarding the line away from the assembling or receiving point of the type-channel which may be operated at any time after the sounding of the alarm, which will act automatically in case of any attempt to overcharge the line by the operator, and which is nevertheless so arranged that while the operator cannot throw forward a short or incomplete line he may advance a completed line to inspect it before removing or transferring it. This device is arranged, as previously stated, to serve as a channel-guard for the line of type; but it will be hereinafter termed a "line-shifter" to designate it principal function.

The line-shifter N', preferably L-shaped in cross-section, lies immediately in front of the point at which the types and justifiers are discharged into the composing-block, the inner end being in practice when at rest about on a line with the forward side of the type last discharged before it is forwarded, as shown in Fig. 89. Its top plate, however, as previously stated, stops short of the position of the first type in the channel to form a rear guard for the thin end of a justifier in its first position after discharge. The line-shifter, as stated, is preferably L-shaped in cross-section. Its short arm is half-wedge-shaped, so that the arm may form a continuation in a straight line of the outer wall of the extension of the type-channel. The type is pushed ahead of the line-shifter, then tipped or turned by the finger $M^7$ of the type-packer, so that it finally lies behind the inner end of the short arm of the line-shifter, which projects over and into the extension of the type-channel. The line is thus held against the end of the line-shifter by the retarding pressure of the finger $N^7$ and cannot interfere with the subsequent composition or the action of the type-packer. The line-shifter has a horizontal movement given it to forward the line at intervals; but the mechanism for imparting this movement being connected with the mechanism for regulating the length of the line, sounding the alarm, and transferring the line the further description thereof will, as previously indicated, follow in the order of description of that mechanism. The mechanism comprises the line-shifter N', a slide which under the impulse of a spring carries ahead the types lying in front of it when a catch $N^{11}$ is released by the turning aside of a latch $N^3$. The latch $N^3$ is on the end of a shaft subject to a constant force tending to rotate it away from the machine. The shaft is prevented from rotating during composition by a latch $N^2$, lying over a flange $N^8$ of a tube $n^{16}$. Any force which carries the line of type ahead in the type-channel will carry along at the same time the tube and flange by means of the attached finger $N^7$. The flange has a main part and an extension at a lower level than the main part, and it slides beneath a latch $N^2$. When the lower level of the flange is reached, the latch drops far enough to lift a latch away from the catch of the alarm mechanism, bringing the alarm into action. If the line travels on, the flange will be removed from beneath the latch $N^2$, the shaft will rotate further, and the latch $N^3$ will be thrown out, releasing the catch $N^{11}$, and thereby the line-shifter N'.

The operator may cause the movement of the line-shifter by striking a lever $N^{13}$, an arm $N^{14}$ of which will turn back the latch $N^{11}$, releasing the line-shifter. This, however, he cannot do until after the alarm has sounded, because the operative arm is held from action against the latch $N^{11}$ by a stop which moves out of the path by the turning of the shaft carrying the latch $N^3$. This prevents the transfer of an incomplete line.

The specific elements are illustrated separately in Figs. 95-103. Fig. 95 shows the parts locked, as ordinarily during composition. Fig. 96 represents the position of the parts after the alarm. Fig. 97 shows the parts as they are when the line-shifter has gone into action, and especially the automatic release of the line-shifter. Inasmuch as these figures show generally the same parts, I have used Fig. 95 as a reference-figure, except for occasional features better shown in the other views, indicating the principal parts in the other two figures.

A shaft $n$ is journaled in brackets $n'$, attached to the bed $A^3$ of the machine. The shaft $n$ bears along its top a series of notches $n^2$, any one of which will receive and retain an inwardly-projecting stop or catch-finger $n^3$. The catch-finger $n^3$, Fig. 94, projects from a sleeve $n^4$, surrounding a spindle $n^5$, journaled in a bushing $n^6$, placed in an opening $n^7$ of a guide-plate $n^8$, and may be adjusted by means of a button $n^9$, adapted to be grasped by the operator. The spindle $n^5$ carries at the bottom a pinion $n^{10}$, which travels along a rack-path $n^{11}$, formed upon or attached to a depending flange $n^{12}$ of the guide-plate $n^8$, thereby carrying the catch-finger along the rod $n$. A shoulder of the sleeve $n^4$ and a shoulder of the bushing $n^6$ are utilized to maintain a spring $n^{13}$, which normally holds the catch-finger $n^3$ down into engagement with one of the notches $n^2$ of the rod $n$. The catch-finger may be lifted by means of the button $n^9$, and when the button is rotated the flange-latch $N^2$, between the ears of which lies the finger $n^3$, will be drawn in either direction, as desired, along the rod $n$, the pinion $n^{10}$ traveling along the rack-path $n^{11}$, which is wider than the pinion. It is the function of the finger $n^3$, as stated, to carry the flange-latch $N^2$ back and forth along the rod $n$ and to secure the latch at determined points with reference to the regulation of the length of the line of type to be assembled, the point being fixed by reference to an indicator-plate $n^{15}$, removably attached to the plate $n^8$ and lying in front of the rod $n$. The rod $n$ carries at its inner end three latch-fingers $N^3$ $N^4$ $N^5$. The function of the latch $N^3$ is to lock the line-shifter $N'$ and its connecting-levers until the bell has rung. The function of the latch-finger $N^4$ is to lock the alarm or bell-ringing device until the proper time for the alarm, and the function of the latch $N^5$ is to secure the shaft $n$ after the resetting rotation, so that the flange-latch $N^2$ may permit a flange $N^8$ of the transfer carriage to pass beneath it upon the return of the carriage after transferring a line out of the composing-block, as hereinafter described.

In a recess in the bed of the machine lies the transfer-carriage, a U-shaped box $N^6$, Fig. 102, inclosing a tube $n^{16}$, which surrounds a spring $n^{17}$, attached at one end to a pin seated in the box and at the other end to the finger $N^7$, which, as stated, acts as a resistant to the forward movement of the line of type. The tube $n^{16}$ has a projecting flange $N^8$, with an extension $n^{18}$ at the outer end, which is on a lower plane than the main part of the flange, the flange, as stated, playing beneath the flange-latch $N^2$. The finger $N^7$ is attached to the tube $n^{16}$ and carries the tube and flange with it as it moves forward against the slight resistance of the spring $n^{17}$. A trip-guard $n^{19}$ is pivoted to the transfer-carriage, and normally its foot lies over the flange $N^8$, preventing a premature rotation of the flange and to, in effect, lock the flange and connected parts. When the flange is drawn from under the flange-latch $N^2$, it is obvious that as the latch is attached to the revoluble spring-pressed rod or shaft $n$, and therefore constantly pressed down upon the flange, it will first drop to the extension $n^{18}$, and then as the flange $N^8$ moves forward the latch will dop off the end of the extension, being limited in the downward movement by a recess $n^{20}$ in the bed of the machine. (See Fig. 94.) These rotations of the shaft $n$ are caused by the pressure of a spring $n^{21}$, Figs. 97, 98, which constantly presses upon the back of a follower $N^9$, swinging upon the shaft $n$ between the ears of the alarm-latch $N^4$, the enlarged head of the follower bearing against the inner shoulders of the latch $N^4$, which, with the line-shifter latch $N^3$, is attached to the sleeve $n^{22}$, fixed to the shaft $n$. The follower has at the bottom an extension, which forms a stop $n^{23}$, Figs. 95, 96, to prevent the premature use of the actuating mechanism attached to a shaft $n^{41}$, as hereinafter described. The latch $N^4$ controls the alarm mechanism. The shaft $n^{24}$ is journaled in the brackets on the front of the machine, which may be an extension of the brackets $n'$, and it may also be journaled in a bracket at the opposite inner end. The shaft bears a clapper $n^{25}$, arranged to strike a gong $n^{26}$, partial revolution being caused by a spring $n^{27}$, attached to the shaft $n^{24}$ and bearing against the front of the bed of the machine. The other end of the shaft $n^{24}$ bears a catch $N^{10}$, adapted to be held by the alarm-catch $N^4$. As shown, the alarm-catch $N^{10}$ is attached to the end of the shaft $n^{24}$ by a sleeve and projects upward, so that when it is turned outward the top may be caught and held against the force of the spring $n^{27}$ by the alarm-latch $N^4$. When the flange-latch $N^2$ is resting upon the flange $N^8$, the alarm-latch $N^4$ is held down and engages the alarm-catch $N^{10}$. When the flange $N^8$ by the forward movement of the finger $N^7$ is drawn from under the latch $N^2$, the finger drops to the lower level of the extension $n^{18}$, and thereupon the shaft $n$ is partially rotated and the alarm-latch $N^4$ turned up, so that it no longer engages the catch $N^{10}$. The spring $n^{27}$ at once rotates the shaft $n^{24}$, and the clapper $n^{25}$ strikes the gong $n^{26}$. The flange-latch $N^2$, as has been stated, is set to leave the flange $N^8$ at a point fixed in view of the predetermined length of the line, and the ringing of the bell may therefore indicate the approximate completion of the line. The alarm-catch $N^{10}$ has on its back an incline $n^{28}$, against which plays an arm, as hereinafter described, to return the catch $N^{10}$ to a position to be again engaged by the alarm-latch $N^4$. It is the function of the finger $N^3$ on the end of the shaft $n$ to lock the line-shifter slide $N'$ against the forward pull of a spring $n^{29}$ by holding down the catch $N^{11}$. The line-shifter latch $N^3$ is illustrated as having two vertical portions connected by a horizontal portion having a bevel $n^{30}$ on its forward under surface, against which plays the inclined surface of an arm on the head of a shaft $n^{41}$ when that shaft is operated to return the parts, as hereinafter described.

The line-shifter $N'$, as stated, is locked during composition by the latch $N^3$ resting upon the catch $N^{11}$. The line-shifter $N'$ itself has been described and its function pointed out under the preceding heading and elsewhere. As stated, it is adapted to form a solid rear support or guard for the line of type and the justifiers and finally to force forward the line away from the point of discharge from the magazine. It is operated by a spring $n^{29}$ through an arm $n^{31}$, to which it is secured. One end of the arm $n^{31}$ has a bifurcation $n^{32}$, in which lies the end of an arm $n^{33}$, pivoted at $n^{34}$ to the fixed section of the composing-block. The bifurcation permits the transfer movement of the line-shifter to follow any adjustment of the movable section of the composing-block. On the opposite side and projecting downward is the arm $N^{12}$, beveled on the bottom at $n^{35}$ to receive the action of a beveled face $n^{47}$ of an arm $N^{16}$ to return the arm $N^{12}$, line-shifter $N'$, and line-shifter catch $N^{11}$, as hereinafter described. The catch $N^{11}$ is attached to or is a part of a plate $n^{36}$, which is pivoted to a plate $n^{37}$, the plate $n^{37}$ being integral with the arms $n^{38}$ and $N^{12}$. At $n^{38}$ is a pin, and between this pin and the top of the catch $N^{11}$ is a spring $n^{39}$, which permits a lateral movement to the catch $N^{11}$. The catch $N^{11}$ has a horizontal portion $n^{40}$ at the bottom, on which rests, when in engagement, the foot of the line-shifter latch $N^3$, while on the under surface and at the front of the part $n^{40}$ is a bevel against which plays a finger $N^{15}$, pivoted to an arm $N^{14}$ on a shaft $n^{41}$, connected to a hand-lever $N^{13}$. The function of this finger is to push aside the line-shifter catch $N^{11}$ and release it from the engagement of the line-shifter latch $N^3$. It should be remarked that this release is easily accomplished, for the partial rotation of the shaft $n$ has thrown forward the latch $N^3$ to the edge of the catch $N^{11}$, as shown in Fig. 96.

It has been observed that the alarm mechanism is operated as a result of the forward travel of the line of type and that the advancing of the line beyond the assembling-point is effected by the line-shifter, released automatically or by fingers connected to the shaft $n^{41}$. Leaving the third latch $N^5$ of the shaft $n$ for the present, because it is the last to come into action upon the return of the transfer mechanism, the mechanism for releasing the line-shifter latch $N^3$ and for resetting the several latches will now be described.

The shaft $n^{41}$ is journaled in brackets $n^{42}$ at one side of the machine and is governed by a spring $n^{43}$. This spring encircles the shaft, constantly tending to hold it in the inoperative position and serving to return it after the shaft has been partially revolved by the operator through the medium of the hand-lever $N^{13}$. The shaft $n^{41}$ bears on its inner end an arm $N^{14}$, having an operating-face $n^{44}$, cut away on an incline, and also another operating-face $n^{45}$. Pivoted to the arm $N^{14}$ is the arm $N^{15}$, spring-pressed and limited in its downward movement by a pin $n^{46}$, Fig. 97. Another arm $N^{16}$ is attached to the shaft and bears a beveled projection $n^{47}$. It is the function of the arm $N^{15}$ to push back the catch $N^{11}$ to release the line-shifter $N'$, and this is the only one of the arms which has any function until the line has been completed, and, in fact, transferred from the composing-block. The arm $N^{14}$ is brought into play by a downward movement of the hand-lever $N^{13}$. A continuation of the downward movement brings up the face $n^{45}$ of the arm $N^{14}$. The follower $N^9$, with its stop $n^{23}$, having been pushed out by its spring to cause the rotation of the shaft $n$, the moving of the stop has cleared the way for the projecting face $n^{45}$. The face $n^{45}$ wipes upon the projecting curve $n^{28}$ on the back of the alarm-catch $N^{10}$, so that the catch is thrown out ready to be caught by the alarm-latch $N^4$. As the shaft continues the inclined face $n^{44}$ of the arm $N^{14}$ strikes the bevel $n^{30}$ of the line-shifter latch $N^3$ and turns it back into a position to act as a lock for the catch $N^{11}$, whose spring $n^{39}$ has it ready for reengagement, but which is held elevated and out of engagement by the spring $n^{29}$. The beveled face $n^{47}$ of the arm $N^{16}$ then wipes the inclined bottom $n^{35}$ of the arm $N^{12}$ and carries it back, rocking the body $n^{37}$ and returning the line-shifter $N'$, and also rocking the catch $N^{11}$ under the line-shifter latch $N^3$, the spring $n^{39}$ causing the foot of the catch to snap forward from the rear of the line-shifter latch, the spring having previously permitted the catch to yield behind the latch while traveling down from the position shown in Fig. 99 to that of Fig. 95. When the line-shifter latch $N^3$ was rocked by the action of the arm $N^{14}$, the same action revolved the shaft $n$ and brought the latch $N^2$ up into a position to receive beneath it the flange $N^8$, returning after traveling forward; but the spring $n^{21}$, through the follower $N^9$, constantly pressing against the shoulders of the alarm-latch $N^4$, tends to rotate the shaft $n$ as soon as the positive support of the inclined face of the arm $N^{14}$ is removed from beneath the inclined face on the bottom of the line-shifter latch $N^3$. If this should be permitted, the latch $N^2$ would be in too low a plane to let the flange $N^8$ pass beneath it. Therefore to hold the shaft $n$ from the inward rotation the shaft-latch $N^5$ is provided. This latch, like the others, is attached to the shaft $n$ and reaches inward to a point just short of the flange $N^8$. By its side, attached to the bed of the machine between the shaft $n$ and the flange $N^8$, is a catch $n^{48}$, spring-pressed and having a projection $n^{49}$, Fig. 101. The normal tendency of this catch is to lie up against the shaft-latch $N^5$; but it is prevented from so doing by the fact that it abuts against a projection on the guard $n^{19}$, attached to the transfer-carriage, Fig. 100. When the carriage travels forward, carrying away the guard, the catch is released and presses against the shaft-latch $N^5$, so that when the rotation of the shaft $n$ occurs in the resetting of the parts and the latch is thereby lifted the projection $n^{49}$ of the catch takes under the latch and holds it up, and thereby maintains the shaft in its farthest outward rotation to permit the returning flange $N^8$ to slide easily under the latch $N^2$, the guard $n^{19}$ thereafter striking the catch $n^{48}$ and withdrawing the projection from beneath the latch $N^5$, so that it drops to its position at rest slightly below the level of the flange. The release of pressure from the hand-bar $N^{13}$ permits its spring to return the shaft $n^{41}$, and the arms $N^{14}$, $N^{15}$, and $N^{16}$ return to their normal position. The face $n^{45}$ of the arm $N^{14}$, sliding down the inclined front face of the stop projection $n^{23}$, forced it slightly in during the passage. When the face $n^{45}$ has passed, the stop springs out and lies above the end of the face, so that the shaft $n^{41}$ cannot be turned by the operator until after the bell has rung and the flange $N^8$ has passed from beneath the latch $N^2$, at which time, as before described, the stop $n^{23}$ is removed from the path of the face $n^{45}$ by the outward movement of the follower $N^9$.

The description has proceeded thus far upon the assumption of the use of the hand-bar $N^{13}$, by a single downward stroke of which the line-shifter latch $N^3$ may be withdrawn from the foot of the catch $N^{11}$, permitting the line-shifter $N'$ to carry forward the line of type and immediately thereafter resetting the alarm-latch $N^4$, the line-shifter and its latch $N^3$, and incidentally the shaft-latch $N^5$, which is to hold up the shaft $n$ and the attached latch $N^2$, so that the flange $N^8$ may pass beneath the latch $N^2$. I provide, however, for the automatic action of the line-shifter, so that the operator cannot overcharge the line. This is secured by the simple expedient (already described) of having the forward finger $N^7$ carry ahead the flange $N^8$. The latch $N^2$ has already been set so that it will drop from the extension $n^{18}$ of the flange $N^8$ at the exact point of the completion of the line. Obviously the dropping of the latch $N^2$ from the flange will cause the shaft $n$ to rotate and will remove the line-shifter latch $N^3$ from the foot $n^{40}$ of the catch $N^{11}$, permitting the line-shifter to move forward. This automatic action is of course sufficient; but I have provided the hand-lever $N^{13}$, so that the operator can throw forward the line without awaiting the automatic action and so that, as will be more fully brought out hereinafter, the shifting of the line and its transfer from the composing-block may be practically one continuous movement. I have thus arranged the parts so that in addition to the advantages stated the operator may use his judgment in breaking a line after the alarm has rung. The alarm may be set to ring in advance of the termination of an ordinary line, and the operator may at once decide to transfer the line ahead of its full complement, if that should be expedient, to prevent an inartistic breaking of a word. If he should neglect this, he can do no more than fill the line.

As has been observed, the transfer-carriage has a reciprocating movement, which is imparted to it through a rack $n^{50}$ by a pinion driven and controlled by mechanism described under the succeeding heading, "Line-transfer mechanism." A spring-pressed finger $N^{17}$ is pivoted to the transfer-carriage. This finger and the finger $N^7$ hold the line between them and carry it out of the composing-block. While the line is assembling the rear finger $N^{17}$ lies back of the line, held there by projection $n^{51}$, Figs. 89 and 109, down which it slides when the carriage moves forward and up and behind which it passes upon the return of the carriage. The trip-guard $n^{19}$ has a depending foot, which lies upon the flange $N^8$ while the line is assembling and prevents the premature or accidental turning of that flange. As the carriage sweeps forward with the completed line a point on the trip strikes an inclined face $n^{52}$ of a projection $n^{53}$, attached to the bed of the machine near the outer end of the composing-frame, and as the guard swings forward its foot turns off the flange $N^8$ into a recess $n^{54}$, permitting the flange when actuated to turn up and draw the finger $N^7$ away from the front of the line of types. The trip-guard has an inclined shoulder, so that when the guard returns its foot is forced in and replaced upon the flange, which has been turned down by the passing of the finger $N^7$ over the front inclined face $n^{55}$ of projection $n^{53}$. The upturning of the flange $N^8$ and its tube and finger $N^7$ is performed positively by a lever-arm $N^{18}$, fulcrumed and pivoted on lugs pivoted in one of the brackets $n^{42}$, in which is journaled the shaft $n^{41}$. The end of the arm $N^{18}$ is joined by a spring $n^{56}$ to the end of the bracket $n^{42}$. Thus the arm $N^{18}$ is capable of both a vertical and a horizontal movement, and its normal tendency is to press upward, through the force of the spring $n^{56}$, against the flange $N^8$. A slide $N^{19}$ lies in a recess in the bed of the machine just in front of the open mouth of the transfer-carriage $N^6$ and in the path of the arm $N^{18}$. The slide is preferably reduced in width at the outer end, so that it may be secured in place by a plate or other fastening reaching into the recess, while at the inner end it is reduced in height. The feature of the slide is a recess $n^{57}$ with an undercut incline $n^{58}$ at one side, as shown at Figs. 106 to 109, the parts being shown as viewed from the rear to more clearly illustrate the relations of the slide and arm. A plate $n^{59}$, attached to the bed of the machine, extends over this mechanism and has a stepped recess at $n^{60}$ to permit the arm $N^{18}$ to be secured beneath it when the inward movement of the slide $N^{19}$ causes the incline $n^{58}$ to engage the beveled side of the arm and force it down and inward, so that it lies in a position beneath the flange $N^8$, but held from turning the flange and its tube. When the outward movement of the slide occurs, the incline $n^{58}$ moves from above the arm, the vertical side of the recess $n^{57}$ strikes it and carries it over from beneath the thicker step of the recess $n^{60}$ to the space beneath the thinner step, Fig. 107, where the spring $n^{56}$ throws it up and turns up the flange $N^8$, and thereby turns back the finger $N^7$ from in front of the line of type. This occurs immediately after the foot of the trip-guard $n^{19}$ leaves the flange. The slide is operated by two pins $n^{61}$ $n^{62}$ on the transfer-carriage engaging with a pin $n^{63}$ on the slide $N^{19}$, the first drawing in the slide, the second forcing it out. As the carriage returns the movement forward and down of the finger $N^7$, the tube $n^{16}$, and the flange $N^8$ to the assembling position is assured by the forward face $n^{55}$ of the projection $n^{53}$, on which the finger $N^7$ rides, as previously stated.

The action of the fingers $N^7$ and $N^{17}$ has been defined in following out the several stages of transferring a line. In principle these fingers are the same as the long familiar devices of various forms used in type-setting and other machines to grasp a line and forward it; but I secure certain advantages of function and economy by using the construction shown. Both of the fingers conform to the shape of the composing-block at the rear and surround or embrace the block, being journaled to the transfer-carriage in the bed of the block. The movement of each finger is horizontal to engage or release the line—that is, a slight movement forward or backward in the least possible space. This gives a quick action to the fingers and is also a feature in the economy of space characteristic of the machine and fits into the scheme of vertical arrangement of the several parts of the type-setting division of the machine. It will be observed that the finger $N^7$ lies before the line during assembling, thus having the function of the familiar resistant.

*13. Relations and operation of the type casting and type-setting elements.*—I have in the course of the preceding description defined the individual and collective functions of the everal parts. The melting-pot, the mold-carrier, the mold-operator, and the magazine, together with their actuating means and supplemental features, are the elements which continuously and automatically cast and store the printing units—the types and quads, and, if necessary, the justifiers. The escapement, the composing-block, with its means for holding the types, and its transfer-carriage and transfer mechanism, the type-packer, and the line-gage and alarm are the features which have distinct and individual functions, the sum of all going to complete a type-setting machine. It is purposed now to define the relations and conjoint operation of these elements.

The movable section $L^2$ of the composing-block having been adjusted by means of the polygonal adjusters $L^6$ to fix the desired width of the type-channel $l$, and the latch $N^2$ having been set over the flange $N^8$ with reference to the desired length of line, the gas is admitted to the pipe $c^5$ and the burners are lighted. When the metal is melted, the lever $A^2$ is thrown over, permitting the pulley $A'$, with its clutch-sleeve $a$, to be thrown into engagement with the pinion-clutch $a'$, transmitting the power to the main shaft $A$ and to the gears and cams, as described under the heading "Driving and cam mechanism." The machine may now be supposed to have been working for some time, the mold-carrier having just started away from the magazine. It moves from over the magazine H and beneath the mold-operator F toward the melting-pot C by the action of the cam $B^2$ upon the yoke $D^3$ and the links $d^5$, sliding upon the friction-roller $d^2$. It brings up over the melting-pot, the type-cavities of its molds registering with the deep nipples $c^{10}$ of the mouth $c^9$ of the melting-pot. Instantly the presser-plate $D^8$ is brought down upon the tops of the molds through the action of the cam $B^3$ upon the lever $d^{43}$, thus securely holding the molds in the casting position in the mold-carrier. The full face of the cam $B^4$ moves from beneath the shoe $c^{13}$, sustaining the pump-rod $c^{12}$, whereupon the spring $c^{15}$, through the lever $c^{14}$, brings down the piston $c^{16}$ of the pump, forcing the metal in the auxiliary chamber $C^2$ through the nipples $c^{10}$ into the type-cavities of the molds. Practically coincident with the beginning of the movement of the mold-carrier toward the melting-pot the mold-operator F is moved up to bring the projecting tops of the fingers $F^5$ and feelers $F^6$ against the cap-plate $A^6$ to replace those not already returned by gravity. This movement and others of the mold-operator is imparted by means of the cam $B'$ and the camway $B^5$, acting upon the lever-arms $F^2$ $F^3$ to reciprocate the slides $F'$. After the mold-carrier has passed out of range the mold-operator descends, carrying the feelers into all the channels of the magazine $H'$. In those channels whose complement of type is not yet furnished the feelers will enter without effect; but if any channel be full the bottom of the feeler will strike against the uppermost type, forcing up the feeler and pushing over the corresponding finger, so that its inclined top face will ride up the side of the recess $f^9$, and the rib $f^{24}$ of the finger will be pushed over into register with the side recess $f^{25}$, allowing the spring $f^{19}$ to throw the finger up and tilt it so that the bottom hook $f^{12}$ will be out of the line of engagement necessary to draw the corresponding mold. The mold-operator then ascends high enough to carry the depending shanks of the feelers out of the path of the returning mold-carrier, which, having received its charge, is carried back by the yoke and arms $D^3$ $d^5$ and by the slide $d^9$, operated by the bell-crank lever $d^{10}$, struck by the rising slide of the mold-operator, this connection serving to insure the starting of the mold-block, at which time it wipes across the mouth of the melting-pot, the presser-plate accommodating itself to this movement of the molds. The mold-carrier comes to rest over the magazine and beneath the mold-operator. The mold-operator, which has been temporarily stationary, descends, the inclined faces of the bottom hooks $f^{12}$ of the fingers not thrown out of action play over corresponding inclines on the top hooks $d^{15}$ of the molds $D^5$, the hooks of the fingers then snap into engagement with the hooks of the molds, and in the next upward movement of the mold-operator the molds thus engaged are drawn up. As a mold rises it is stripped from the type, which is held from upward movement by the projecting faces of the shank-block $f^{20}$. After the mold has risen to a point where it clears the type the screw-head $d^{19}$ on the side of the mold catches the hook $d^{21}$ of the finger $d^6$, carrying up the finger and by means of the way $d^{22}$ forcing out the button $d^{23}$, so that the pin $d^{24}$ strikes the type on its side and forces it away from the shank-block. At the same instant the bottom of the mold has passed the projecting sides of the guide $D^7$, which springs forward to receive and guide the type, now free to fall by gravity into its channel of the magazine. The type having been thus released, the next movement of the mold-operator is down to return and release all the molds, the release being accomplished, as hereinafter described, while the mold-operator, coming into contact with the tops of the molds, forced them down into place. As the molds go down the screw-head $d^{19}$ on each mold strikes the hook of the arm $d^{25}$, so that the finger $D^6$ and the type-freeing pin and button gradually resume their positions, ready for another cast. During the downward movement of the mold-operator all the hooks of the fingers are thrown out of engagement with the hooks of the molds. This is accomplished by the action of the rock-shaft and levers $F^8$ or by the equivalent action of the ratchet and pawl $f^{26}$ $f^{29}$ upon the cam-roller $f^{23}$, rotating it, so that the recessed bar $F^7$ is thrown back, carrying with it all the fingers out of engagement with the molds. Then when the mold-operator goes up no mold will be drawn. The cam-roller $f^{23}$ may be turned back to permit the springs $f^{19}$ to replace the fingers laterally, either at once or at a subsequent stage, depending upon the mechanism employed—the rock-shaft and levers $F^8$ or the ratchet and pawl $f^{26}$ $f^{29}$. The mold-operator now rises to the farthest limit, bringing the feelers and fingers against the cap-plate $A^6$ and completing the cycle. In the meantime the pump-cam $B^4$ has taken hold of the shoe $c^{13}$ and lifted the rod $c^{12}$ and the piston $c^{16}$. This action carries up the yoke $C^4$ and forces the metal in the small chamber $c^{18}$ up through the pipe $c^{21}$ into the auxiliary chamber $c^{22}$, replenishing the charge of metal. The types are standing substantially upright in columns, each in its appropriate channel of the magazine-division $H'$. The operator, playing upon the keyboard, releases the types in any desired sequence through the medium of the escapement K, which, as fully set forth under the heading "Escapement," is peculiarly adapted to release the lowermost type and instantly support the remainder of the column. The discharged type falls down the chute-division $H^4$ of the magazine into the extension $l^{12}$ of the composing-block, the formation of the chute at the bottom bringing the type to an approximately vertical position from whatever channel it may come and also facilitating the easy and quick discharge of the type. The type is maintained upright in the extension of the type-channel by the pieces $l^{13}$ $l^{14}$ and the pivoted spring-piece $l^{15}$. The thin edge of the rapidly-rotating sector-wing $M'$ of the type-packer M comes down the inclined face of the piece $l^{15}$ and between the type and the supporting-piece, and by reason of its wedge formation instantly starts the type forward, that action being immediately followed by a forward movement of the type-packer under the impulse of its spring $m^7$, released by the coincidence of the notch in the collar $m^5$ with the periphery of the roller $M^3$. Immediately succeeding this the offset $m^9$ leaves the upper arm of the lever $M^6$, whereupon the spring $m^{10}$ throws forward the pivoted finger $M^7$, which strikes the bottom of the type now past the piece $l^{13}$ and swings the type so as to bring it in front of the line-shifter $N'$ and into line with the inclined type-channel $l$ ready to be pushed into the type-channel by the action of the type-packer upon the following type. As the composition proceeds the line passes along the type-channel, carrying ahead of it the spring-finger $N^7$. As the line approximates completion the forward part of the flange $N^3$, attached to the spring-finger $N^7$, moves from under the latch $N^2$, which drops to the extension $n^{18}$ of the flange. This permits a partial rotation of the shaft $n$, to which the flange-latch $N^2$ is attached, and as the shaft turns it carries up the attached alarm-latch $N^4$, thus releasing the catch $N^{10}$ of the alarm mechanism and causing the alarm to sound. The operator cannot previously, either by mistake or design, throw forward the line, because the shaft $n^{41}$, which carries the elements by which the line-shifter is released, is locked by the stop $n^{23}$. The stop is carried by the follower $N^9$, through which the spring $n^{21}$ rotates the shaft $n$. Therefore the turning of the shaft which releases the alarm also carries the stop $n^{23}$ away from the path of the stop $n^{45}$ of the arm $N^{14}$ on the shaft $n^{41}$. The operator now may, as his judgment dictates, either stop the composition at once or add what he regards as sufficient to complete the unjustified line and what he knows can be added within the limits of the line, or he may proceed without any reference to these considerations. In the latter case the extension of the flange $N^3$ will, when the line is full, pass from under the latch $N^2$, leaving it unsupported by the flange and causing it to drop to the bottom of the recess $n^{20}$ in the bed of the machine. The dropping of the flange-latch $N^2$ is of course accompanied by a further rotation of the shaft $n$. The first partial rotation has turned the line-shifter latch $N^3$, attached to the end of the shaft, slightly outward and brought its foot to the edge of the foot $n^{40}$ of the catch $N^{11}$, controlling the action of the line-shifter $N'$. The last rotation of the shaft releases the line-shifter catch $N^{11}$, whereupon the spring $n^{29}$ quickly draws forward the line-shifter, carrying the line away from the discharge or assembling point of the type-channel. As stated, the same effect may be had at the will of the operator after the alarm has sounded. He has but to press down the lever $N^{13}$, whereupon the shaft $n^{41}$ will turn and the finger $N^{15}$ will throw in the catch $N^{11}$, releasing the line-shifter. In this case the forward movement of the line will carry the flange from under the latch $N^2$, and the rotation of the shaft $n$ will occur in the same manner as before, but subsequent to the shifting of the line instead of before that operation. The pressing down of the lever $N^{13}$ also effects the resetting of the several latches. As the shaft $n^{14}$ turns the face of the arm $N^{14}$ strikes the incline $n^{30}$ on the bottom of the line-shifter latch $N^3$ and carries back the latch, rotating the shaft $n$, lifting the latch $N^2$, and bringing down the alarm-latch $N^4$, an offset $n^{45}$ of the arm $N^{14}$ having previously in the same movement passed over the curved projection $n^{28}$ and turned back the alarm-catch $N^{10}$. The shaft-latch $N^5$ is also lifted, and the lug of the spring-pressed catch $n^{48}$ plays beneath the latch, so that the shaft is held at its extreme outward throw and the flange-latch $N^2$ is held up so that the returning flange will easily and surely pass beneath the latch. As soon as the arm $N^{15}$ passes the catch $N^{11}$ its spring $n^{39}$ puts it into the lateral position for reëngagement. The arm $N^{16}$ now wipes the foot of the arm $N^{12}$ and the line-shifter is carried back to its original position, the line-shifter catch $N^{11}$ swinging under the line-shifter latch $N^3$, and all the parts are reset. As soon as the operator releases the hand-lever $N^{13}$ its spring returns it and the shaft $n^{41}$, the arm $N^{15}$ yielding and turning on its pivot as it passes by the shoulder $n^{40}$ and the projection $n^{45}$ of the arm $N^{14}$ coming down the outside inclined edge of the follower $N^9$, which as soon as the projection passes snaps over it to lock the shaft and its arms.

The elements named in the course of this description of the operation comprise the essential features of the type-casting and type-setting divisions of my machine. It will be observed that my means for transferring the line are necessarily modified by the fact that the type-setting machine is a part of my complete machine. Premising, therefore, an appropriate mechanism for reciprocating the transfer-carriage and means for throwing back the rear finger after it has carried forward the line, I will proceed to follow out the carrying of the line out of the composing-block.

The types and quads stand in the type-channel, the justifiers lying at a right angle to the line upon the upper surface of the movable section $L^2$ with the rectangular apexes between the words, so that the line is temporarily spaced and, the vertical sides of the types and justifiers touching at all points, the line may be held firmly between the opposing fingers. The transfer-carriage moves over to the left and at once the finger $N^{17}$ is moved ahead of the incline $n^{51}$ and springs down behind the line, its bent or inclined end making a close contact with the side of the last type. As the carriage sweeps ahead the line is carried out of the type-channel. Just as the limit is reached the guard $n^{19}$ strikes the projection $n^{52}$ and is turned out, so that its foot no longer lies over the flange $N^8$. At the same time, practically, the pin $n^{62}$ strikes the pin $n^{63}$, carrying back the slide $N^{19}$ and releasing the arm $N^{18}$, which is at once operated by its spring $n^{56}$ and strikes the flange $N^8$ from below, turning it up, and consequently carrying back its attached finger $N^7$, whose spring $n^{17}$ pulls it back against the rear finger. The two fingers move back with the carriage, again embracing the composing-block. The flange $N^8$ and the front finger $N^7$ are tilted back; but just after the fingers pass over to the composing-block the finger $N^7$ strikes the edge $n^{55}$ of the projection $n^{53}$ and is pushed forward over the type-channel, carrying down the flange. The pin $n^{61}$ strikes the pin $n^{63}$ and the slide $N^{19}$ is carried back, catching the lever-arm $N^{18}$ under the incline $n^{58}$, pushing it under the lowest shoulder $n^{60}$, where it is held from action. As the fingers near the end of the return movement the finger $N^{17}$ passes back of the incline $n^{51}$ and is withdrawn from the type-channel. The foot of the guard $n^{19}$ having been forced forward by the inclined end of the recess $n^{54}$ at the beginning of the return movement is again placed upon the flange. A projection on the guard strikes the catch $n^{48}$ and releases the shaft-latch $N^5$, which drops the flange $N^8$, by that time being beneath the flange-latch $N^2$. The parts are now ready to engage the succeeding assembling line and to perform another cycle.

*14. Line-transfer mechanism O, Figs. 2, 3, 8, 10, 100, 102, 110–118, 124, 127, 128.*—The main shaft A of the machine turns in the bearings previously described, and at the opposite end in a sleeve $A^7$, turning in a bearing $A^8$, and this sleeve carries and is driven by a gear $O^2$, attached to a cam $O^3$, which abuts against the bearing $A^8$, the bearing being somewhat enlarged at the outer end beyond the point at which it rests in the bed of the machine. Power is imparted to the gear $O^2$ through the gears $a'$ $a^6$ $a^8$ $O'$, shaft $o$, journaled in the bracket $o'$, pinion $o^2$, and gear $o^3$ on stub-shaft $o^4$. The application of the power is regulated by a clutch-gland $O^4$. The clutch-gland $O^4$ is feathered on the end of the shaft $o$ and is movable thereon laterally. The pinion $o^2$ is loose on the shaft $o$ and bears locking-teeth. It is obvious, therefore, that when the clutch is joined the pinion $o^2$ will turn with the shaft $o$. The pinion $o^2$ being, as described, loose on the shaft $o$, no power can be transmitted to any of the operative mechanism to the left of the dotted line $x\ x$ in Fig. 2 until the pinion $o^2$ is locked on the shaft by the engagement of the clutch-gland $O^4$, which rotates with the shaft.

Just beyond the composing-block lies a hand-lever $O^5$, Figs. 110–118. It is the function of this lever to release the parts which govern the periodic action of the gland $O^4$ and the cam $O^3$. Secured to the lever is a rod $o^5$, which lies horizontally in the bed of the machine, but has at the inner end a projection $o^6$, which takes into a recess $o^8$ of a short rod $o^7$, which stands vertically in a bore of the bed of the machine upon a spring $o^9$. The rod $o^7$ has upon its head a projection $o^{10}$, which acts as a catch for a shifting-arm $O^6$, pivoted to the head of a spring-actuated transfer-lever $O^7$ and held down at the outer end by a roller $o^{11}$, Fig. 110. The arm $O^6$ has two shoulders $o^{12}$ $o^{13}$. The first engages the projection $o^{10}$ and in that position holds the transfer-lever $O^7$ from being pulled over by its spring $o^{14}$, which is attached, as shown, at one end to an arm secured to the transfer-lever below the fulcrum-point $o^{15}$ and at the other to the frame of the machine. When this transfer-lever is released, the spring $o^{14}$ pulls it over and through the spiral gear $o^{16}$, operated by the segment-gear $o^{17}$ of the transfer-lever, Figs. 10, 110, 111, and the gear $o^{18}$ on the same shaft with gear $o^{16}$ turns the shaft $o^{19}$ and its pinion $o^{20}$. The pinion engages the rack $n^{50}$ and carries forward the transfer-carriage $N^6$. The return of the carriage is accomplished by the positive action of the cam $O^3$ upon the roller-head $o^{21}$ of the transfer-lever pushing over the short arm of the transfer-lever and replacing the forward shoulder $o^{12}$ of the arm $O^6$ over the projection $o^{10}$. The clutch-gland $O^4$ bears a collar $o^{22}$, in which plays a roller-head $o^{23}$ of a shifting lever $O^8$, pivoted to the bed of the machine and having attached to it at one end a spring $o^{24}$, which tends to pull out that end of the lever and force in the clutch. The position of the shifting lever $O^8$ is governed by a latch $O^9$, which is recessed at the outer end to adapt it to take over the end of the shifting lever and which for the mere purposes of transfer of the line of types may be secured to an upright shaft $o^{25}$, but which, for reasons immediately hereinafter set forth, I place loose upon the shaft $o^{25}$, to which it is indirectly connected, so as to be affected by the rotation of the shaft. The arm $O^6$, when its shoulder $o^{12}$ is freed from the projection $o^{10}$ by forcing down the rod $o^8$ by the hand-lever $O^5$, will release the transfer-lever $O^7$ and drawn by the action of spring $o^{14}$ will travel in and by means of the shoulder $o^{12}$ draw back an arm $o^{26}$, attached to the shaft $o^{25}$, and removing the recess of the latch $O^9$ from engagement with the end of the lever-arm $O^8$ and permitting the clutch-gland $O^4$ to engage by the action of the spring $o^{24}$ on the lever $O^8$. On the return movement of the transfer-lever the shoulder $o^{13}$ will engage and push out the arm $o^{26}$, replacing the latch $O^9$ over the end of the lever $O^8$, turning that lever and throwing the clutch out of engagement until the next cycle. This is sufficient provided there is to be considered only the transfer of the line; but in my complete machine I provide for the spacing of the line and also its transformation into a bar subsequent to the transfer. As the movement of the shaft operating the justifying and bar-forming parts must continue for a period after the transfer of the line, I have provided for the immediate reaction or return of the transferring mechanism without disturbing the continued revolution of the driving-gear.

At the end of the lever $O^8$ just above the roller-head $o^{23}$ is a projection $o^{27}$, over which may lie the hooked arm $o^{28}$ of a bell-crank lever $O^{10}$, fulcrumed to a depending bracket on the machine and having an upper end $o^{29}$, bearing against the face of the gear $O^2$ under the pressure of a spring $o^{30}$. The lever serves as a lock for the clutch until the end $o^{29}$ drops into a recess $o^{31}$ in the face of the gear $O^2$ at the end of a revolution, the spring-pressed lever then turning on its shaft-fulcrum $o^{32}$ and removing the hooked arm $o^{28}$ from the projection $o^{27}$. The recess has an inclined face, so that at the beginning of the next cycle the end $o^{29}$ may easily slip out of the recess.

Pivoted to one end of the shifting lever $O^8$ is an arm $O^{11}$, which is pressed forward into close engagement with a stop $o^{33}$ on a lug $o^{34}$ of the lever $O^8$ by a flat spring $o^{35}$ on the back of the lever. The latch $O^9$ is recessed at the outer end and adapted to fit over end of lever $O^8$ and is placed loosely on the shaft $o^{25}$, as described. Fixed to the shaft $o^{25}$ is an arm $O^{12}$, and lying in a recess of this arm is a spring $o^{36}$, which ties together the latch $O^9$ and the arm $O^{12}$ and yet permits the arm to move in without at once carrying with it the latch which abuts the end of the lever $O^8$, Figs. 114 and 115. The arm $O^{12}$ bears a roller $o^{37}$ in a reduced part at the outer end and has at one side a stop $o^{38}$, against which the back of latch $O^9$ abuts. When the arm $o^{26}$ is forced outward by the shoulder $o^{13}$ of the arm $O^6$, the arm $O^{12}$ and the latch $O^9$ begin to swing in toward the lever $O^8$, Figs. 112, 113. The roller-head $o^{37}$ of the arm $O^{12}$ first strikes an inclined face $o^{39}$ of the arm $O^{11}$ and turns back the arm against the pressure of the spring $o^{35}$. The spring $o^{35}$ furnishes a connection which yields for the space of time required for the action of the bar-making features. If, as previously suggested, it were desired to simply transfer the line, the latch $O^9$ or a modification thereof could be permitted to act directly upon the lever $O^8$ and at once release the clutch; but in my device the power is exerted first against the pivoted and yielding arm $O^{11}$, turning it back gradually against the spring $o^{35}$ until the lever $O^8$, the spring $o^{35}$, and the lever $O^{11}$ are practically a single lever ready to fly forward as soon as the clutch is released. The latch $O^9$ is practically a follower of the lever $O^8$, and the end of the latch is drawn by its spring $o^{36}$ against the end of the lever at a point just in advance of the recess of the latch, ready to be pulled over by the spring $o^{36}$ to lock the lever as soon as the clutch is opened. The clutch is not yet affected, and during this action the gear $O^2$ continues its rotation until the end $o^{29}$ of the bell-crank lever $O^{10}$ falls into the recess $o^{31}$, releasing the lever $O^8$ from the lock of the lever $O^{10}$. Thereupon the lower or outer end of lever $O^8$ snaps in and is engaged by the latch $O^9$, the spring $o^{36}$ at once drawing the recess of the latch well over the end of $O^8$ and above the arm $O^{12}$. On the movement of the arm $O^6$ the shoulder $o^{12}$ engages the arm $o^{26}$, which, turning the shaft $o^{25}$, carries the latch $O^9$ and the arm $O^{12}$ together away from the end of the lever $O^8$. $O^{13}$, Figs. 100, 110, is a dash-pot to perform the usual function of a dash-pot, in this instance being of the resistance order and practically the same as the dash-pot $r^{36}$ described under the heading "Bar-block." It is connected to and regulates the action of the transfer-lever $O^7$. By this mechanism a yielding connection is supplied, so that the operator need give but a single blow to the lever $O^5$ and need not wait results, the connected levers and the transfer mechanism returning to their position at once, the cam $O^3$ having passed the active point, while the gear $O^2$ is free to proceed with the driving of the adjunctive bar-making features and bringing the cam $O^3$ around for the next cycle. In Figs. 100 and 110 I have shown the hand-lever $O^5$ with a pin on the side taking over the hand-lever $N^{13}$. The hand-lever $N^{13}$, as previously described, permits the operator to shift the line without transferring it. In ordinary use the operator will complete the line according to his judgment after the ringing of the alarm, the conclusion generally being somewhat in advance of the full capacity of the length of the line. He then strikes the lever $O^5$, arranged in a convenient position for ready command, carrying down the hand-lever $N^{13}$, so that the line-shifter $N'$ drives the line quickly away from the assembling-point while the transferring mechanism is coming into operation. As before described, the single downward blow releases the line and replaces the locking latches and catches, so that the transfer-carriage may return immediately after transferring the line, all the parts reengaging ready for the new line which the operator is already assembling. At the conclusion of the following division of the specification I have reviewed this topic with special reference to the mode of illustration employed and the manner in which the type-setting mechanism and the bar-forming mechanism are joined.

15. *Bar-block-actuating mechanism P*, Figs. 2, 110, 119, 126.—In my complete machine, as previously described, the line of type is transferred from the type-channel of the composing-block L into corresponding channels of the bar-block R, in which the line is transformed into a bar. In the course of this transformation the bar-block is swung to and away from the melting-pot alternately and also partially revolved and at intervals held fixed first to permit the admission of a line of type and then to permit the flow of metal against the shanks of the types, and in addition to these movements the bar-block is given a vertical movement downward to wipe the base of the newly-formed bar across the mouth of the melting-pot to remove any adhering sprues. It is the purpose of this division of the specification to describe the parts which actuate the bar-block and effect these several movements.

The sleeve $A^7$ and the bearing $A^8$ pass through an opening in the frame of the machine and extend a short distance beyond the side of the machine, the bearing being enlarged at the outer end, as shown, Figs. 2, 124, 125. The sleeve $A^7$ bears at the extreme end a crank $P'$. This crank is recessed at $p$ to receive a movable block through which passes a shaft or pin $p'$, said block being within said recess and held there by a cap-plate $p^2$. The crank is also provided with a projection $p^3$ at the bottom for purposes hereinafter set forth. On this shaft or pin $p'$, between the crank and the side of the machine, is journaled a roller $p^4$. To the same shaft is pivoted one end of the connecting-rod $P^2$, the other end being pivoted to the arm $P^3$, which carries the bar-block. The roller $p^4$ travels around the bearing $A^8$ as the crank revolves until the roller is brought over a reduced path $p^5$, formed by cutting away the bearing, whereupon the roller and shaft end of the connecting-rod move inward to cause a dwell of the arm $P^3$. The arm $P^3$ has a recess $p^6$. A rod $p^7$ projects from the frame of the machine outward and forms a fixed bearing for the journal-box $p^8$, which is of less width than the recess $p^6$. In one of the walls of the recess (the top wall $p^9$) lie springs $p^{10}$, which bear against screw-caps $p^{11}$ in the top of the wall and at the bottom bear against the journal-box $p^8$, so that the arm $P^3$ ordinarily bears the same relation to the rod-bearing $p^7$ as if it were journaled directly in the rod-bearing and without the space between the journal-box $p^8$, and the wall $p^9$ of the recess $p^6$. This space permits the arm $a$ movement with relation to the journal-box $p^8$ by the exercise of force. An arm $P^4$ carries in a bifurcation $p^{12}$ a roller $p^{13}$. The arm $P^4$ has at the opposite end a sleeve $p^{14}$, integral with it, turning on a shaft $p^{15}$, journaled in the arm $P^3$ and carrying two projecting arms $p^{16}$, which bear against the journal-box $p^8$. The roller $p^{13}$ of the arm $P^4$ during the movement of the bar-block to the mouthpiece $Q^2$ approaches the crank $P'$, the roller being in the path of the projection $p^3$ as the bar-block stops at its mouthpiece, as hereinbefore explained, to make a cast. A continuation of the movement of the crank will result in subjecting the arm $P^3$ to a downward movement through the leverage exerted by the arm $P^4$. The arm $P^4$ in this case acts as a lever of the second class, in which the power is applied at the roller $p^{13}$ by the projection $p^3$ forcing the roller and arm backward, the load or work being at the connection of said arm to the arm $P^3$—that is, the pivotal pin $p^{15}$ and the fulcrum being the point where the lugs $p^{16}$ abut against the journal-box $p^8$. The object of the downward movement of the arm $P^3$, and consequently of the bar-block at the mouthpiece, is to wipe the base of the newly-formed type-bar across said mouthpiece to remove any sprues that may be formed upon the base of the bar in casting the metal upon the shanks of the type to form the bar. The excess in width of the opening in which is seated the journal-box permits this movement, the springs $p^{10}$ returning the arm to its normal position when the projection passes the roller $p^{13}$.

Figures 121, 122, 123:
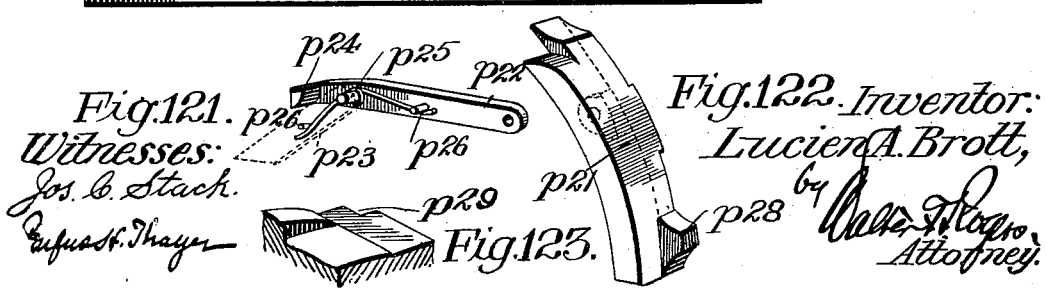

An arm $P^5$ engages at one end a rack-bar $P^6$, which engages the teeth of a mutilated gear $R^{10}$, fixed to or a part of the end of the bar-block, said rack-bar being guided in guide-lugs $p^{30}$ $p^{31}$, depending from the arm $P^3$. (See Figs. 119, 159). The arm $P^5$ is operated by a rock-shaft $p^{17}$, which carries at the opposite end and close to the side of the machine an arm $p^{18}$, having a roller $p^{19}$. The shaft $p^{17}$ is journaled in ears on the arm $P^3$. As the arm $P^3$ moves upward the roller $p^{19}$ will be brought into contact with a projecting split plate or cam-path $P^7$ on the side of the machine, so that the rock-shaft $p^{17}$ will be turned and the rack-bar drawn inward, thereby partially revolving the bar-block. The cam-path $P^7$ is composed of two parts, a recessed upper part $p^{20}$, fixed to the side of the machine and provided with a notch, and a lower part consisting of a plate $p^{21}$, pivoted to an arm $p^{22}$ and having a projection $p^{28}$ to enter the notch in part $p^{20}$, the arm $p^{22}$ being in turn pivoted on a pin $p^{25}$, as is also an arm $p^{23}$. Each arm is provided with a pin $p^{26}$, serving to control a spring, which is coiled around the pivot $p^{25}$, with the ends resting under the pins, as shown in Fig. 121. The arm $p^{23}$ is engaged by the walls of a notch $p^{29}$ in the cap-plate retaining the journal-box $p^8$, so that when the parts are in the position shown in Fig. 119 the wall of the notch $p^{29}$ will depress the arm $p^{23}$, tensioning the spring, as shown, the power of the spring being exerted to throw up the arm $p^{22}$, carrying the plate $p^{21}$, in order that a path determined by the under surface of said plate may be presented to the roller $p^{19}$ as the arm $P^3$ and its connections rise and move in toward the mouthpiece of the melting-pot. While the arm $P^3$ is moving upward the arm in turning on its pivot $p^7$ removes the walls of the notch $p^{29}$ from the arm $p^{23}$, thus removing the tension from the spring. This permits the arm $p^{22}$, which is now unsupported, to fall in company with the plate $p^{21}$ as soon as the roller $p^{19}$ has passed from beneath it in the upward movement. The arm $p^{23}$ rests against a stop-lug $p^{24}$ on arm $p^{22}$. There is now an intervening space between the bottom of the upper plate $p^{20}$ and the top of the lower plate $p^{21}$. Thus the roller $p^{19}$ in returning is offered a new path, determined by the upper face of the plate $p^{21}$ and the under surface of the plate $p^{20}$. The roller $p^{19}$ immediately after it has operated the rack-bar $P^6$ through the arm $P^5$ travels upward upon the under surface of the plate $p^{21}$, the two sections of the cam-path being together. If no further revolutions were to be given the bar-block, the roller $p^{19}$ could travel back the same path. It is desired, however, to give to the bar-block a partial revolution in a retrograde direction to provide for the easy discharge of the type-bar. The cam-path for this reason is, as previously described, divided or split, in order that as the bar-block returns the roller $p^{19}$ will, through the unopposed weight of the bar-block, seek the more distant path presented by reason of the lower section $p^{21}$ falling from its position in front of the section $p^{20}$, thus permitting the bar-block to reverse to a position to discharge the bar. A guide-rib $p^{27}$ is provided on the side of the machine to guide the lower section $p^{21}$ in its movements.

The crank $P'$, the connecting-rod $P^2$, and the arm $P^3$ are so arranged that they would sweep the bar-block through an arc of a circle extending from the position of rest the bar-block, as shown in Fig. 119, to a point beyond the mouth of the melting-pot if the action were not modified. As the crank $P'$ turns over toward the right, in accordance with the design of the illustration, the connecting-rod $P^2$ is drawn down at the lower end, the arm $P^3$ turns on its journal-shaft $p^7$, the bar-block beginning to move upward. At this moment the roller $p^{19}$ is operated, as described, to cause the arm $P^5$ to reciprocate the rack-bar $p^6$ and partially revolve the bar-block. The bar-block is then carried on by the continued movement of the crank, with its bottom in such position as to strike squarely against the mouth of the melting-pot. ($Q^2$, Fig. 110, 119.) Just as the bar-block reaches the melting-pot the roller $p^4$ passes over upon the reduced path $p^5$. The effect of this is to prevent any further movement of the bar-block, while the roller is on the path $p^5$, either forward immediately before the crank has passed its center or backward immediately after it has passed its center, the point of union between the crank and the connecting-rod passing down a plane parallel to the reduced path instead of out over the curved line necessary to give a forward or backward swing of the arm $P^3$ and the bar-block. During this movement of the roller the lever-arm $P^4$ and the bottom of the crank have approached each other, so that after the passing of the roller $p^4$ over upon the path $p^5$ the roller $p^{13}$ of the lever-arm $P^4$ is operated upon by the projection $p^3$ on the bottom of the crank, with the effect of pressing upon the arm $P^4$, and thereby through the arms $p^{16}$ bearing against the journal-box $p^8$, journaled on the fixed shaft $p^7$, and resulting, as described, in the downward movement of the arm $P^3$, carrying with it the bar-block. As soon as this point is passed the continued revolution of the crank-disk brings back the bar-block to its initial position, the action of the split cam-path $P^7$ upon the roller $p^{19}$ and arm $p^{18}$ being to partially revolve the bar-block at the beginning of its downward movement, as previously described. As stated, the purpose of the reduced portion $p^5$ is to permit a sufficient halt of the bar-block at the mouthpiece of the melting-pot to receive a charge of metal, while the downward draw of the arm $P^3$ wipes the type-bar across the mouth of the pot, removing sprues and cleaning the base of the bar.

This division and the preceding division of the specification describe the mechanism by which the type-casting and type-setting mechanisms are joined in action with a bar-forming mechanism. The power acts continuously and without reference to the operator upon the type-casting division of the machine, while the type-setting mechanism is subject to the manipulation of the operator. At intervals the mechanism for transferring an assembled line is brought into action, the continuously-acting power which is driving the type-casting mechanism giving power to the type-setting division. At the same time the actuating mechanism of the bar-block is coupled to the power; but the connections between it and the type-setting division are yielding, so that the transferring mechanism may be replaced while the action in the bar-block continues. By this arrangement of power and power connections I am enabled to put into a compact space the three divisions of the typograph and secure a rapid action of the parts. In the scheme of illustration I have shown the power mechanism in Fig. 2, the cams up to the dotted line $xx$ being parts of the divisions of the machine which may be comprehensively entitled the "type-setter." Through the shaft $o$ the power is carried to the other side of the dotted line, and the illustration includes so much as is essential to the transferring mechanism as used in the machine, but does not show the actuating mechanism of the bar-block. In Figs. 3 and 8 the power connections of the transferring mechanism appear and also incidentally in Fig. 10. A part of the transfer connections appears in Figs. 100 and 102. The relations of the several divisions of the machine are shown in Fig. 110, in which the positions and relations of the transfer-lever and its connections are illustrated. In Figs. 111–118 the compensating or yielding clutch is illustrated in detail, the connections by which power is supplied from the common source being shown in Figs. 111, 112, and 113, the transfer connections also appearing in Fig. 111. The same idea is carried out in Fig. 124, where the initial source of power is indicated and the clutch mechanism is shown in its relation to the actuating mechanism of the bar-block. The orderly presentation of the description step by step has required the separation of these several views; but they overlap each other, so that each view may suggest the manner in which the power is derived from a common source and is applied at various stages of the operation.

16. *The metal-supply Q*, Figs. 110, 119, 130–132.—The melting-pot has a plurality of mouths, chambers, and pumps. The pump $C^3$ has already been described under the heading "Melting-pot and pump." The pump Q is an ordinary pump of the same general construction as the forcing-pump previously described and is operated by the cam $Q'$, similar in construction to the cam $B^4$. It draws in the metal through the port $q$ and forces it out through the passage $q'$ into the mouthpiece $Q^3$, provided with the usual nipples. This passage is bored in a casting, above which lies the cap-plate, and in the intervening hollow space or similar relation is an auxiliary burner $q^2$. It will be observed that the channel in the illustration carries the metal out beyond the end of the line of type and then carries it forward to the line. This prevents the accumulation of dross at the unused end of the channel and enables me to practically keep the nipples clean. The unused end is in my invention not at the end of the channel, but midway, where the current sweeps back and forth over it, so that the whole channel is flushed and heated at each stroke of the pump. The unused end is guarded from casting into the bar-block R by a gage-plate, hereinafter described.

17. *The bar-block R*, Figs. 110, 119, 132–166.—The mechanism which justifies and alines the line and then presents it to the melting-pot to receive a charge of cast metal about the shanks of the type whereby the line is spaced and at the same time transformed into a bar and the mechanism which finally removes the justifiers and discharges the bar form a compact organism, which I designate for convenience as the "bar-block."

The bar-block R receives the assembled line of type and justifiers in channels guarded by an end gate, holds the line lightly between two jaws, pushes in the justifiers, brings a level surface down upon the heads of the types to aline the line, clamps the justified and alined line between the two jaws, presents the finished line to a mouth of the melting-pot, removes the justifiers, and unclamps and discharges the completed bar, the several parts then resuming their original positions ready for another cycle. The bar-block is composed, essentially, of a body $R'$, cut away, channeled, and recessed and having the necessary side plate to receive and support the several elements and to permit them to operate and journaled on the shaft $r$, projecting from the arm $P^3$, an end gate $R^2$ to open and close the inlet for the line of types and justifiers, a jaw $R^3$ to receive and to sustain the line of type, a jaw $R^4$ to be forced toward the jaw $R^3$ to clamp the line after it is justified and alined, a justifying device $R^5$, an alining-plate $R^6$, a justifier-remover $R^7$, a gage-plate R⁸, an adjusting device R⁹ for setting the type-channel of the bar-block at any desired width, a mutilated gear R¹⁰, through which the rack-bar P⁶ revolves the bar-block, and a discharger R¹¹ to insure the discharge of the completed type-bar. The devices for operating these elements are principally carried on the bar-block side of the machine, as shown in Fig. 119. They are designated by lower-case reference-letters bearing numerals corresponding as closely as possible to the number also used in designating the active elements.

The end gate R² is held open by the rocking lever $r^2$, Figs. 133, 142, 143, 146, after it is lifted by the swinging lever $r^{20}$, which is operated by the projection $r^{200}$ on the slide R¹², Figs. 119, 129. The movable jaw R⁴, Figs. 134, 135, 152–154, 164, is clamped against the jaw R³ through the lug $r^3$, Figs. 119, 120, and unclamped through the inclined face $r^4$ of the slide R¹², Figs. 119, 129. The justifying device R⁵, Figs. 134–141, 147–151, 156–158, is driven by contact of its lever with the lug $r^5$, Fig. 119. The alining-plate R⁶, Figs. 132, 134–137, 149, 155, 162, 164, is brought down by the pivoted arm $r^6$, Fig. 119, and lifted by the projection $r^{60}$, Figs. 119, 129. The justifier-remover R⁷, Figs. 134–137, 148, 156–158, is driven in by the projection $r^7$ and out by the shoulder $r^{70}$, both on the sliding arm R¹², Figs. 119, 129, and the gage-plate R⁸, Figs. 132, 156–158, 161–164, has its lever-arms rocked by contact with the projections $r^8$, $r^{80}$, and $r^{81}$, Figs. 159, 160, on an arm $r^{87}$, lying inside the arm P³.

As described, the bar-block is pivoted to the end of the arm P³ at one side of the machine, Figs. 110, 119, and is held against lateral displacement when in position to receive a line of type from the composing-block by a lug $r^{113}$, secured to the frame A³ of the machine and entering a notch in the side plate of said block, as shown, Fig. 133. Mechanism is provided for swinging the arm P³ to carry the bar-block from its lower position adjacent to the composing-block up to the mouth of the melting-pot and back again, and mechanism also is provided for giving the bar-block a partial revolution at the beginning of the movement to the pot and a partial retrograde revolution at the beginning of the return movement. (See heading 15.) The line of type passes from the type-channel of the composing-block into a type-channel $r'$ of the bar-block, Figs. 133–135, the justifiers passing from the surface of the composing-block into a channel $r^9$, formed in the bar-block at right angles to the type-channel through the relative location of a part (the alining-plate R⁶, hereinafter described) and a plate $r^{10}$, which supports the justifiers. Two jaws face each other, one fixed, R³, the other movable, R⁴. The type-channel $r'$ is formed by the faces of these two jaws, the outer wall of the block or of an interposed gage-plate, and the end gate R², which closes the channel at the point at which the types enter. The line is carried in by the fingers N⁷ and N¹⁷ of the transfer mechanism, the fingers embracing the fixed jaw R³, which has a projecting thin-edged plate $r^{11}$ secured to its top, Figs. 134, 164. This plate receives and holds the line of type by taking into a recess formed in each type near the top. As the line reaches the limit of movement in the bar-block, carrying back the gage-plate R⁸, hereinafter described, a projection $n^{64}$ on the finger N¹⁷ strikes the arm $r^{18}$ of the lever $r^2$, which releases the end gate R². This end gate (shown in detail in Figs. 142–143, in section in Fig. 146, and in elevation in Fig. 133) consists of a bar so placed in the block that it leans slightly from the vertical, has a reduced and contracted end bent around to form a flange $r^{12}$, and bears a pin $r^{13}$ and a notch $r^{14}$. The pin plays in a slot $r^{15}$ in the side of the bar-block, and when the pin strikes the pivoted lever $r^{20}$ on the side of the machine the end gate R² is lifted, being returned when released by the spring $r^{16}$. The spring-pressed rocking-lever catch $r^2$, journaled in the bar-block, has an arm $r^{17}$, which plays in the notch $r^{14}$ and serves to hold up the end gate after it is lifted until the foot $r^{18}$ of the lever-catch is struck by the projection $n^{64}$ of the finger N¹⁷, whereupon the rocking lever turns, its arm $r^{17}$ is removed from the notch, and the end gate is forced down by the spring to the close passage. The end gate, as shown, has an inclined side at the bottom. Its flange as the end gate comes down strikes outside the top corner of the last type and then strikes the front of the finger N¹⁷, pushing back the finger so that it is free to return with the front finger N⁷, which has been thrown back out of the type-channel $r'$, as previously explained, by the action of the finger N¹⁸. The end gate is so placed with relation to the type-channel and the finger N¹⁷ that it wipes across the type from the front and top and down the front point of the finger N¹⁷, thus taking a path which insures an easy passage without catching upon either the type or the finger. As shown in the sectional view, Fig. 146, the rocking lever $r^2$ plays in a recess in the block and is spring-pressed in a direction to normally keep one arm in engagement with the notch of the end gate. The first act after closing the end gate and partially revolving the block is to force in the justifiers, while the final act in treating the type-bar is to remove the justifiers from the completed bar. Inasmuch as these parts are so nearly related in their mechanical action, they will be described together.

The justifiers 1 are lying with their spacing-apexes across the line and between the words and are supported by the plate $r^{10}$ and held in place by the operating-bar of the justifying device R⁵, Figs. 134–136. The justifying device R⁵, Fig. 147, consists, essentially, of a forcing-bar $r^{19}$, carried above and slightly in advance of a supporting-bar $r^{21}$ by two arms $r^{22}$, journaled on opposite ends of the supporting-bar $r^{21}$. The bar $r^{21}$ is secured to a slide-bar $r^{23}$, which plays in a corresponding groove in a plate of the justifier-remover $R^7$, Fig. 148. The slide $r^{23}$ has a recess $r^{34}$ at the front, in which lies the rounded head of a lever $r^{25}$, Figs. 156–158. This lever is pivoted to the bar-block and is operated by a spring $r^{26}$. The tendency of this spring is to force in the justifying device against the butt-ends of the justifiers. Until the justifying device is ready for action it is held back by a latch $r^{27}$, pressed down by a spring $r^{28}$, Figs. 138, 150, 151. This latch is fulcrumed on a lug $r^{29}$ and is held from displacement by means of a pin $r^{30}$, which lies in the bar-block. The pressure of the spring $r^{28}$ holds the latch $r^{27}$ normally engaging the front of the supporting-bar $r^{21}$. Immediately over the upwardly-projecting outer end of the latch is a rocker-cam $r^{31}$, borne on one end of a shaft $r^{32}$, having at the other end an arm $r^{33}$, which when it strikes a projection $r^5$ on the frame of the machine rocks the shaft $r^{32}$ and through the cam $r^{31}$ depresses the inner end of the latch $r^{27}$, lifting its catch from engagement with the supporting-bar $r^{21}$ and permitting the spring $r^{26}$ to throw forward the justifying device $R^5$. The tendency of the justifiers if too quickly pushed in is to occasionally move sidewise. They should be forced in gradually. To prevent too sudden an action, the justifying device is connected by a yoke $r^{34}$ to a piston $r^{35}$, playing in a cylinder $r^{36}$, closed at the bottom and open at the top, so as to form a vacuum resistance to the justifying device.

The justifier-remover $R^7$ comprises, essentially, a slide-bar $r^{37}$ and a wider forcing-bar $r^{38}$, attached to and projecting above one end of the slide-bar $r^{37}$, Fig. 148. The slide-bar $r^{37}$ has projecting edges or ribs $r^{39}$ to guide it in a channel in a body of the bar-block, Figs. 132, 162, a groove $r^{40}$ to receive the slide-bar $r^{23}$ of the justifying device, and recesses $r^{41}$ $r^{42}$ in one side, the first, $r^{41}$, to give free play to lever $r^{25}$ and the second, $r^{42}$, to operate a pin of the support and replacer of the justifying device, as described later. The remover is positively operated by means of the projection $r^7$ and the shoulder $r^{70}$ on the sliding arm $R^{12}$, Figs. 119, 129, the first catching one end of the bar $r^{38}$ after the cast has been made at the mouthpiece $Q^2$ and the second, $r^{70}$, acting upon the bar $r^{38}$ in the same manner, but in the opposite direction, to force it back out of the way of the next series of justifiers. When the justifying device moves forward, the bar $r^{42}$, attached to the slide-bar $r^{23}$, approaches or abuts against the plate $r^{43}$ of the slide-bar $r^{37}$. When the justifier-remover $R^7$ moves in under the action of the projection $r^7$, the plate $r^{43}$, pressing against the justifying device, forces it back, both the justifying device and the justifier-remover moving forward together toward the front of the bar-block. The arms $r^{22}$ have in the meantime been embracing the alining-plate $R^6$, hereinafter described, while the forcing-bar $r^{19}$ has been lying upon and sliding along the smooth surface of the alining-plate, the parts being in the position shown in Fig. 136. This position is held until the justifier-remover $R^7$ has pushed the justifying device over to the point at which the bar $r^{19}$ passes beyond the end of the alining-plate $R^6$, Fig. 137, whereupon the bar $r^{19}$ is withdrawn below the level of the alining-plate, the arms $r^{22}$ turning on their journals, and a block $r^{44}$, provided with a sustaining inclined groove, operating as hereinafter described. When the justifying device has been depressed, as described, the justifier-remover can force the justifiers out of the type-bar, whereupon they fall into the justifier-magazine S, hereinafter described. The justifier-remover is slid back and replaced by a projecting end of the bar $r^{38}$ being struck by the shoulder $r^{70}$ in the slide $R^{12}$, as described. The justifying device has in the meantime been caught by the spring-latch $r^{27}$. It is necessary to lift the arms $r^{22}$ so that the bar $r^{19}$ will be above the surface of the alining-plate and in position to engage the justifiers in the next line of type. This is accomplished by means of a lever $r^{45}$, pivoted to the bar-block, Figs. 140, 141. This lever has a pin $r^{46}$ on one end, which plays in the recess $r^{42}$ in the bed of the justifier-remover, and on the opposite end has a head $r^{44}$, provided with a groove the extremities of which are at different elevations and in which plays a pin $r^{47}$ on the inner side of one of the arms $r^{22}$, Figs. 136–139. As the justifier-remover $R^7$ returns the outer end of the recess $r^{42}$ will strike the pin $r^{46}$ and swing around the lever $r^{45}$ and through its groove-head $r^{44}$ force the pin $r^{47}$ into the highest part of the groove, thus lifting the arms $r^{22}$ and their attached bar $r^{19}$.

After the justification the next step is the alining of the line. The justifiers have forced out the types to the fullest limit between the end gate and the end of the bar-block or gage-plate. I provide a level surface above the line of type which is to be brought down upon the perfect faces of the types to force them into alinement. The alining-plate $R^6$, Fig. 149, is shown as composed of a block having ears $r^{48}$, through which may pass the screws $r^{49}$, having springs $r^{50}$ beneath them to permit a slight play to the alining-plate, Fig. 144. The top of the bar is level and smooth and adapted to maintain and guide the forcing-bar $r^{19}$ of the justifying device, as previously described, and its ends are formed to receive the fitting and guiding recesses $r^{51}$ of the justifying device, which has already been described as embracing the alining-plate. The top of the bar is channeled at $r^{52}$, and on the opposite side are two ears $r^{53}$, having recesses adapted to receive the rounded heads of the links $r^{54}$. These links or straps $r^{54}$ embrace a shaft $r^{55}$, which is cut away at $r^{56}$, so as to form an eccentric bearing for each of the straps. The shaft has an arm $r^{57}$ attached to it, which is adapted to be operated by a pivoted lever $r^6$ on the side of the machine, which strikes a pin or other projection on the side of the arm. A slight turn of the shaft $r^{55}$ presses the base of the channel $r^{52}$ of the plate against the tops of the types, so as to force them all into alinement. Under an ear of the alining-plate is a spring $r^{58}$ to hold it up in proper position, Figs. 134, 135. The line having now been justified and alined must be clamped firmly between the two jaws $R^3$ $R^4$. The clamping is effected by means of the movable jaw $R^4$. This jaw $R^4$ is cut away to receive two ears $r^{59}$ at each end, which form journals for the shaft $r^{61}$. Lying between the ears and embracing the shaft $r^{61}$ are collars or links $r^{62}$, which also embrace a shaft $r^{63}$. The shaft $r^{61}$ is reduced at $r^{64}$, where it is embraced by the links, so as to present an eccentric bearing to each link. The end of the shaft bears a rocker-arm $r^{65}$, which when it strikes a projection $r^3$ on the side of the machine rocks the shaft, and thereby forces in the movable jaw $r^4$ toward the jaw $R^3$ through the medium of the eccentric bearings and the links. This rocker arm has a flat base and extends to both sides of the pivot, so that when it sets on the bed of the machine (in this case fitting into a recess $l^{17}$ of the composing-block) it will adjust the movable jaw to the correct position, Figs. 133, 152, and 89. The forward ear $r^{59}$ of the jaw $R^4$ has a projection $r^{66}$, which is separated sufficiently from the jaw $R^4$ to permit the reduced portion of the end gate $R^2$ to play in the space so formed. It provides an adjustable continuation of the movable jaw at the entrance to the type-channel of the bar-block, the channel, it may be observed, being sufficiently wide to accommodate the greatest width of any type that may be transferred to it. The jaw is also channeled, as shown at $r^{67}$, so that it may slide upon ways in the bed of the block. The shaft $r^{63}$ has eccentric end journals $r^{68}$ turning in the bar-block. This shaft is normally at rest; but it may be turned for the purpose of regulating the extent of movement of the movable jaw, and the parts so organized are designated by the reference-letter $R^9$. This enables me to make adjustments with the greatest nicety in accordance with the size of the types presented. I place a graduated dial or index $r^{69}$ on the face presented by an enlargement at the end of the shaft $r^{63}$, and I place an arrow on the side of the bar-block, Figs. 152, 161. The dial has notches in its periphery at each graduation to receive a spring-pressed detent $r^{71}$. By means of a cut in the head of the dial the rod may be adjusted by means of a screw-driver or other tool within the various degrees required in the typographic art, the eccentric bearing changing the relation of the shaft $r^{63}$ and the links, so as to force out the shaft $r^{61}$.

While the end of the type-channel in the bar-block may be formed by a wall of the bar-block, in practice I place in that end of the channel an adjustable or yielding gage-plate $R^8$, Figs. 132, 156-158, 161-164. This gage-plate lies in the channel, so that it may slide therein before the jaws are clamped together, as hereinafter described. The gage-plate is so arranged that when it lies in the channel the entering unjustified line of type will abut against the readily-yielding gage-plate. When the line is justified, the gage-plate will abut against a movable arm, so as to limit the length of the line. Thereafter it is desired to remove the gage-plate away from the end of the type-bar, and to this end the intervening arm is removed and the gage-plate moved back against the wall of the bar-block. The gage-plate has a projection $r^{72}$ and a notch $r^{73}$ at the outer end. A shaft $r^{74}$ is journaled in the outer wall of the bar-block and has two arms $r^{75}$ $r^{76}$. The arm $r^{75}$ lies within the wall of the bar-block and plays on the inner side of the block, while the arm $r^{76}$ carries a projection $r^{77}$ and plays in a recess $r^{78}$ in the outer face of the block, Figs. 161, 162. The arm $r^{75}$ in its normal position lies immediately behind the projection $r^{72}$ of the gage-plate. It is pressed by a spring $r^{79}$, tending to turn the shaft so that the inner arm will be in a position behind the projection of the gage-plate. When the outer arm is turned by contact with the cam-finger $r^{81}$, Fig. 160, the gage-plate $R^8$ is free to move out to a distance corresponding to the width of the inner arm, so that after the type-bar is formed the gage-plate may be removed from the end of the type-bar, as previously stated, to permit its ready discharge from the block. The devices for actuating the gage-plate comprise the shaft $r^{82}$, Fig. 163, journaled in the side of the bar-block, as shown in Fig. 161, and bearing two arms $r^{83}$ $r^{84}$. The arm $r^{84}$ takes into the notch $r^{73}$ of the gage-plate. The other arm $r^{83}$ projects from the side of the bar-block and is operated by the projection $r^8$ on a pivoted arm $r^{87}$, soon to be described, Fig. 160. The action of the shaft $r^{82}$ and the attached arms reciprocates the gage-plate, sliding it out away from the type-bar after the arm $r^{75}$ has been moved from behind the projection $r^{72}$ and sliding it back after the discharge of the type-bar. The gage-plate is sustained in place by means of a spring-pressed pin $r^{85}$ entering a groove in the side of the gage-plate, Figs. 156-158, and by lugs $r^{86}$ on the back of the plate, which take over the projecting cap-plate $r^{11}$ of the jaw $R^3$. The gage-plate may be removed by pressing it in opposition to the spring-pin, so as to bring the lugs $r^{86}$ beyond the line of the cap-plate $r^{11}$, when the gage-plate may be drawn out from the bottom of the block. This feature is peculiarly advantageous, because it permits different-sized gage-plates to be quickly applied in accordance with the desired length of the line, enlarging the capacity of the machine with an inappreciable additional expense and without having to change the mechanism.

The devices for operating the rock-shafts $r^{74}$ $r^{82}$ are carried by an arm $r^{87}$, Figs. 159, 160, pivoted at $r^{88}$ upon the bar-block arm P³. The arm $r^{87}$ is normally drawn down by means of a flat spring $r^{89}$, attached to the arm and bearing under a pin upon the arm P³, as shown. The arm carries two fixed projections $r^8$ $r^{80}$ and the pivoted spring-drawn cam-finger $r^{81}$. The action of the arm $r^{87}$ is controlled by a shaft $r^{91}$, journaled in the arm P³, being confined there by a plate, as shown, Fig. 162, and having a wiper-cam or lever-head on each end $r^{92}$ $r^{93}$, Figs. 159–166. A mutilated gear R¹⁰, fixed to or integral with the bar-block and moving with the block by the application of power to the gear through the rack P⁶, bears in its outer face a cam-groove $r^{94}$, having a depression $r^{95}$ $r^{96}$ at each end. One of the wiper-cams or lever-heads, $r^{92}$, plays in this cam-groove, while the other, $R^{93}$, plays in an opening $r^{97}$ in the arm $r^{87}$, sufficiently large to permit the movement of the lever-head $r^{93}$ therein in the different positions of the opening with relation to the center upon which the arm $r^{87}$ moves. Fig. 159 indicates the movement of the mutilated gear giving the initial partial revolution to the bar-block. The depression $r^{95}$ has just moved around in the direction indicated by the arrow, drawing upward with relation to the lever-head $r^{92}$ and forcing it to rise to the level of the groove between the depressions. This movement will turn the lever-head $r^{93}$ in the opening $r^{97}$, so as to lift the arm $r^{87}$. The arm remains up just long enough for the gage-plate rocking lever $r^{83}$ to pass the projection $r^8$ without effect. Just at the end of the partial revolution of the bar-block the lever-head $r^{92}$ drops into the depression $r^{96}$ through the effect of the transmitted tension of the spring controlling the arm $r^{87}$, and the shaft turns, the lever-head $r^{93}$ reversing in the opening $r^{97}$ of the arm $r^{87}$, returning to its lower position by its weight and the superior force of the spring $r^{89}$. In the retrograde revolution of the bar-block the lever-head $r^{92}$ takes the opposite course, dropping into the opening $r^{95}$ in obedience to the tension exerted by the spring $r^{90}$. The lever-head is now turned in the opposite direction, so that the effect of its coming up to and traveling along the level between the depressions is to hold down the lever-head $r^{93}$ in the opening $r^{97}$, securing the arm $r^{87}$ in position, so that its projections shall be in operative relation to the arms $r^{83}$ and $r^{76}$. It will be observed, therefore, that when the lever-head $r^{92}$ is in either of the depressions $r^{95}$ $r^{96}$ or traveling along the level between the depressions in the direction indicated in Fig. 160 the lever-head $r^{93}$ is either reversing or is held down in its opening $r^{97}$, and that it is only in the short interval when the lever-head $r^{92}$ is traveling on the level during the initial revolution of the bar-block that it is turned so as to lift the arm $r^{87}$ by the head $r^{93}$.

The type-bar will, when the jaws are released or unclamped, ordinarily at once drop by gravity to the bar-galley T. To insure the discharge of the bar, however, I have provided the bar-discharge R¹¹, Figs. 144–145. This comprises a movable plunger $r^{99}$, having a return-spring $r^{100}$, and to said plunger is pivoted an actuating spring-pressed arm $r^{98}$, adapted in the course of the revolution of the bar-block to be brought into contact with a wall or lug $r^{102}$ left in an annular groove cut in the pivot-pin $r$, a continuation of the revolution of said block from this point forcing down the plunger through the medium of the arm $r^{98}$, the plunger in turn operating upon a pin $r^{101}$ against the resistance of its return-spring, said pin ejecting the completed type-bar. The bar-block is free to revolve beyond the operating-point, as the lug $r^{102}$, after forcing the pin out a certain distance, passes over the depressed spring-arm $r^{98}$. The discharge mechanism is situated in a suitable recess $r^{103}$ in the body R' of the bar-block.

The slide R¹², Figs. 119, 124, 127–129, is confined between the justifier-magazine S and the side of the machine and is held elevated by the spring $r^{104}$, positive means being employed, however, to actuate it. At its lower end it receives the head of a lever $r^{105}$, attached to the shaft of a bell-crank lever. One end of the bell-crank lever $r^{106}$ bears a roller, against which operates a cam projection $r^{107}$ on one side of the gear O² to pull down the slide R¹². It is desired to return the slide at once after the downward pull, and to this end I provide a cam projection $r^{108}$ on the boss of the cam O³, (see also Fig. 8,) which at once engages a bent arm $r^{109}$, rigidly secured to the pintle or shaft $r^{110}$ of the bell-crank lever. The action of this cam is to throw up the lower arm $r^{109}$ of the bell-crank lever, and thereby to throw up the lever-arm $r^{105}$ and carry with it the slide R¹².

The slide R¹², as previously indicated, has a lip or projection $r^{60}$ and a shoulder $r^{70}$ of a cut at the top, the projection extending below the top of the cut, as shown. The projection $r^{60}$ operates the alining-plate to remove it from the bar. The shoulder or top $r^7$ of the cut, which is above the face of the projection, comes into action later to operate the justifier-remover, and the shoulder $r^{70}$ at the bottom of the cut serves to return the justifier-remover when the slide R¹² moves up. The incline $r^4$, as before stated, serves to unclamp the jaws R³ R⁴ from the type-bar. As previously described, the projection $r^{200}$ operates the end gate R². The slide is, as shown, cut away to permit the easy movements of the projecting parts of the bar-block. On the front of the slide is a cut $r^{111}$, with two shoulders embracing an arm $t^9$ of the bar-galley, Figs. 173, 174, serving to alternately elevate and depress that arm to actuate the packer which drives down the type-bars as they are fed to the galley.

*18. Justifier-magazine S*, Figs. 119, 167–172.—The justifiers, when they are knocked out of the completed type-bar fall into the justifier-magazine S, which has two divisions— the receiving-division S' and the discharge-division S². The mouth s of the magazine is formed by slightly-separated plates and has on one side teeth or serrations s'. The base of the division S' of the magazine is formed by a movable plate S³, normally spring-pressed and suspended by pivoted arms s², so that it can be reciprocated. The plate has a projecting arm s³, adapted to be lifted by a trip s⁴, thus carrying in the plate. The trip is actuated by the rocking lever s⁵ when struck by the cam projection S⁷ on the journal-box p⁸, Fig. 119, the spring throwing the plate back when the trip is released. The plate is arranged across the mouth so that when open it makes a diagonal opening gradually increasing in width. The lower part S² of the magazine has an inclined bottom and a chute s⁶, in which plays the justifier-escapement K⁵, as hereinbefore described. The justifiers fall into the magazine butt-end first, landing on the bottom plate with their thin edges resting between the teeth s'. When the bottom plate is drawn out against the force of its spring, as shown in Fig. 169, the justifiers drop in rapid succession, beginning at the right-hand end and discharging more and more as the opening is widened, falling into the division S² and sliding down the chute s⁶. When the bar-block is at the melting-pot, the bottom of the justifier-magazine is closed and is gradually opened as the arm P³ goes down.

*19. Bar-galley T, Figs. 173-176.*—The inclined bar-galley T is supported by the bed of the machine and rests against the justifier-magazine S, which is bolted to the side of the machine, reaching to just below the point of discharge of the type-bar from the bar-block. It comprises, essentially, a box T', a stick or holder T², and a packer T³. The box T' bears a rack t, with which engages a dog t', pivoted to the holder and held in engagement by its spring-pressed arm t². The stick or holder T² is suspended by a chain t³, passing over a fixed pulley t⁴ and under a free pulley t⁵, which is tensioned by a spring t⁶, the chain being secured to the box T', as shown at t⁷, at the top, and secured to an extension of one of the arms t⁸, which holds the stick T² in adjustable relation to the box T'. The packer T³ is forced down by means of a pivoted arm t⁹, which is reciprocated by the shoulders of the cut r¹¹¹ in the slide R¹², previously described. At the beginning of the use of the galley the stick or holder T² will be at the top. After the first or a few bars have dropped on the holder the packer will strike the top bar and force down the holder against the pull of the spring t⁶. The dog t' will pass down a tooth of the rack, and as soon as the packer is removed the action of the spring t⁶ will cause the spring-pressed dog to engage the teeth. When it is desired to raise the holder, the dog t' is thrown out by pressing up the arm t², whereupon the holder may be lifted to the desired height.

*20. Operation.*—It is the purpose of my machine as a whole to cast types, store them, assemble the units of a line ready for justification, and permanently justify the line and transform it into a type-bar. In the type-casting and type-setting parts of the machine I cast all the units which may be required for the composition of any line of type, then assemble those units into a line, which step might immediately follow the casting, but which in practice, as a rule, is preceded by the transferring of the several types to separate channels of a magazine in succession until columns are accumulated or stored, the types being then released from the magazine in proper sequence. The operations by which these results are secured have been detailed under the heading "13. Relations and operation of the type-casting and type-storing elements." Under the present heading the operation up to the transferring of the assembled line may therefore be merely outlined.

The various adjustments having been made, the type-channel l having been set by means of the polygonal adjusters L⁶, the bar-block gaged and adjusted by means of a chosen gage-plate R⁸ and the adjusting device R⁹, and heat applied to the melting-pot, power is applied by shifting the lever A². Supposing the mold-operator F to be lifted so that there is a free space beneath, the mold-carrier D passes over to the mouth C⁹ of the melting-pot, the molds are pressed down by the presser-plate D⁸, the pump C³ forces the metal beneath its piston upon the metal in the auxiliary chamber C², supplying all the empty molds. The mold-carrier slides forward against the pressure of the rocking and yielding presser-plate until its mold-cavities register with the channels of the magazine H. The mold-operator F now comes down, its operative fingers F⁵ engage the molds, the mold-operator rises, and the molds are stripped from the types, which then hang to the shank-blocks f²⁰. The upward movement of the molds drives in the pins d²⁴, freeing the types from the shank-blocks, and the several types then fall into separate channels of the magazine. The mold-operator now returns, forcing back the molds ready to receive a cast and replacing the freeing-pins and other parts. The fingers F⁵ are then thrown out of engagement with the molds, and the mold-operator rises, leaving a free space for the mold-carrier, which is slid back to the melting-pot. The mold-operator descends, placing the feelers F⁶ in the cells of the magazine, so that if any cell has its complement of type the feeler therein will be pushed up and render inoperative the corresponding finger F⁵, so that upon the return of the mold-carrier the corresponding mold will not be drawn and in the following cycle will not receive a cast. Supposing the casting to have proceeded until the magazine is sufficiently supplied, the operator begins composition by manipulating the keyboard. The types as they are released by the action of the escapement K drop from the chute $h^{19}$ into the extension $l^{12}$ of the type-channel $l$. The type-packer M, by its sector-wing M', forces the type forward, and, through the action of the bell-crank lever $M^6$ and the lever $M^7$, swings the type so that it may pass into the inclined channel $l$, where it may be read by the operator. The type abuts against the yielding spring-held finger $N^7$ and locks in behind a flange of the line-shifter N', lying in the type-channel. As the line increases in length it presses the finger $N^7$ forward until the step $n^{18}$ of the flange $N^8$ is brought beneath the latch $N^2$, whereupon the latch drops, turning the shaft $n$ and releasing the latch $N^4$, so that the alarm rings. The operator may now add units to the line as his judgment may dictate and then strike the lever $N^{13}$, bringing the line-shifter N' into action to carry the line away from the assembling-point. This operation will occur by the dropping of the latch $N^2$ from the flange $N^8$ if the operator should neglect to forward the line or try to overcrowd it. The line is now ready to be transferred from the composing-block L into the bar-block R. In the ordinary operation the operator will use the lever $O^5$, which carries the lever $N^{13}$ with it in its downward movement, so that the line-shifter produces its instantaneous action upon the line, and the parts of the alarm and line-shifting mechanism are at once reset by the same action of the lever. The downward movement of the lever $O^5$ depresses the pin $o^7$ and releases the latch $O^6$, pivoted to the head of the transfer-lever $O^7$. The spring $o^{14}$ draws over the lever $O^7$, so that its head lies beneath the cam $O^3$. As the latch $O^6$ goes over it draws with it the end of arm $o^{26}$, taking the latch $O^9$ off the end of the clutch-lever $O^8$, which through the force of the spring $o^{24}$ throws the clutch-gland $O^4$ over into engagement with the teeth of the pinion $o^2$, whereby power is applied to the gear $O^2$ and through it to the cam $O^3$ and the sleeve $A^7$, which transmits the power to the actuating mechanism of the bar-block. In the meantime as the transfer-lever rocks its sector-gear has through the intermediate gearing driven the pinion $o^{20}$, which meshes with the rack $n^{50}$ to throw forward the transfer-carriage $N^6$. The transfer-carriage travels rapidly to the bar-block, its forward cut-away end passing beneath the bar-block. The finger $N^{17}$ is drawn away from the guard holding it back and springs forward behind the line, so that the two fingers $N^7$ and $N^{17}$ now grasp the line. These fingers sweeping on with the transfer-carriage place the line in the channels of the bar-block, the forward finger running into the bar-block and the rear finger into line with the end gate of the bar-block. A projection of the rear finger $N^{17}$ strikes a lever releasing the end gate, which snaps down, striking the face of the finger $N^{17}$ and carrying it back. At the same instant the finger $N^7$ is thrown back from the front of the line by the action of the arm $N^{18}$ upon the flange $N^8$, as fully described under the heading "13," the fingers assuming their former position upon the return of the transfer-carriage, which is accomplished at once by the action of the cam $O^3$ upon the head of the transfer-lever $O^7$, the latch $O^6$ being carried back to lock the parts and the lever $o^{26}$ being pushed back to force over the lever $O^8$ to release the clutch. This would occur at once were the lever not locked by the bell-crank lever $O^{10}$ and its arms $o^{28}$ $o^{30}$, the latter arm pressing against the face of the cam $O^{23}$. When the lever-arm $O^9$ is turned by the arm $o^{26}$, it bears against a yielding arm $O^{11}$, pivoted to the lever $O^8$, until there is a strong force exerted indirectly upon the lever $O^8$. The gear $O^2$ continues its revolution, carrying the cam $O^3$ around into position for the next cycle and driving the actuating mechanism P of the bar-block until the depression $o^{31}$ on the face of the gear reaches the projection $o^{29}$ of the arm $o^{30}$, whereupon the lever $O^8$ is released and its top flies out, removing the clutch-gland from the pinion, the catch $O^9$ locking the lever $O^8$ against the force of the spring $o^{24}$, tending to operate it, until the next cycle. The power applied to the sleeve $A^7$ sweeps the crank P' around to the right, Fig. 119, the connecting-rod $P^2$ drawing down the end of the lever-arm $P^3$ and starting the bar-block on its way to the melting-pot. The upward movement of the arm $P^3$ brings the roller $p^{19}$ against the face of the cam-plate $P^7$, the lower plate $p^{21}$ being up against the upper plate $p^{20}$. The rock-shaft $p^{17}$ turns, carrying back the arm $P^5$ and pulling back the rack-bar $P^6$, which engages the mutilated gear $R^{10}$ and partially rotates the bar-block, pulling it into the position shown in Fig. 135 and in dotted lines at the front in Fig. 119. The types are lying in the channel between the jaws $R^3$ $R^4$, their heads in the channel of the alining-plate $R^6$, the justifiers between the alining-plate and the supporting-plate $r^{10}$. The sequence of steps in the action of the bar-block is illustrated in Fig. 119 and indicated by the relative order of the reference letters and numerals. As the bar-block moves upward the arm $r^{33}$ on the end of shaft $r^{32}$ strikes the projection $r^5$ on the frame of the machine, causing the cam $r^{31}$ to depress the inner end of the latch $r^{27}$, lifting its catch from engagement with the supporting-bar $r^{21}$ and permitting the spring $r^{26}$ to throw forward the justifying device $R^5$. The action of the justifying device is illustrated in Figs. 156 and 157, the latter figure showing the justifiers driven in. The next step is the alinement of the line, which is accomplished by the contact of a pin or other projection on the rocker-arm $r^{57}$ with the upper side of the pivoted finger $r^6$, bringing down the alining-plate $R^6$ upon the heads of the types, the relation being shown in the second dotted position of Fig. 119. The movable jaw $R^3$ now moves forward to clamp the line against the fixed jaw $R^4$, a pin or other projection on the rocker-arm $r^{65}$ striking the projection $r^3$ and turning the shaft $r^{61}$. The line is now spaced by the justifiers and backed up by the justifying device $R^5$, alined and covered at the top by the alining-plate $R^6$, and clamped firmly between the jaws, so that while the molds created by the openings between the types and the recesses and spaces in the line are ready to receive a cast of metal all openings which might lead into the bar-block outside the type-channel are closed. The block is now presented to the mouth $Q^2$ of the melting-pot, the cam $Q'$ operates the pump $Q$, and molten metal is forced through the channel $q'$, around past the nipples closed by the gage-plate $R^8$ into the open nipples, filling the openings and recesses in the line, applying a metal backing, spaces, and base to the line, and transforming it into a bar, Figs. 130–132. To permit this change to take effect, the bar-block must dwell at the mouthpiece, and this is accomplished by the passing of the roller $p^4$ over the reduced path $p^5$ after it has traveled over the curved surface of the bearing $A^8$, thus governing the movement of the arm $P^3$. The roller $p^4$ reaches the reduced path just at the end of the upward movement, and the bar-block dwells momentarily when held against the mouthpiece. Just as the downward movement is to begin through the continued action of the crank the boss $p^3$ on the crank abuts against a roller $p^{13}$ of the lever-arm $P^4$, in effect locking them together for an instant. As continued force is exerted it is expended in drawing down the arm $P^3$, held from below by lever-arm $P^4$. The arm $P^3$ then drops through the space between it and its journal-block and draws down the bar-block, so that the base of the completed bar is wiped on the mouthpiece and all sprues are removed, thus doing away with the use of a knife. The boss $p^3$ has now passed the roller $p^{13}$, the roller $p^4$ is on the curved surface of the bearing $A^8$, and the bar-block begins its return movement. The type-bar must, as far as possible, be cleared from restraint at the beginning of the downward movement, so that it may be readily discharged. The order of operations of the bar-block after the casting of the type-bar may be varied; but in the illustration I have provided for successively lifting the alining-plate, discharging the justifiers, unclamping the jaw $R^4$, opening and locking the end gate, pushing the type-bar off the ledge $r^{11}$, moving out the gage-plate, and discharging the type-bar. Immediately after its action in removing the justifiers the justifier-remover $R^7$ is drawn back and the justifying device $R^5$ is swung up into line, and immediately after its retraction the gage-plate is replaced. The bar-block finally comes down upon its supports in the bed of the machine with the jaws open to readily receive a line of type, the end gate open, and the gage-plate in its inner position ready to yield against the pressure of the incoming line. Just after the bar-block wipes across the mouthpiece of the melting-pot the cam $r^{107}$ on the gear-wheel $O^2$ strikes the roller end of arm $r^{106}$ and forces down the arm $r^{105}$ and the slide $R^{12}$. The lip $r^{60}$ strikes the projecting end of the lever-arm $r^{57}$, turning the shaft $r^{56}$, so that the alining-plate is lifted away from the face of the type-bar. The shoulder $r^7$ of the slide $R^{12}$ then strikes the projecting end of the bar $r^{38}$ of the justifier-remover and forces it in, so that it drives out all the justifiers, the bar $r^{19}$ of the justifying device $R^5$, as previously described, having dropped down to the position shown in Fig. 137 through the action of the plate $r^{43}$ of the justifier-remover on the bar $r^{21}$, attached to the slide-bar $r^{23}$ of the justifying device and on the justifiers, which may lie closely fitting between the bars $r^{38}$ and $r^{19}$. Immediately following or practically coincident with the action of the justifier-remover the curved face $r^4$ of the slide $R^{12}$ wipes a pin or other projection on the arm $r^{65}$ in the opposite direction from the preceding line of action of the projection $r^3$ upon the pin and carries down the arm, so that the movable jaw $R^4$ is drawn away from the fixed jaw $R^3$ by the action of the shafts $r^{61}$ $r^{63}$. The projection $r^{200}$ at the top of the slide $R^{12}$ then strikes and carries down the inner arm of the swinging lever $r^{20}$, Figs. 119, 172, the outer arm of the lever taking against the pin $r^{13}$ of the end gate and lifting the gate away from the end of the bar, the catch $r^2$ springing into the notch $r^{14}$ and holding up the end gate until the admission of the following line of type in the next cycle. The justifier-remover $R^7$ is completing its movement at this time, and the type-bar is pushed off the ledge $r^{11}$ by the final forward movement of the bar $r^{38}$ of the justifier-remover. The bar is now entirely free except for a possible slight adhering force of the gage-plate. The projection $r^{77}$ on the arm $r^{76}$ strikes the cam-finger $r^{81}$, and the arm $r^{75}$ is withdrawn from the rear of the projection $r^{72}$, so that there is a space between the gage-plate and the wall of the bar-block for the lateral movement of the gage-plate. The arm $r^{83}$ of the lever $r^{84}$ now contacts with the projection $r^8$ on the arm $r^{87}$, so that the gage-plate $R^8$ is drawn back and away from the type-bar, it being immediately after the discharge of the type-bar returned by the contact of the arm $r^{83}$ with the projection $r^{80}$, the arm $r^{75}$ having previously sprung back into place. These actions may serve to release the type-bar, so that when the bar-block reaches the position shown in the dash-out-line in Fig. 119 the type-bar may slide out and fall (as indicated in dotted lines in the same figure) into the bar-galley T. I provide, however, for insuring the prompt discharge of the type-bar, the ejector $R^{11}$. The retrograde revolution of the bar-block has brought the lug $r^{102}$ against the head of the pivoted arm $r^{98}$. That arm and its pivoted head $r^{99}$ are forced down, carrying ahead of them the pin $r^{101}$ and ejecting the type-bar. As the bar-block revolves the lug $r^{102}$ passes over the rounded top of the arm $r^{98}$, the parts of the ejector then springing back into place. Obviously the lug $r^{102}$ on the initial revolution of the bar-block in the next cycle passes the pivoted arm $r^{98}$ without effect upon that arm. The bar-block goes on to its resting-place in the bed of the machine, as previously described, to receive another line of type. The packer-arm $t^9$ of the bar-galley is described as lying in the shouldered opening $r^{111}$ of the slide $R^{12}$. As the slide goes down it forces down the packer-arm $t^9$ and by the packer $T^3$ forces down the preceding type-bars lying in the bar-galley. Immediately after the action of the projections $r^{60}$, $r^7$, $r^4$, and $r^{200}$, which follow in rapid succession, the cam $r^{108}$ strikes the arm $r^{109}$ and lifts the slide $R^{12}$, which carries with it the packer-arm $t^9$ and the packer $T^3$, leaving room for the type-bar soon to be discharged.

The justifiers when they were pushed out of the type-bar by the justifier-remover dropped into the upper chamber of the justifier-magazine S and were there sustained upon the movable bottom $S^3$, that part being in a position opposite to that illustrated in Figs. 167, 169, in which views the discharging position is shown. As described, the justifiers are held upright in the chamber $S'$ of the magazine. As the arm $P^3$ goes down, carrying the bar-block, the curved cam projection $S^7$ wipes the arm $s^5$ and rocks the arm $s^4$, lifting the inclined arm $s^3$, so that the bottom $S^3$ is moved out, permitting the justifiers to fall into the chute, the discharge, as described, being regulated by the construction of the movable bottom, so that the discharge-opening begins to form at one end, gradually enlarging toward the other end. On the upward movement of the arm $P^3$ the swell of the cam projection $S^7$ is withdrawn from the arm $s^5$, and the movable bottom $S^3$ is returned by its spring. The various functions of the bar-block are performed in rapid succession; many of them being practically coincident, so that in practice the bar-block shall travel to and from the melting-pot during the composition of the succeeding line and be ready to receive the line before it shall be composed.

*21. Modifications and equivalents.*—I have in several instances described modifications and in other instances have stated that the mechanisms of the machine have many mechanical equivalents, which are under a familiar principle of law included by the terms of my claims. This principle is peculiarly applicable to my invention, which I believe to be a radical departure in the typographic art and of a broad and primary character, and as claimed in my earlier application, Serial No. 600,492, of July 25, 1896, now a patent of even date, presenting new ideas of casting, storing, and assembling types, and being the first to transform a line of type units into a justified type-bar, the first to join a bar-forming mechanism with a type-setting mechanism, the first to produce and fix in place by one act the permanent spaces required for a justified line, and the first to produce methods and apparatus for thus justifying a line and for transforming a line of type into a type-bar. I desire also to call attention to what has been hereinbefore suggested, that while every element of the machine has been carefully designed the evidence of a new principle in typography is found in the relations of the several parts of the apparatus, and especially in the relations of the final products of the method and machine to the carrying out of the method and the operation of the machine.

IV. *Type Elements and Products.*

*22. Justifier 1,* Figs. 180, 181.—The justifier 1 is substantially wedge-shaped—that is, in the form of a truncated right-triangular prism in its major base portion—with an added rectangular portion 10 with parallel sides at the apex, and its peculiar adaptability to my method and machine has been suggested in the opening of the specification and further defined at various stages in the description of the composition of the line and the transformation of the line into a bar. Its rectangular portion with parallel sides enables it to be used as a spacer first, and then as a justifier it may be driven home, having the action of a wedge upon the line. Minor advantages may be noted in that in removing the justifiers the bar $R^7$ has a securer purchase by reason of the rectangular portion and can positively drive out the justifiers in a right line to the bar. The tapering form of the justifier also enables it to readily traverse the sinuous channel leading from its magazine. The justifiers I use in practice are somewhat larger than the character-types. These justifiers may be cast with the types as a product of the type-casting division of the machine; but I prefer to use permanent—as, for example, steel—justifiers and distribute them by means of the justifier-magazine S, as previously described.

*23. Type 2,* Figs. 177–179.—My machine is adapted to cast, store, and compose any form of type; but the type 2 I show, with its short or incomplete and recessed and reduced shank, is especially adapted to be stored and assembled as described. The type I show throughout the drawings and the type I prefer to use is shorter than the regulation foundry-type, has the full shoulders of foundry-type, has a recess at about the center of the shank and a smaller recess above the central recess, and has a reduced lower portion. The central recess is shown at 20, the upper recess at 21, and the lower reduced portion at 22. The recess 21 is peculiarly advantageous, its shoulders enabling the type to be readily sustained in the type-setting division and subsequently forming a lock for the metal cast between the types. In no step of my method and in no part of my machine, however, is there anything that renders necessary any especial care in the production of the type beyond the obtaining of the one universal typographic essential—viz., a perfect face. It is these faces and not the irregular and untrue feet or shanks which govern the alinement, a level surface, as described, being brought down upon the perfect faces, whereby the truest line possible in typography is attained. I also produce an incomplete or short type, thereby economizing space throughout the whole casting, storing, composing, and assembling apparatus and attaining also a final advantage, for the rough shanks and recesses slightly fuse when the molten metal is cast into the mold formed by the shanks of the units of a line, and a portion is added as a base, which, with the metal which sets in the recess and between the shanks, forms a firm lock for the several units. The term "rough" as here applied is, however, not to be understood in any sense other than that of degree, for my machine is capable of producing-type indistinguishable in finish from regular foundry-type, thereby rendering the operation of the machine more smooth and accurate. This convenient form of type for practically carrying out the formation of the composite type-bars is illustrated in Figs. 177–179, Figs. 178 and 179 showing the additions made by casting. In the forms there shown the type is at the center or recessed point about one-half and at the foot about two-thirds the width of the cameo end, and the type is short-shanked, as stated, or somewhat less than the regular type height, so that the molten metal may readily flow through the partings or openings from the bottom, supply permanent spaces, and at the same time fill the recesses to add a base to the whole line and transform the line into a bar.

I desire to emphasize the fact that I do not cast a type of peculiar form to secure a final advantage alone, but that the form of type I show and use in my apparatus is peculiarly adapted to permit the readiest handling throughout the apparatus and to secure a marked economy of time and space. The short types, with their recessed and reduced shanks, while forming the best elements to be transformed into a bar, also assist in carrying out my plan of casting and releasing the types, permit the accumulation of a large number of upright types in a column, enable me to sustain, discharge, and assemble them readily, and finally fit into my scheme of alining and justifying, thus incidentally securing a striking saving of space and time and a compact organism.

*24. Justified line 3, Figs. 182, 183.*—While the ultimate object of my method and machine is the production of a composite type-bar having the characteristics described under the following division of the specification, I have also incidentally produced a new scheme of justifying.

As described, the line is assembled with temporary justifiers having bodies in the form of a frustum of a pyramid having an added rectangular portion at the apex, the rectangular portion lying between the words and forming temporary spaces. The temporary justifiers 1 are forced into the line, parting the line between the words. Metal is then thrown in these openings or partings, so that a permanent space is cast in the partings or openings beneath the temporary justifiers, which are then knocked out, leaving a justified line or bar of type. Thus I by one impulse of metal produce and fix in place all the spaces necessary to complete a justified line.

In Figs. 182 and 183 I have illustrated this scheme of justification applied to ordinary types. The line is shown at 3, the spaces being indicated by the numeral 30. The dam or boundary formed by the temporary justifier is indicated by a dotted line in Fig. 183, as in the previously-described type of Fig. 178.

*25. Composite type-bar 4, Figs. 184–186.*— The product which I obtain by my improved methods which my machine is constructed to carry out I have termed a "composite typebar" to distinguish it from the common linotype or cast line of type and the common bar of type produced by indentation. It is composed of a series of separate units and a metal backing, locking the units together into a bar. It comprises types bearing carefully and separately formed characters. These types may be formed in any manner, though for rapid and continuous work it is preferable to cast them in the same machine which produces the bar. In the best form of bar, which I have illustrated, the types are incomplete or short types, having reduced shanks with central recesses, so that the molten metal flows between and upon the shanks and into the recesses, producing a bar type-high and practically solid. The molten metal in running fuses the surface of the shanks of the types, which tends to bind them together; but this bond is not relied upon, the locking of the metal in the recesses and beneath the bases of the types giving absolute security. In my preferred form the types are fused over as much surface as possible. The metal passes from between the shanks into the recesses at right angles across the type-line. The bases of the types rest against a solid backing or base, and the several types are also, by reason of the reduced shanks, strengthened by the metal along the sides of the shanks, so that the added metal and the types are oppositely locked together in the best manner to successfully resist any strain.

Fig. 184 is intended to illustrate the character of both sides of my type-bar. On the recessed side the recess is defined by two lines where the cast metal has turned in over the shoulders of the recess—that is, the central recess. Above these lines between the words projects for a short distance that part of the cast metal which represents the usual spaces in a line of type, while below the lines the metal is smooth to the base of the bar. I have illustrated the metal-backing as a whole in Figs. 185, 186. In Fig. 184, 4 designates the type-bar as a whole, 40 the lines which define the position of the central recess, 41 the intervening space, and 42 the added base. In Figs. 185, 186, 5 represents the metal-backing as a whole, 50 the metal base, 51 the metal lying in the central recess, 52 the metal below the central recess, and 53 the space between the words.

The bar is smooth and practically without projection or unevenness, while at the same time the eye can select the component parts of a bar, as indicated by the previous description and by the illustration. It is distinguishable at a glance from any bar heretofore made in any other way and is peculiarly marked as an advance in the typographic art by the fine type effect, all the types having the full sharp shoulders so evident in a line of foundry type and wanting in a cast line of type or a line produced by indentation.

Having fully described my invention, I desire to secure by Letters Patent—

1. In a melting-pot for typographic machines, the combination of a chamber communicating with the nipples of the mouth, of means for constantly maintaining the molten metal against the base of the mouth and in the bottom of the nipples.

2. In a melting-pot for typographic machines, the combination of a main or reservoir chamber, a mouth at the top of the pot, an auxiliary chamber supplying the mouth, an intermediate chamber lying above the base of the mouth, connecting-passages and a pump.

3. In a melting-pot for typographic machines, the combination of a pump, a main or reservoir chamber, an auxiliary chamber and an intermediate chamber separated from the main chamber by division-walls, a piston-cylinder passage leading from the intermediate chamber to the auxiliary chamber, and having an overflow to the main chamber, and a connecting-passage carrying the metal forced by the pump from the main chamber to the intermediate chamber.

4. In a mold-carrier for typographic or type-casting machines, the combination of a movable mold with the walls of a channel, one of the walls of the channel comprising a shank-block for determining the form of the shank of a type, and means for freeing the type from the wall.

5. In a mold-carrier for typographic or type-casting machines, the combination with the walls of a channel, of a movable mold, one of the walls of the channel comprising a shank-block for determining the form of the shank of a type, and means operated by the movement of the mold for freeing the type from the wall.

6. In a mold-carrier for typographic and type-casting machines, the combination with the walls of a channel, of a mold forming with a wall of the channel a type-cavity, means for freeing a cast type from the wall of the channel, and means for guiding and directing the type.

7. In a mold-carrier for typographic and type-casting machines, the combination with the walls of a channel, of a movable mold, a type-freeing device in one wall of the chamber and a spring-pressed guide in the opposite wall, the freeing device being operated and the guide released by the rising of the mold.

8. The combination of a mold-carrier having a mold-cavity, a mold, a freeing-pin extending into the mold-cavity, an arm, and means for operating the arm to reciprocate the pin, substantially as described.

9. In a mold-carrier for typographic machines, the combination of a series of angle pieces or walls with a series of angle-molds, the angle-pieces and the angle-molds together forming type-cavities, and means for moving the molds away from cast types.

10. In a typographic machine, the combination of a mold-carrier bearing a series of molds, with a yielding and rocking presser-plate, and means for forcing the presser-plate upon the heads of the molds at the moment of casting.

11. In a typographic machine, the combination with molds, of a mold-operator bearing spring-pressed fingers for operating the molds, and means for controlling the action of the fingers.

12. In a typographic machine, a mold-operator having a channeled body, fingers playing in the channels, means for controlling the action of the fingers, a bar guiding and supporting the fingers, and means for operating the bar intermittently to put the fingers into and out of the line of mold engagement.

13. In a typographic machine, a reciprocating mold-operator having a body bearing a series of fingers, and a series of unattached or loosely-supported selecting-pins playing beside and upon the fingers to control their action.

14. In a typographic machine, a mold-operator having a channeled body, fingers and selecting-pins in the channels, the fingers having operating means and the selecting-pins serving normally to lock the fingers against movement.

15. In a magazine for typographic machines, the combination with a discharge-chute of a series of rotating feed-wheels extending into the chute borne by pivoted, spring-pressed shafts.

16. The combination of a type-packer shaft with magazine feed-wheels, and an intermediate gear for actuating the feed-wheels from the type-packer shaft.

17. A composing-block for typographic machines, comprising a fixed section, a movable section lying in the fixed section and means for adjusting the movable section therein to regulate the width of the type-channel.

18. A composing-block for typographic machines, comprising a movable section and a shaft bearing polygonal adjusters, the adjusters having a series of faces at different distances from the shaft.

19. A composing-block for typographic machines, comprising a type-channel, a swinging spring-pressed locking-bar extending into the channel and engaging the several types, a free pin, and an operating-lever to force the free pin against the locking-bar.

20. A composing-block for typographic machines, comprising a type-channel, a pivoted, spring-pressed bar extending into the channel to take into recesses in the types, and operating means.

21. In a composing-block for typographic machines, the combination of relatively adjustable sections forming a variable type-channel, with hand-adjusting means and an index carried by the block.

22. In a composing-block for typographic machines having a type-channel, a justifier-chute discharging from above across the type-channel, a guide to receive justifiers and direct them to the face of the block, and a guide lying above the surface of the block to sustain the justifiers in a fixed relation to the type-channel.

23. In a typographic machine, a composing-block having a type-channel with an extension to receive the types, in combination with means for swinging a type in the extension into line with the type-channel and putting it into the channel.

24. In a typographic machine, a composing-block having a type-channel in combination with a type-packer comprising a wing revolving in a line substantially at a right angle to the type-channel.

25. A type-packer comprising a rotating shaft carrying a sector-wing turning in a path behind but including the outer edge of the path of an entering type.

26. A type-packer comprising a sector-wing, supporting means, and means for rotating and reciprocating the sector-wing.

27. In a type-packer, the combination of a shaft and driving means, a sleeve on the shaft carrying a wing, a notched collar on the sleeve, and a stop-roller on which the collar plays.

28. In a type-packer for typographic machines, the combination of a rotating shaft, a sleeve carrying a type-engaging wing, an adjustable notched collar on the sleeve, a spring pressing upon the collar, and a stop-roller regulating the intermittent reciprocation of the type-packer.

29. The combination in a typographic machine, of a type-swinging finger for engaging the shank of a type, and a type-packer having a rotating shaft operating a wing to engage the types at the rear and push them forward, the shaft also controlling the type-swinging finger.

30. In a typographic machine, the combination of a composing-block having an inclined type-channel, a substantially vertical extension of the channel for receiving the entering types, a finger playing into the extension, a lever engaging the finger, and a type-packer controlling the lever and forwarding the types.

31. The combination with means for assembling and composing the units of a line of type, of mechanism for moving the line away from the assembling-point, a hand-lever or equivalent controlling means and means for locking the controlling means released by the advancing line.

32. The combination with means for assembling and composing the units of a line of type, of line-shifting mechanism for moving the line away from the assembling-point comprising means brought into action by the advancing of the composing line and a hand-lever or equivalent means for independently releasing the line-shifting devices.

33. The combination with a type-composing mechanism, of a resistant traveling ahead of the composing line, a line-shifter, and means connected with the resistant for locking the line-shifter during the composition of the line and then releasing it.

34. The combination with a type-composing mechanism, of a line-shifting mechanism comprising latches and catches, or equivalent devices for securing the mechanism during the composition of a line, a resistant finger, a rod carried by the finger, a flange on the rod, and a latch governed by the movement of the flange and thus controlling the action of the latches and catches of the line-shifting mechanism.

35. In a mechanism for determining the length of a line of type during composition, a controlling-latch, a shaft bearing the latch, and means for adjusting the latch upon the shaft to fix the point of action and the length of the line.

36. In a mechanism for determining the length of a line of type, a line-shifter and operative means, a revoluble shaft bearing an adjustable latch, a supporting or locking element carried under the latch during composition and carried from under the latch at the completion of the line.

37. In a mechanism for controlling the composition of a line of type, an alarm mechanism comprising a revoluble shaft governing the alarm, the shaft bearing an adjustable latch, a supporting flange or bar having an extension on a lower plane than the main part of the flange, and operated by the advancing line.

38. In a typographic machine, comprising a composing-block, the combination of a type-packer to forward the types step by step, a line-shifter operating automatically to slightly advance the completed line for inspection, and a line-transferring mechanism to carry the line out of the composing-block.

39. In a typographic machine, comprising a composing-block having a type-channel, the combination of a type-packer to forward the types step by step, a line-shifter to slightly advance the completed line along the type-channel for inspection, and a line-transferring mechanism to carry the line out of the composing-block.

40. The combination of a type-setting mechanism, a bar-block, a line-transfer mechanism, a common source of power-controlling connections, and an intermediate yielding clutch to permit the bar-block to continue moving after the action of the line-transfer mechanism.

41. In a typographic machine an alining-plate having a level surface, means for holding a line of type and means for bringing the alining-plate down upon the faces of the types.

42. In a typographic machine, alining and justifying means having in combination a level surface, means for holding a line of type and justifiers, means for bringing the level surface down upon the face of the types, and means for forcing in the justifiers.

43. The combination in the rotating block, R, of opposing jaws carrying means for alternately clamping and releasing a line of type, and a bar confronting the intervening space between the jaws, adapted to be forced upon the line of type to aline the types.

44. An alining-plate for types, having a channel to take over the heads of the types, and means for rocking the plate.

45. The combination with opposing jaws for sustaining a line of type, a projecting ledge taking into a recess on each type, an alining-plate, and means for bringing the alining-plate down upon the heads of the types.

46. An alining-plate, $R^6$, in combination with a hinged justifier device, $R^5$, the justifying device traveling upon the surface of the alining-plate in the act of justifying and dropping from the plate to permit the removal of the justifiers.

47. The combination with a line-holder having a channel to receive a line of type and means for transforming the line into a justified line or bar of type, of a series of removable graduated gage-plates, any one of which may be placed in the channel without other change or adjustment.

48. In a line-holder of a typographic machine, the combination of opposing jaws forming a type-channel, means for moving one of the jaws toward the other, and means for adjusting the degree of movement comprising an index-register.

49. The combination of an alining-plate, as $R^6$, a hinged justifying device, as $R^5$, embracing the alining-plate, and means for placing the justifying device upon the alining-plate at the beginning of the forward movement.

50. The swinging bar-block, R, carrying means for alining and justifying a line of type and then transforming it into a bar, and having a plunger and pin for ejecting the bar.

51. In the mouthpiece of a melting-pot, a supply-channel turning upon itself so that each charge of metal flushes the whole channel.

52. A magazine for justifiers comprising a receptacle having means for holding the justifiers separate and upright in the magazine.

53. A magazine for justifiers having a movable bottom, and means for moving the bottom to form a gradually-widening opening to discharge a row of justifiers in succession.

54. A substantially rectangular magazine for justifiers having a bottom of gradually-increasing width and means for moving the bottom in and out.

55. In a bar-gallery for typographic machines, the combination of a stick or plate, a rack-bar, means for locking the stick or plate to the rack-bar against upward movement, a stationary pulley, a spring-tensioned pulley, a cord or chain passing over the pulleys and supporting the stick or plate.

In testimony whereof I affix my signature in presence of two witnesses.

LUCIEN A. BROTT.

Witnesses:
SAMUEL S. SLATER,
ALBERT CARDOZO.